US012038794B2

(12) United States Patent
Shim et al.

(10) Patent No.: US 12,038,794 B2
(45) Date of Patent: Jul. 16, 2024

(54) FOLDABLE ELECTRONIC DEVICE INCLUDING HINGE ASSEMBLY

(71) Applicant: Samsung Electronics Co., Ltd., Gyeonggi-do (KR)

(72) Inventors: Heebo Shim, Gyeonggi-do (KR); Jongmin Kang, Gyeonggi-do (KR); Jingook Kim, Gyeonggi-do (KR); Suman Lee, Gyeonggi-do (KR); Wonseok Rhee, Gyeonggi-do (KR); Seongki Jeong, Gyeonggi-do (KR); Seungwhee Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/125,493

(22) Filed: Mar. 23, 2023

(65) Prior Publication Data

US 2023/0229204 A1    Jul. 20, 2023

Related U.S. Application Data

(63) Continuation of application No. 17/172,768, filed on Feb. 10, 2021, now Pat. No. 11,625,073.

(30) Foreign Application Priority Data

Feb. 10, 2020 (KR) .................. 10-2020-0015993

(51) Int. Cl.
*G06F 1/16* (2006.01)
*H04M 1/02* (2006.01)

(52) U.S. Cl.
CPC .......... *G06F 1/1681* (2013.01); *G06F 1/1641* (2013.01); *G06F 1/1652* (2013.01); *H04M 1/0268* (2013.01)

(58) Field of Classification Search
CPC .... G06F 1/1681; G06F 1/1641; G06F 1/1652; G06F 1/1616; H04M 1/0268; H04M 1/022
See application file for complete search history.

(56) References Cited

U.S. PATENT DOCUMENTS 9,348,450 B1 *   5/2016   Kim .................... H04M 1/0268
9,910,458 B2     3/2018   Watanabe et al.
(Continued)

FOREIGN PATENT DOCUMENTS

CN   205721487   11/2016
CN   106205385   12/2016
(Continued)

OTHER PUBLICATIONS

International Search Report dated Jun. 2, 2021 issued in counterpart application No. PCT/KR2021/001811, 7 pages.
(Continued)

*Primary Examiner* — Rockshana D Chowdhury
(74) *Attorney, Agent, or Firm* — The Farrell Law Firm, P.C.

(57) ABSTRACT

An electronic device is provided, which includes a first housing including at least one first electronic component, a second housing including at least one second electronic component, a hinge housing disposed between the first housing and the second housing, a hinge assembly assembled to the hinge housing to rotatably couple the first housing and the second housing, a flexible printed circuit board electrically coupling the first electronic component and the second electronic component via the hinge housing, and a flexible display, wherein the hinge assembly comprises a support portion located between the flexible printed circuit board and the flexible display, wherein, as the electronic device rotates from folded to 180-degree unfolded, the support portion moves into the flexible display, and wherein, (Continued)

as the electronic device rotates from 180-degree unfolded to folded, the support portion moves into the flexible printed circuit board to be spaced apart from the flexible display.

17 Claims, 55 Drawing Sheets

(56) References Cited

U.S. PATENT DOCUMENTS

| | | | |
|---|---|---|---|
| 10,394,062 | B1 | 8/2019 | Song |
| 10,469,635 | B1 | 11/2019 | Carlson et al. |
| 10,587,735 | B1* | 3/2020 | Carlson .............. G06F 1/1616 |
| 11,016,530 | B2* | 5/2021 | Watamura ........... G06F 1/1652 |
| 11,175,695 | B2 | 11/2021 | Lin |
| 11,178,779 | B2* | 11/2021 | Sim ........................ H10K 59/87 |
| 11,194,366 | B2* | 12/2021 | Cheng ................. G06F 1/1652 |
| 11,224,137 | B2 | 1/2022 | Hsu |
| 11,586,243 | B2* | 2/2023 | Yildiz .................. G06F 1/1681 |
| 11,723,170 | B2* | 8/2023 | Ohyama .............. G06F 1/1626 |
| | | | 361/679.27 |
| 2011/0063783 | A1 | 3/2011 | Shim et al. |
| 2014/0196253 | A1 | 7/2014 | Song et al. |
| 2015/0013107 | A1* | 1/2015 | Shin .......................... E05D 3/06 |
| | | | 16/366 |
| 2015/0233162 | A1 | 8/2015 | Lee et al. |
| 2016/0334836 | A1* | 11/2016 | Hong .................... G06F 1/1681 |
| 2017/0115701 | A1 | 4/2017 | Bae et al. |
| 2018/0024590 | A1 | 1/2018 | Nakamura et al. |
| 2018/0198896 | A1 | 7/2018 | Kang et al. |
| 2018/0324964 | A1 | 11/2018 | Yoo et al. |
| 2019/0166703 | A1 | 5/2019 | Kim et al. |
| 2019/0391618 | A1 | 12/2019 | Hsu |
| 2020/0293094 | A1 | 9/2020 | Liu |

FOREIGN PATENT DOCUMENTS

| | | |
|---|---|---|
| CN | 108322567 | 7/2018 |
| CN | 207777905 | 8/2018 |
| CN | 208734715 | 4/2019 |
| CN | 209627903 | 11/2019 |
| CN | 113811837 | 7/2022 |
| EP | 3 407 581 | 11/2018 |
| EP | 3 489 795 | 5/2019 |
| KR | 10-2016-0144299 | 12/2016 |
| KR | 10-1875855 | 7/2018 |
| KR | 10-2019-0097898 | 8/2019 |
| RU | 2 596 469 | 9/2016 |
| RU | 2 683 290 | 3/2019 |
| WO | WO 2015/116062 | 8/2015 |
| WO | WO 2019/109858 | 6/2019 |

OTHER PUBLICATIONS

Chinese Office Action dated Jan. 28, 2022 issued in counterpart application No. 202180003263.6, 21 pages.
European Search Report dated Apr. 8, 2022 issued in counterpart application No. 21753580.6-1224, 9 pages.
Chinese Office Action dated Apr. 15, 2022 issued in counterpart application No. 202180003263.6, 6 pages.
Chinese Office Action dated Oct. 8, 2022 issued in counterpart application No. 202210522427.2, 15 pages.
Russian Office Action dated Feb. 20, 2023 issued in counterpart application No. 2021134802/07, 15 pages.
Indian Examination Report dated Dec. 22, 2022 issued in counterpart application No. 202217050765, 6 pages.
Chinese Office Action dated Jan. 18, 2023 issued in counterpart application No. 202210522427.2, 6 pages.
European Search Report dated May 19, 2023 issued in counterpart application No. 23156054.1-1224, 9 pages.
Russian Decision on Grant dated Jun. 1, 2023 issued in counterpart application No. 2021134802/07, 21 pages.
Korean Office Action dated Aug. 22, 2023 issued in counterpart application No. 10-2020-0015993, 8 pages.
KR Notice of Patent Grant dated Dec. 26, 2023 issued in counterpart application No. 10-2020-0015993, 5 pages.
RU Decision of Grant dated Feb. 13, 2024 issued in counterpart application No. 2023119510/07, 18 pages.

* cited by examiner

FOLDABLE ELECTRONIC DEVICE INCLUDING HINGE ASSEMBLY

CROSS-REFERENCE TO RELATED APPLICATION(S)

This application is a Continuation application of U.S. patent application Ser. No. 17/172,768, filed Feb. 10, 2021, and is based on and claims priority under 35 U.S.C. § 119 to Korean Patent Application No. 10-2020-0015993, which was filed in the Korean Intellectual Property Office on Feb. 10, 2020, the entire disclosure of which is incorporated herein by reference.

BACKGROUND

1. Field

The disclosure relates generally to a foldable electronic device including a hinge assembly.

2. Description of Related Art

Electronic devices have been developed in a portable or wearable manner to improve mobility and accessibility. The electronic devices have evolved to be lighter and thinner for ease of portability, and for convenience of use. For example, a foldable electronic device having a flexible display provides a relatively larger screen than a general bar-type electronic device, but decreases in size when folded, thereby improving portability.

A foldable electronic device may include a flexible display and a plurality of housings. The plurality of housings and the flexible display may be coupled by a hinge assembly, allowing the housings to rotate within a designated range according to a user's manipulation. Through a process of rotating the plurality of housings, the electronic device may transition from a folded state to an unfolded state or may transition from the unfolded state to the folded state.

However, some regions of the flexible display may not be supported by the hinge assembly. Therefore, the some regions of the flexible display may sag, or may be damaged due to sagging.

SUMMARY

The disclosure is provided to address at least the problems and/or disadvantages described above and to provide at least the advantages described below.

An aspect of the disclosure is to provide a support structure capable of safely supporting a flexible display to prevent the flexible display from sagging or being damaged due to sagging.

Another aspect of the disclosure is to provide a support structure capable of safely supporting a flexible display when an electronic device is in an unfolded state, without affecting a driving trajectory of the flexible display.

Another aspect of the disclosure is to provide a support structure capable of preventing a flexible display from being damaged and improving flatness of the flexible display.

In accordance with an aspect of the disclosure, an electronic device is provided, which includes a first housing including at least one first electronic component, a second housing including at least one second electronic component, a hinge housing disposed between the first housing and the second housing, a hinge assembly assembled to the hinge housing to rotatably couple the first housing and the second housing, a flexible printed circuit board electrically coupling the first electronic component and the second electronic component via the hinge housing, and a flexible display disposed from one region of the first housing to at least one region of the second housing across the hinge assembly, wherein the hinge assembly comprises a support portion located between the flexible printed circuit board and the flexible display, wherein, as the electronic device rotates from a folded state to a 180-degree unfolded state, the support portion moves into the flexible display to support at least one region of the flexible display, and wherein, as the electronic device rotates from the 180-degree unfolded state to the folded state, the support portion moves into the flexible printed circuit board to be spaced apart from the flexible display.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described in detail with reference to the accompanying drawings.

Figure 1:
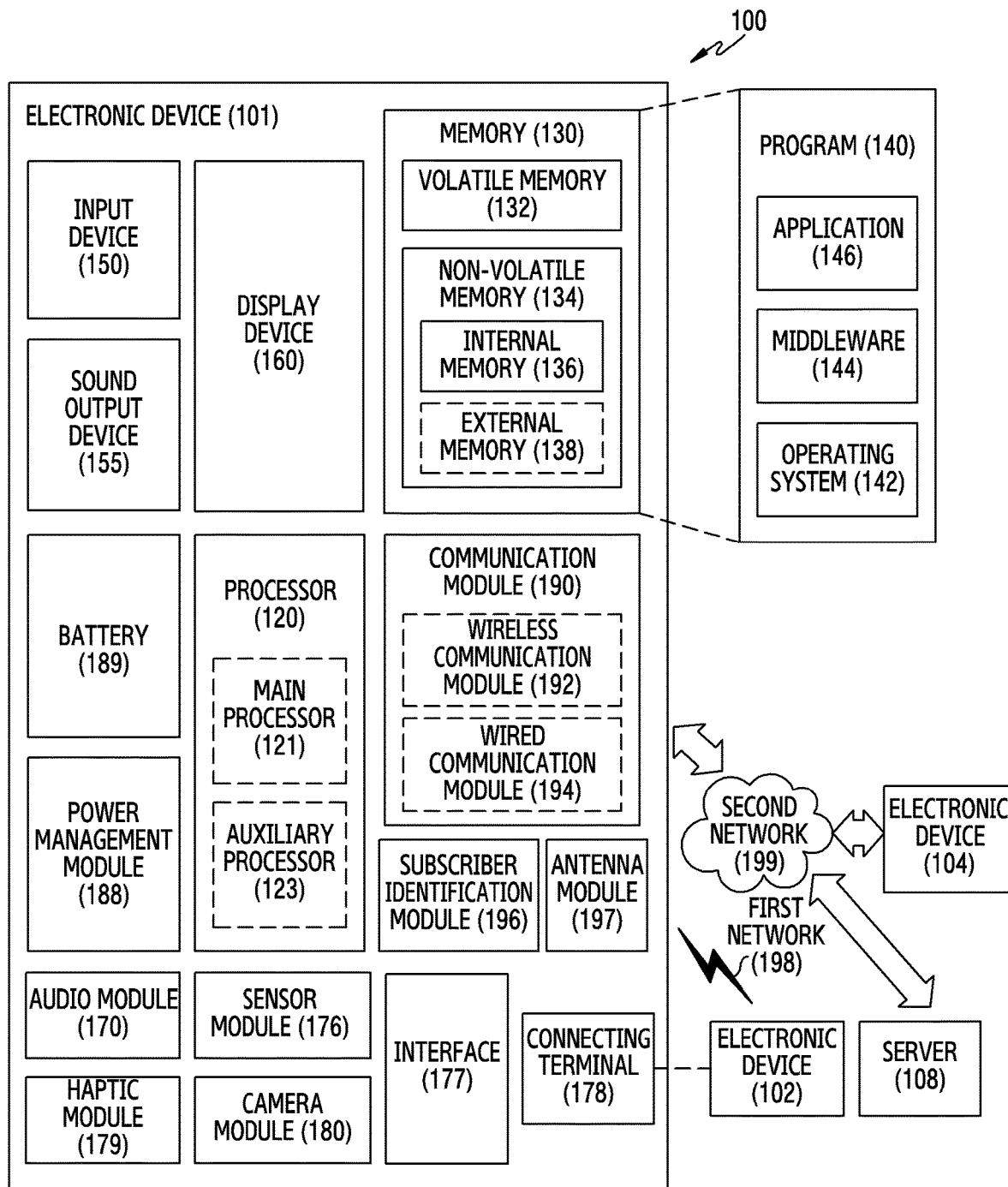
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor #23 (e.g., the neural processing unit) may include a hardware structure specified for artificial intelligence model processing. An artificial intelligence model may be generated by machine learning. Such learning may be performed, e.g., by the electronic device #01 where the artificial intelligence is performed or via a separate server (e.g., the server #08). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
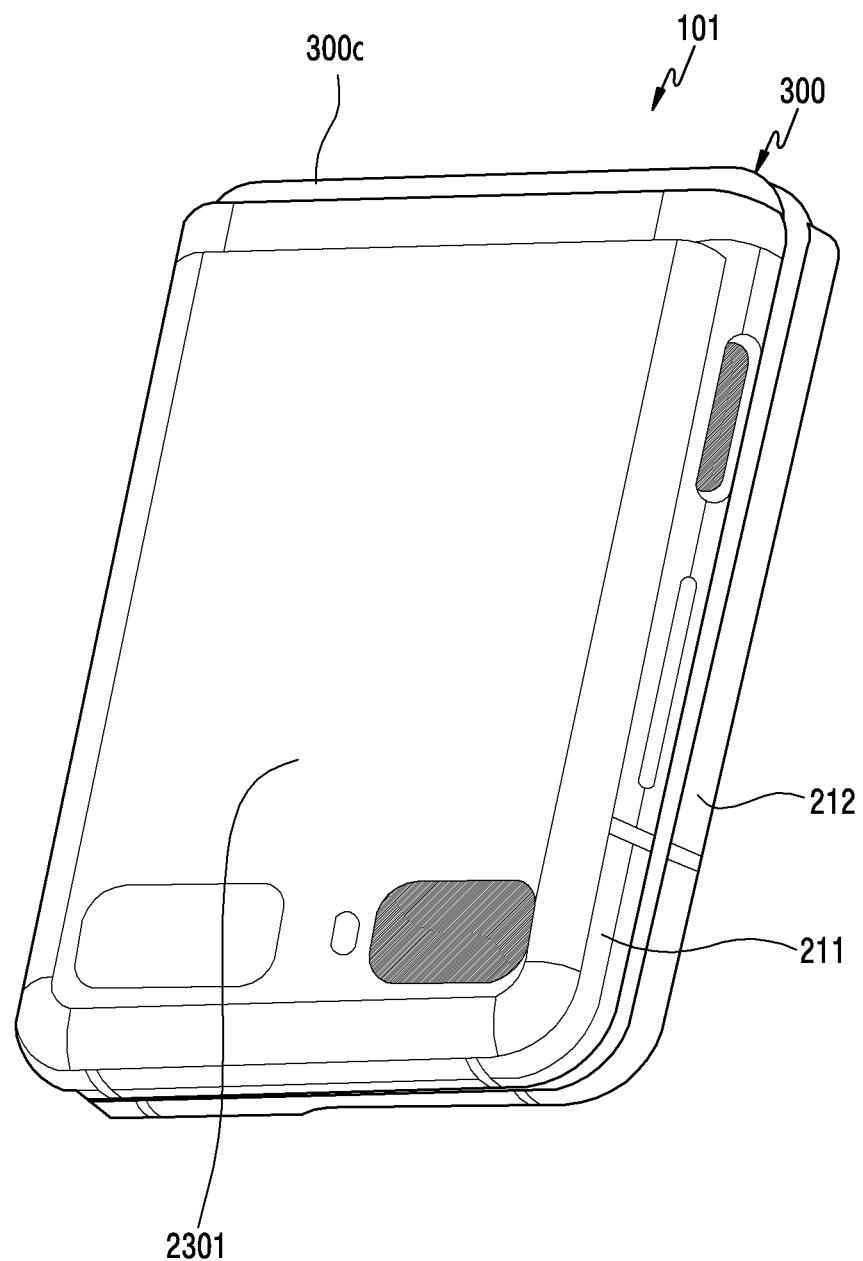
FIGS. 2A to 2C illustrate a foldable electronic device in a folded state according to an embodiment.
Figure 2B:
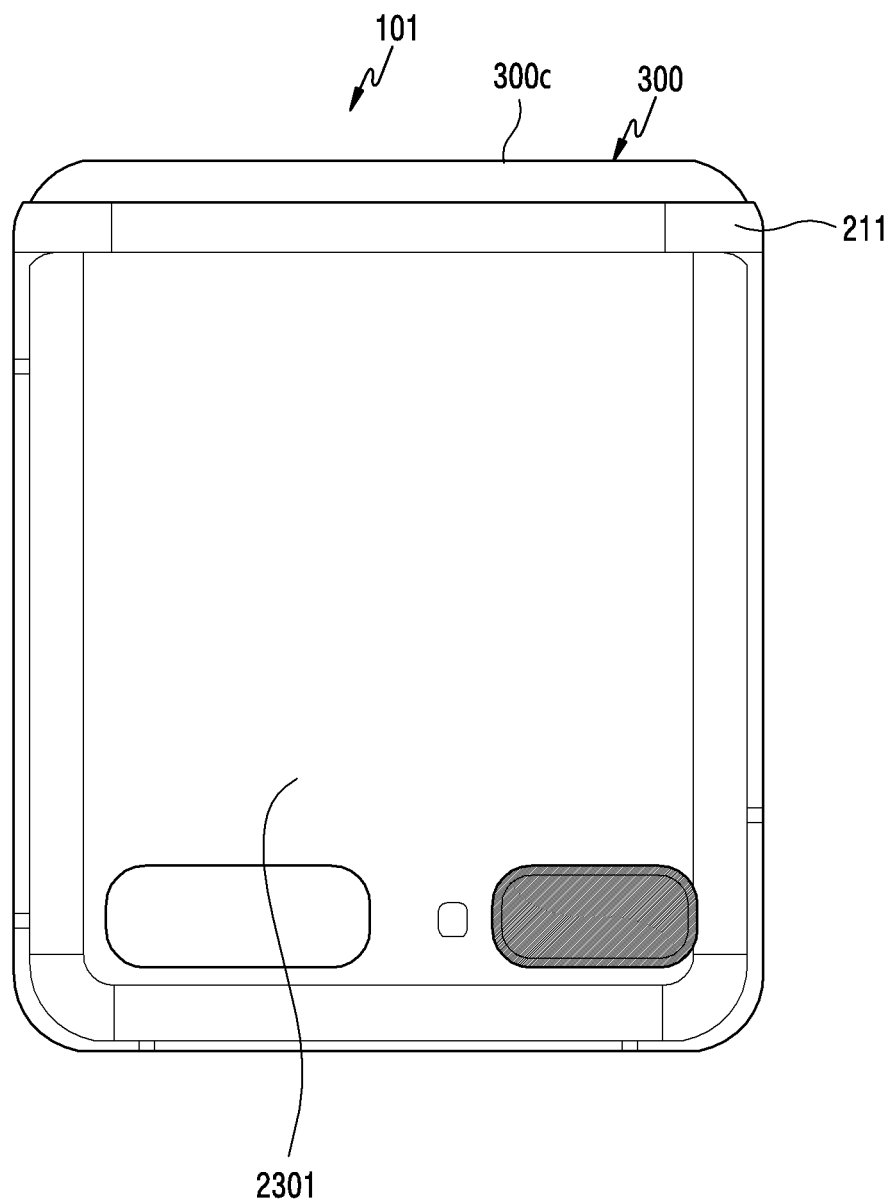
Figure 2C:
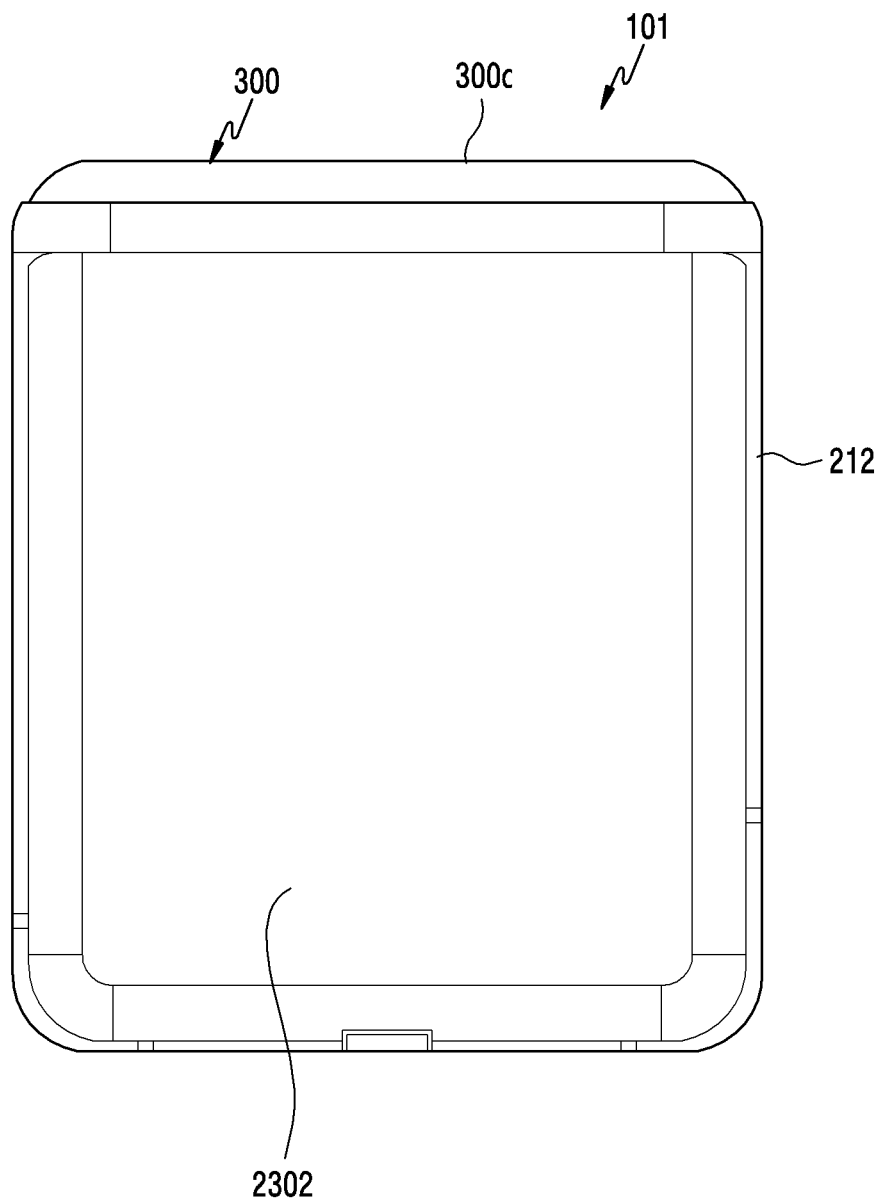

FIGS. 2A to 2C illustrate a foldable electronic device in a folded state according to an embodiment. Specifically, FIG. 2A illustrates a perspective view, FIG. 2B illustrates a front view, and FIG. 2C illustrates a rear view.

Figure 3A:
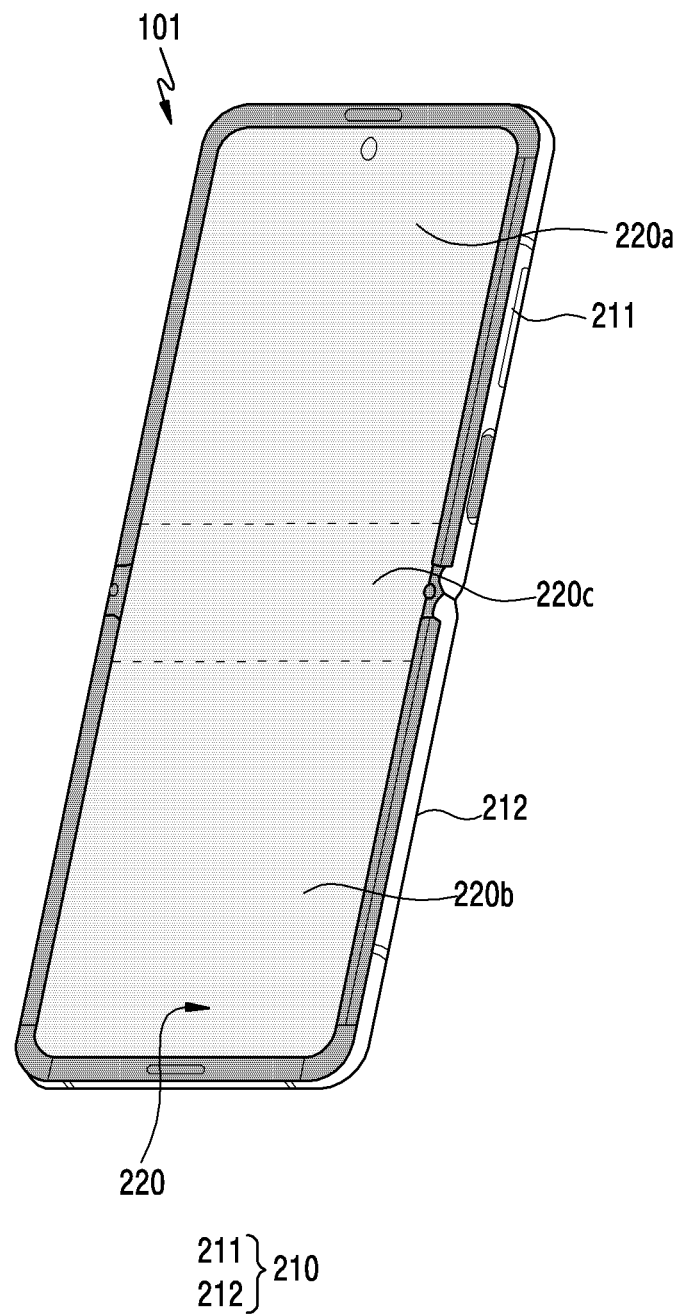
FIGS. 3A to 3C illustrate a foldable electronic device in a 180-degree unfolded state according to an embodiment.
Figure 3B:
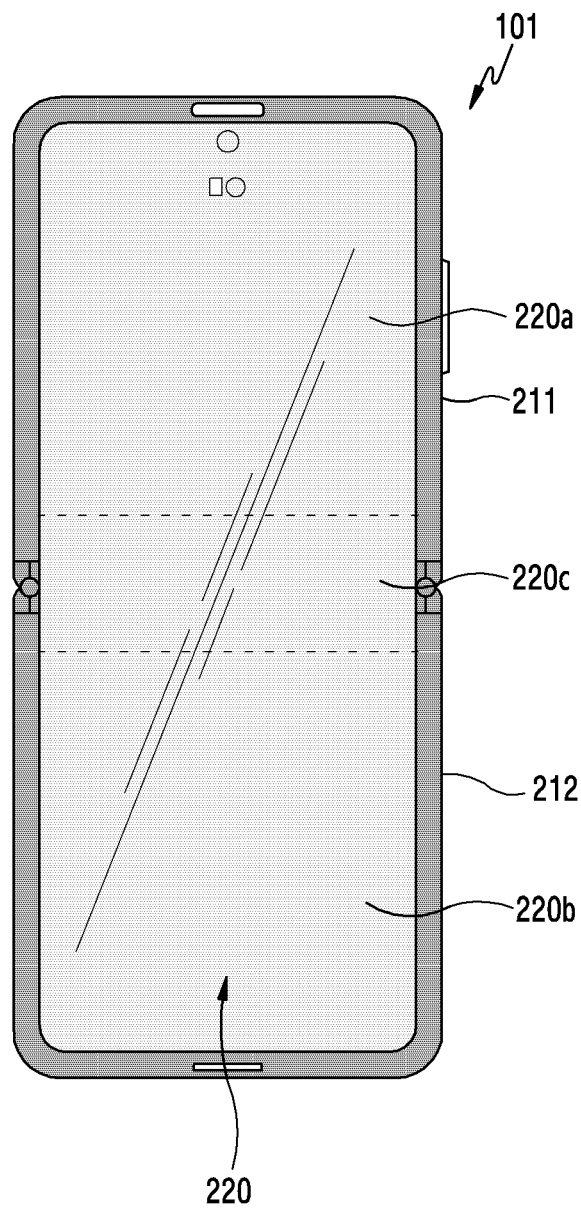
Figure 3C:
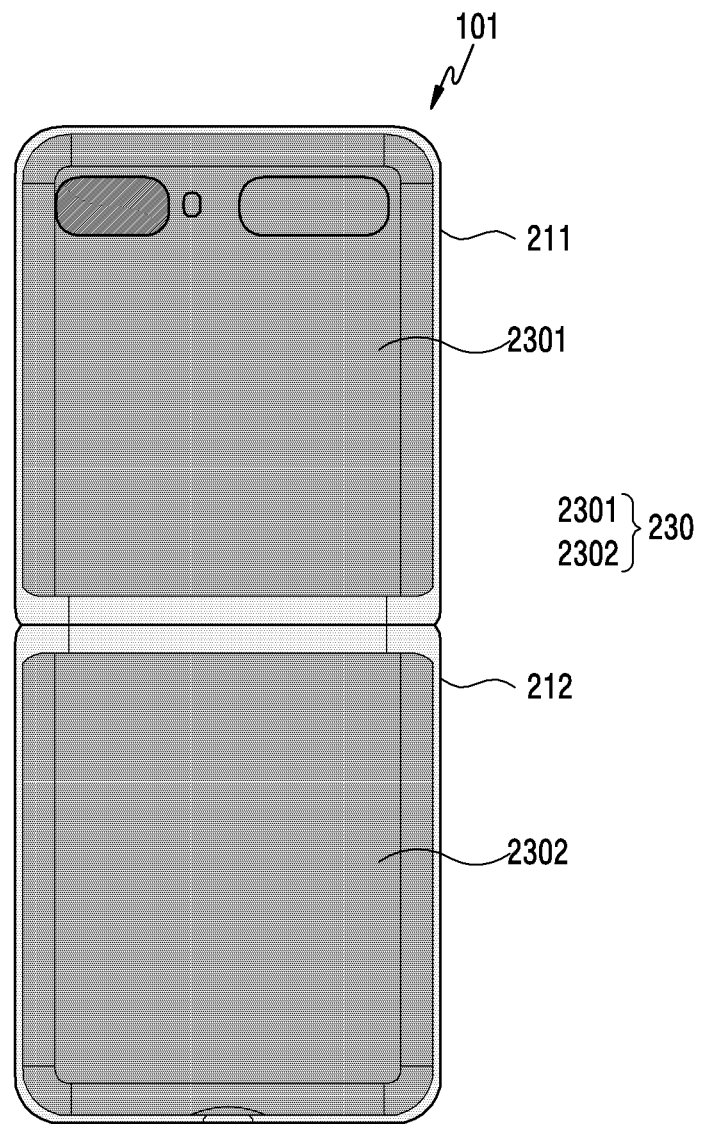

FIGS. 3A to 3C illustrate a foldable electronic device in a 180-degree unfolded state according to an embodiment. Specifically, FIG. 3A illustrates a perspective view, FIG. 3B illustrates a front view, and FIG. 3C illustrates a rear view.

Referring to FIGS. 2A to 3C, an electronic device 101 includes a foldable housing 210 (or a "housing") including a first housing 211 and a second housing 212, a flexible display 220, a hinge assembly 300, and a cover 230 (or a "rear cover"). The cover 230 includes a first cover 2301 included in the first housing 211 and a second cover 2302 included in the second housing 212.

The first housing 211 and the second housing 212 may construct a space in which electronic components (e.g., a PCB, a battery, a processor, etc.) of the electronic device 101 can be disposed, and may construct a side face of the electronic device 101. Various types of components for performing various functions of the electronic device 101 may be disposed inside the first housing 211 and the second housing 212. For example, a front camera, a receiver, a sensor (e.g., a proximity sensor), etc., may be disposed inside the first housing 211 and the second housing 212. Electronic components may also be exposed to a front face of the electronic device 101 through at least one opening 220d or recess prepared on the flexible display 220.

The first housing 211 and the second housing 212 may be disposed in parallel to each other when the electronic device 101 is in an unfolded state. When the electronic device 101 is in the folded state, the first housing 211 may rotate (or turn) with respect to the second housing 212, so that one face of the first housing 211 faces one face of the second housing 212.

The first housing 211 and the second housing 212 may construct a recess for accommodating the flexible display 220, and the flexible display 220 may be supported by the first housing 211 and the second housing 212 by being mounted to the recess. Alternatively, the flexible display 220 may be supported by a first support plate and/or second support plate located between the flexible display 220 and first and second housings 211 and 212, as will be described below with reference to FIG. 4A. The first housing 211 and the second housing 212 may be constructed of a metal material and/or non-metal material having a specified rigidity to support the flexible display 220.

The flexible display 220 may be disposed on the first housing 211 and the second housing 212 to construct a front face of the electronic device 101 when the electronic device 101 is in the unfolded state. That is, the flexible display 220 may be disposed by extending up to at least one region of the second housing 212 across the hinge assembly 300 from one region of the first housing 211. The flexible display 220 may be disposed on the first housing 211 and the second housing 212 by being mounted to the recess constructed by the first housing 211 and the second housing 212.

The flexible display 220 includes a first region 220a corresponding to at least one region of the first housing 211, a second region 220b corresponding to at least one region of the second housing 212, and a folding region 220c located between the first region 220a and the second region 220b and having a flexible characteristic. However, the disclosure is not limited to the aforementioned embodiment, and the first region 220a, second region 220b, and folding region 220c of the flexible display 220 may be constructed to have the flexible characteristic. The first region 220a, the folding region 220c, and the second region 220b may be disposed in parallel to face the same direction, when the electronic device 101 is in the unfolded state. When the electronic device 101 is in the folded state, the folding region 220c may be bent such that the first region 220a and the second region 220b are disposed to face each other.

At least one region (e.g., the first region 220a, the second region 220b) of the flexible display 220 may be attached to one face of the first housing 211 and one face of the second housing 212. Alternatively, the flexible display 220 may be attached to one face of the first housing 211 and one face of the second housing 212 through the support plates 221 and 222 located between the flexible display 220 and the first and second housings 211 and 212.

The support plates 221 and 222 may include the first support plate 221 attached to at least one region of the first housing 211 to support the first region 220a of the flexible display 220 and the second support plate 222 attached to at least one region of the second housing 212 to support the second region 220b of the flexible display 220. The first support plate 221 may be attached to at least one portion of the first region 220a of the flexible display 220 to support the flexible display 220. Similarly, the second support plate 222 may be attached to at least one portion of the second region 220b of the flexible display 220 to support the flexible display 220. The first support plate 221 and the second support plate 222 may be constructed of a material having a rigidity to support the flexible display 220.

The hinge assembly 300 couples the first housing 211 and the second housing 212, and may rotate the second housing 212 about the first housing 211 within a specified rotation range, or on the contrary, may rotate the first housing 211 about the second housing 212 within a specified rotation range.

A recess 211c may be constructed in a region where the first housing 211 and the second housing 212 are coupled, so that the hinge assembly 300 is disposed between the first housing 211 and the second housing 212. The aforementioned recess 211c may be constructed in a shape of a groove having a specific coverture, but is not limited thereto.

A hinge housing 300c may be disposed between the first and second housings 211 and 212, and the hinge assembly 300 may be assembled to the hinge housing 300c. The hinge housing 300c may be visible to the outside of the electronic device 101 according to a state of the electronic device 101, or may be hidden by the foldable housing 210. For example, referring to FIG. 3C, when the electronic device 101 is in the unfolded state, the hinge housing 300c is hidden by the folding housing 210, and thus may be invisible to the outside of the electronic device 101. As another example, e.g., as illustrated in FIGS. 2A to 2C, when the electronic device 101 is in the folded state, the hinge housing 300c may be visible to the outside of the electronic device 101 due to a rotation of the first housing 211 and second housing 212.

The cover 230 may be located at a lower end of the first housing 211 and second housing 212 to construct a rear face of the electronic device 101. The cover 230 may include the first cover 2301 coupled to the first housing 211 and the second cover 2302 coupled to the second housing 212. The first cover and the first housing 211 may be constructed integrally, and the second cover and the second housing 212 may also be constructed integrally.

Figure 4A:
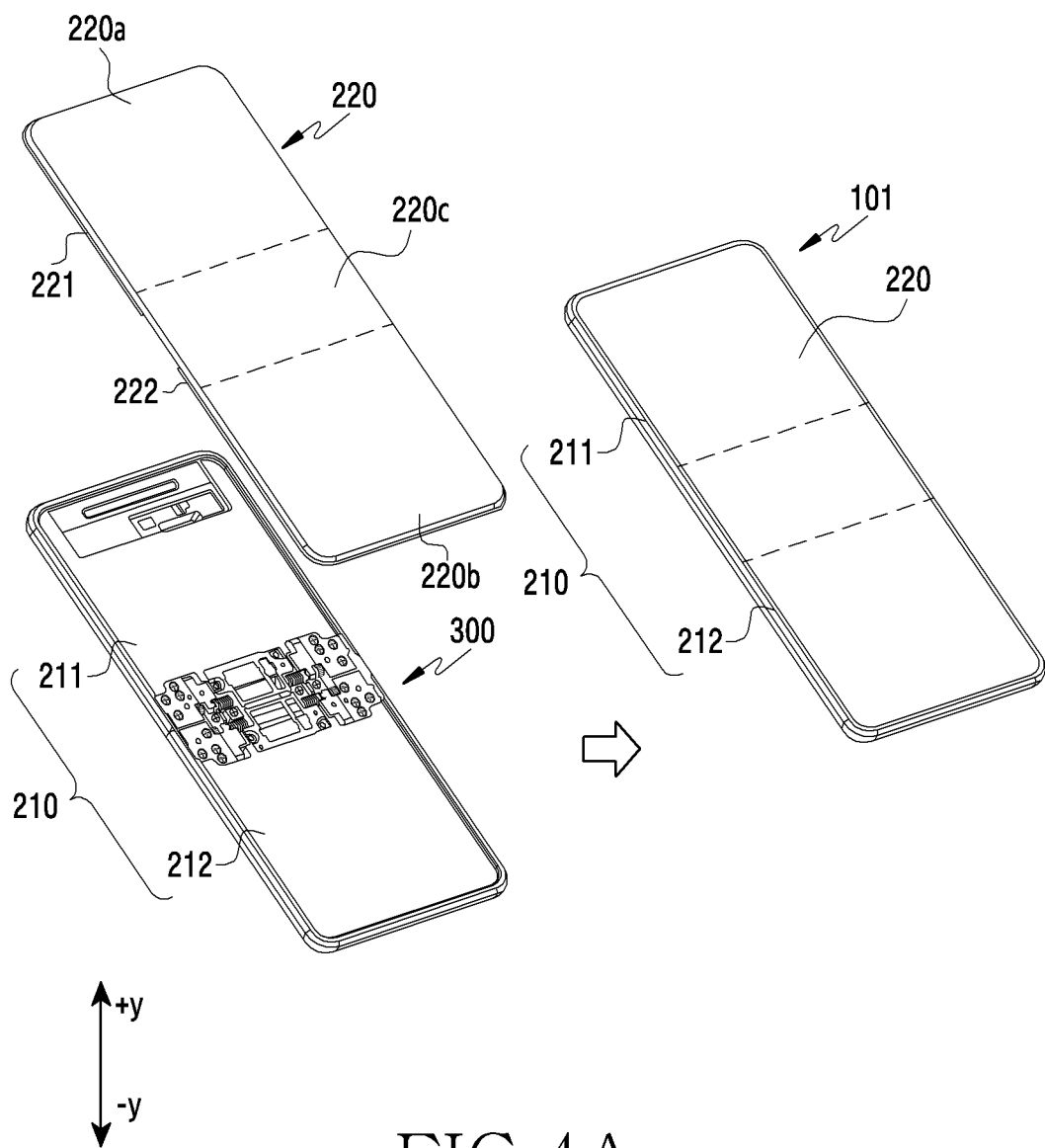
FIG. 4A illustrates an exploded view of an electronic device in an unfolded state according to an embodiment.

FIG. 4A illustrates an exploded view of an electronic device in an unfolded state according to an embodiment.

Figure 4B:
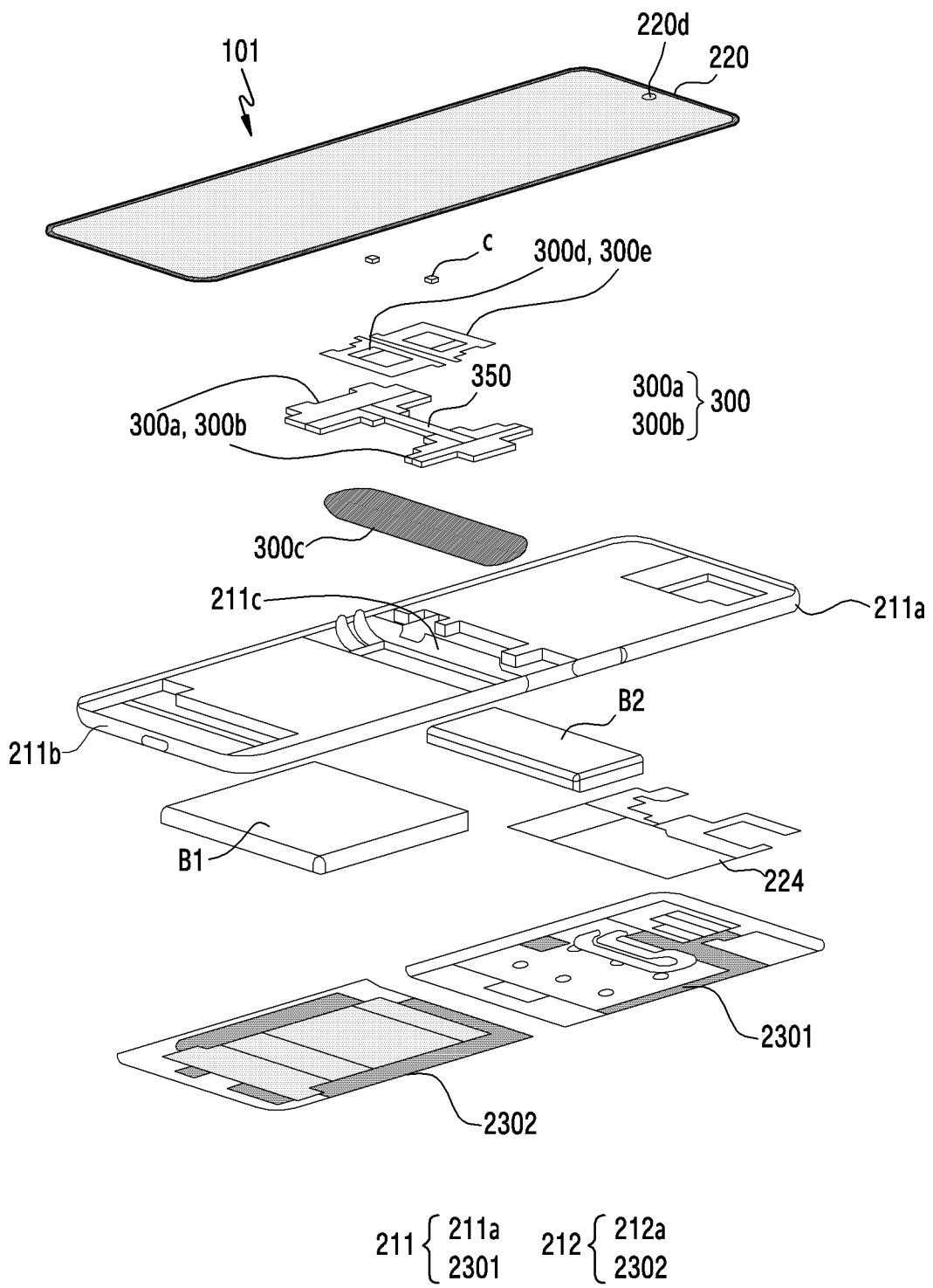
FIG. 4B illustrates an exploded perspective view of an inner structure of an electronic device according to an embodiment.

FIG. 4B illustrates an exploded perspective view illustrating an inner structure of an electronic device according to an embodiment.

Referring to FIGS. 4A and 4B, a foldable electronic device includes a flexible display 220, first and second housings 211 and 212, a hinge assembly 300, batteries B1 and B2, and at least one PCB 224.

A foldable housing 210 may include a first housing 211 and a second housing 212. The first and second housings 211 and 212 may be physically coupled by the hinge assembly 300 in a rotatable manner. The first housing 211 may include a first lateral member 211a and a first cover 2301 coupled to the first lateral member 211a, and the second housing 212 may include a second lateral member 212a and a second cover 2302 coupled to the second lateral member 212a.

The first battery B1 is disposed to the first housing 211 and the second battery B2 is disposed to the second housing 212. The second battery B2 may have a greater capacity than the first battery B1, and may be heavier than the first battery B1.

The PCB may include a main PCB and a sub PCB for electrically coupling at least one first electronic component disposed to the first housing 211 and at least one second electronic component disposed to the second housing 212. For example, the sub PCB may be an FPCB disposed via the hinge housing 300c.

The hinge assembly 300 includes hinge structures 300a and 300b. The hinge structures 300a and 300b may be disposed to a hinge housing 300c. First and second hinge plates 300d and 300e may be disposed respectively to the first and second housings 211 and 212. A cap 'c' may be coupled to a support portion of the hinge structure. The hinge structures 300a and 300b may provide a rotation axis of the first and second housings 211 and 212, and may provide force for maintaining a state of the electronic device at a specific angle, e.g., 0, 45, 90, or 180 degrees.

Figure 5A:
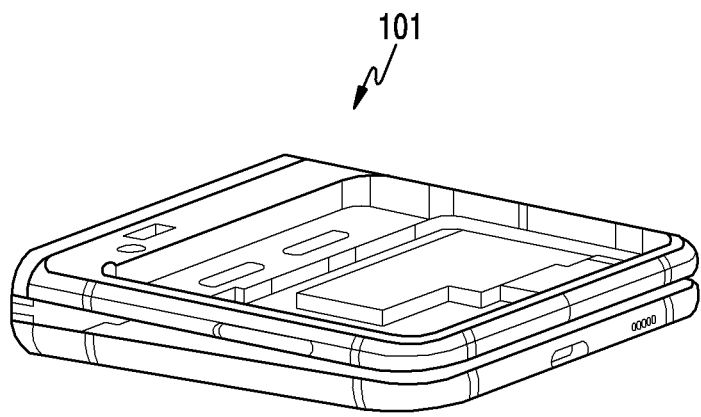
FIGS. 5A to 5C illustrate a process of opening/closing an electronic device according to an embodiment.
Figure 5B:
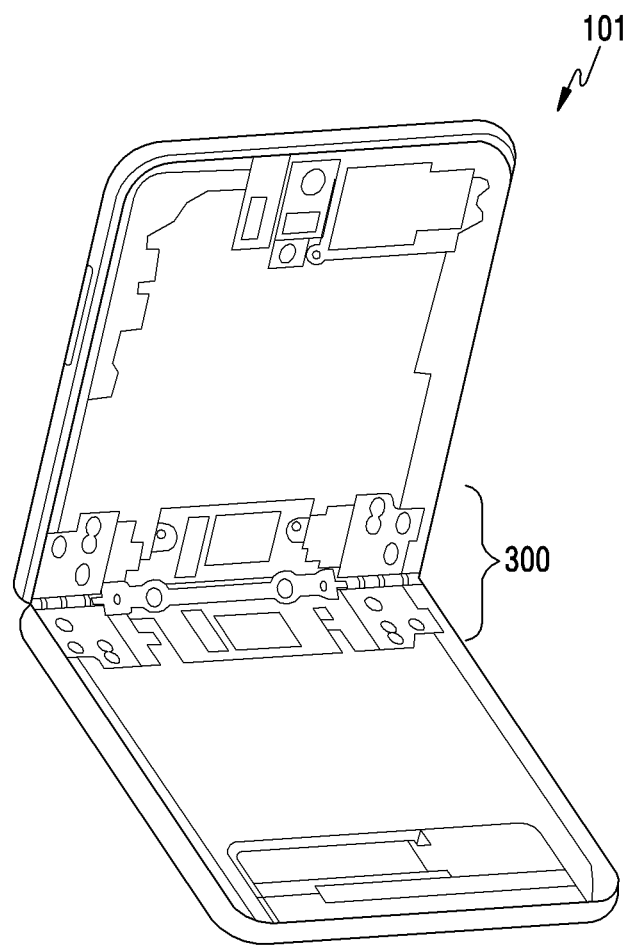
Figure 5C:
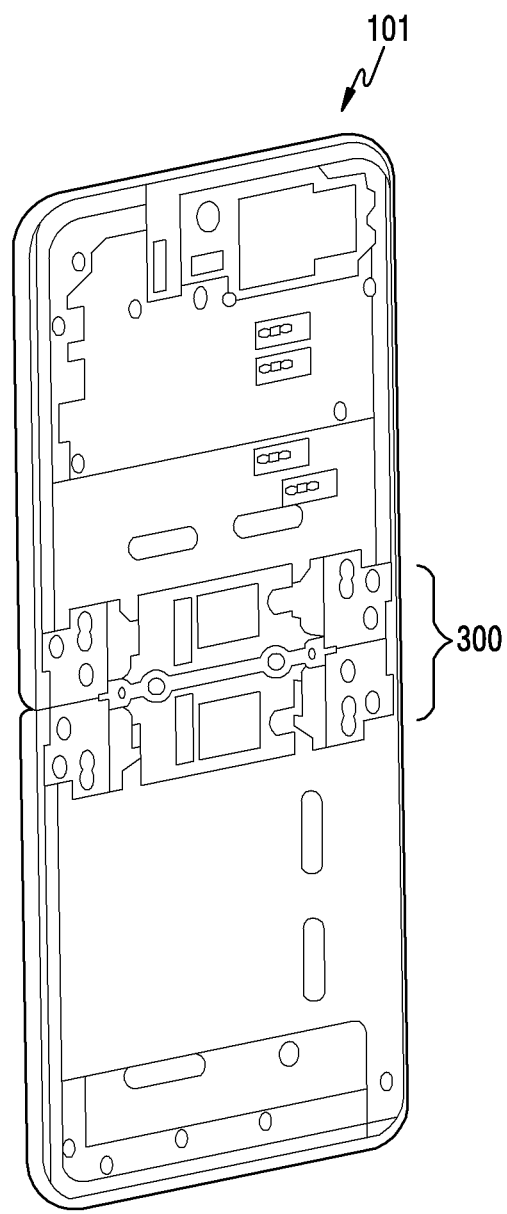

FIGS. 5A to 5C illustrate a process of opening/closing an electronic device according to an embodiment. Specifically, FIG. 5A illustrates a perspective view of a folded state, FIG. 5B illustrates a perspective view of an open state of approximately 90 degrees, and FIG. 5C illustrates a perspective view of an open state of approximately 180 degrees.

Referring to FIGS. 5A to 5C, a hinge assembly 300 included in an electronic device 101 is in a folded (closed) state in FIG. 5A, a 180-degree unfolded (open) state in FIG. 5C, and an approximately 90-degree unfolded (open) state in FIG. 5B.

The hinge assembly 300 may provide force capable of maintaining a closed state, a 180-degree open state, or an approximately 90-degree open state by a cam operation in an opening/closing operation. For example, the operation of the hinge assembly 300 may be provided by a mutual cam operation between hinge cams included in a hinge structure. Maintaining force may be provided at various opening/closing degrees of the electronic device 101 by changing a cam shape of the hinge cam.

Figure 6:
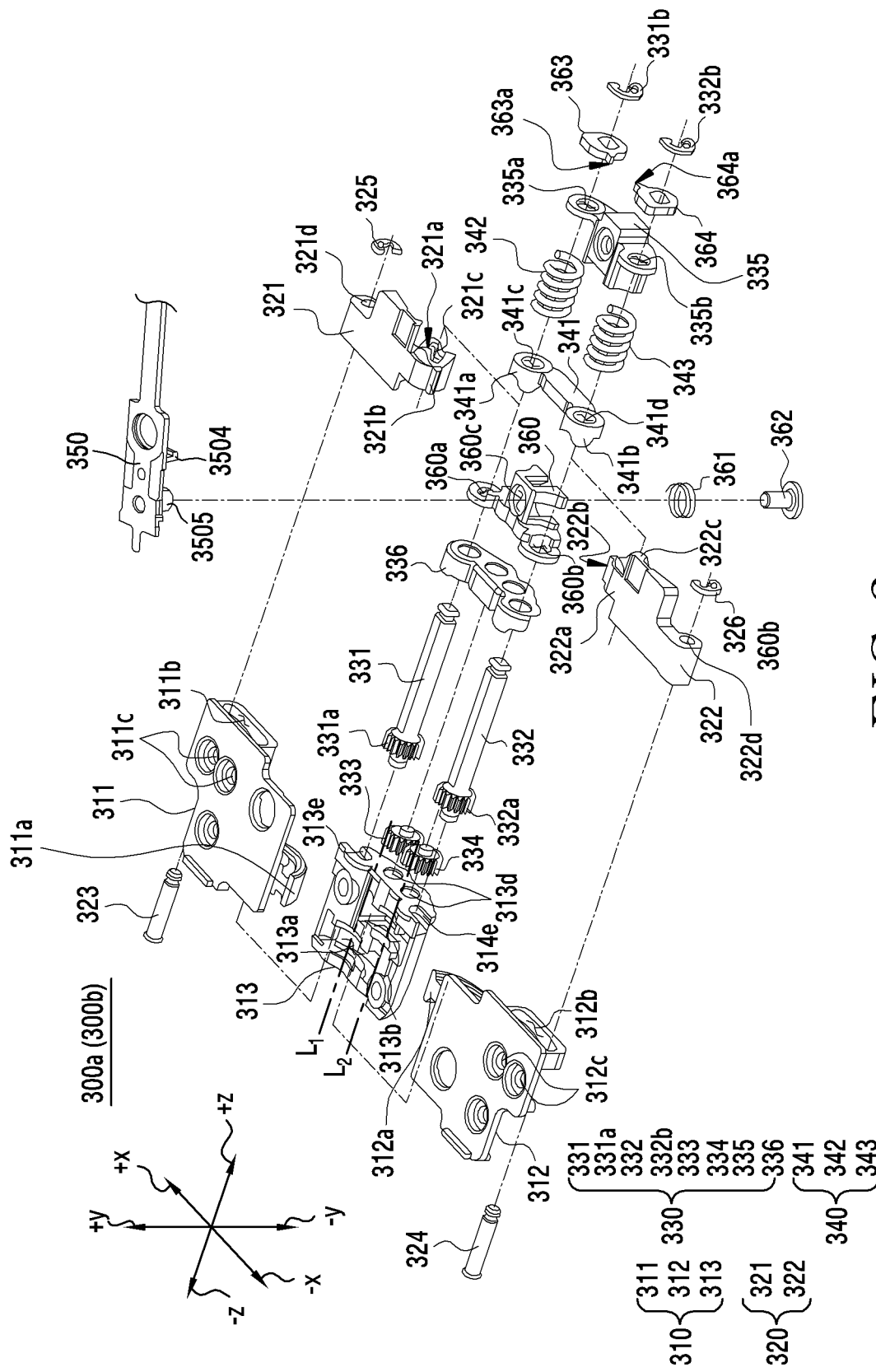
FIG. 6 illustrates an exploded perspective view of a hinge structure according to an embodiment.

FIG. 6 illustrates an exploded perspective view of a hinge structure according to an embodiment.

Referring to FIG. 6, a hinge structure 300a or 300b includes a bracket structure 310, an arm structure 320, a rotation structure 330, a detent structure 340, a support portion 350, a stopper 360, an elastic member 361, and a screw 362. At least one of components of the hinge structure 300a or 300b of FIG. 6 may be identical or similar to at least one of components of the hinge structure 300a or 300b of FIG. 4, and redundant descriptions will be omitted hereinafter.

The bracket structure 310 includes a first bracket 311, a second bracket 312, and a fixing bracket 313.

The fixing bracket 313 may be disposed to a hinge housing to support the first bracket 311 and the second bracket 312. A first groove 313a and a second groove 313b may be constructed in an upper face of the fixing bracket 313 (e.g., a face of the +y direction), and the first bracket 311 and the second bracket 312 may be coupled to the fixing bracket 313 through the first groove 313a and the second groove 313b. The first groove 313a and the second groove 313b may be constructed in an arc shape having a specific curvature, the first bracket 311 may be coupled to the first groove 313a, and the second bracket 312 may be coupled to the second groove 313b. Although the first groove 313a and the second groove 313b are constructed in an arc shape having the same curvature, in FIG. 6, the first groove 313a and the second groove 313b may be constructed in arc shapes having different curvatures. The first groove 313a may be constructed in one region (e.g., a region of the +x direction) of the fixing bracket 313 adjacent to the first bracket 311, and the second groove 313b may be constructed in another region of the fixing bracket 313 adjacent to the second bracket 312.

A plurality of gear holes 313d and a plurality of shaft holes 313e may be constructed in one side face (e.g., a face of the +z direction) of the fixing bracket 313. First and second idle gears 333 and 334 may be fastened to first and second shifts 331 and 332 on one side face of the fixing bracket 313 through the aforementioned gear hole 313d and shaft hole 313e.

The first bracket 311 includes a first rail portion 311a, a first slide hole 311b, and a plurality of coupling holes 311c. The first rail portion 311a may be constructed to protrude in one region of the first bracket 311. The first rail portion 311a may be constructed in a shape corresponding to the first groove 313a of the fixing bracket 313, and the first bracket 311 may be coupled to the first groove 313a of the fixing bracket 313 through the first rail portion 311a. The first slide hole 311b may be constructed in one region of the first bracket 311 adjacent to a first arm 321, and the first bracket 311 and the first arm 321 may be coupled through a first fixing portion 323 which passes through the first slide hole 311b and the first arm 321. The first fixing portion 323 may be slid inside the first slide hole 311b as the electronic device rotates from the folded state to the unfolded state or rotates from the unfolded state to the folded state.

The plurality of coupling holes 311c may be constructed in one face (e.g., a face of the +y direction) facing a first housing of the first bracket 311, and the first bracket 311 may be coupled to one region of the first housing through the plurality of coupling holes 311c. The first bracket 311 coupled to the first housing may be slid along the first groove 313a of the fixing bracket 313 with the rotation of the first housing, and may rotate about a virtual first rotation axis L1.

The second bracket 312 includes a second rail portion 312a, a second slide hole 312b, and a plurality of coupling holes 312c. The second rail portion 312a may be constructed to protrude in one region of the second bracket 312. The second rail portion 312a may be constructed in a shape corresponding to the second groove 313b of the fixing bracket 313, and the second bracket 312 may be coupled to the second groove 313b of the fixing bracket 313 through the second rail portion 312a. The second slide hole 312b may be constructed in one region of the second bracket 312 adjacent to a second arm 322, and the second bracket 312 and the second arm 322 may be coupled through a second fixing portion 324 which passes through the second slide hole 312b and the second arm 322. The second fixing portion 324 may be slid inside the second slide hole 312b as the electronic device rotates from the folded state to the unfolded state or rotates from the unfolded state to the folded state.

The plurality of coupling holes 312c may be constructed in one face (e.g., a face of the +y direction) facing a second housing of the second bracket 312, and the second bracket 312 may be coupled to one region of the second housing through the plurality of coupling holes 312c. The second bracket 312 coupled to the second housing may be slid along the second groove 313b of the fixing bracket 313 with the rotation of the second housing, and may rotate about a virtual second rotation axis L2. In this case, the virtual first rotation axis L1 and the virtual second rotation axis L2 are parallel, and may be constructed in a flat face parallel to the flexible display when the electronic device is in the folded state.

The arm structure 320 includes the first arm 321 and the second arm 322.

The first arm 321 includes a first cam portion 321a, a first support rib 321b, a first insertion hole 321c, and a first through-hole 321d. The first insertion hole 321c may be constructed in one region of a lower end (e.g., the −y direction) of the first arm 321, and the first shaft 331 to be described below may be inserted to the first insertion hole 321c to couple the first arm 321 and the first shaft 331. As the first arm 321 and the first shaft 331 are coupled, the first arm 321 may rotate about a rotation axis of the first shaft 331.

The first cam portion 321a may be constructed in a region adjacent to the first insertion hole 321c, and may be constructed to protrude in a direction of a detent plate 341 (e.g., the +z direction). The first cam portion 321a may be constructed in a concavo-convex shape in which a plurality of peaks and valleys are repeated, and the first cam portion 321a may be disposed to be engaged with a detent portion 341a constructed in the detent plate 341 to provide a cam operation to the first arm 321. In addition, since the first cam portion 321a may be disposed to be engaged with the detent portion 341a constructed in the detent plate 341, the first arm 321 may be fixed at a specified rotation angle and/or in a specified rotation angle range. As a result, a movement of the electronic device may be fixed at the specified rotation angle and/or in the specified rotation angle range (e.g., the range from 30° to 150°).

The first support rib 321b may be constructed to protrude from one region of the first arm 321, and may move the support portion 350 in an upper direction (e.g., the +y direction) when the electronic device rotates from the folded state to the unfolded state. The first through-hole 321d may be constructed in one region (e.g., a region of the +x direction) in the opposite side of a region in which the first insertion hole 321c of the first arm 321 is constructed. The first fixing portion 323 passing through the first slide hole 311b may pass through the first through-hole 321d to couple the first bracket 311 and the first arm 321. A first washer ring 325 may be fastened to one end of the first fixing portion passing through the first through-hole 321d, so that the first fixing portion 323 is fixed to the first arm 321.

Alternatively, the first washer ring 325 may be fastened to the other end of the first fixing portion 323, so that the first fixing portion 323 is fixed to the first bracket 311. In addition, a protrusion may be constructed in one region of the first bracket 311 (or the first arm 321), and a coupling groove corresponding to the protrusion may be constructed in one region of the first arm 321 (or the first bracket 311), so that the first bracket 311 and the first arm 321 are coupled with the protrusion through the coupling groove. The first arm 321 coupled with the first bracket 311 may rotate about a rotation axis different from that of the first bracket 311 while sliding with respect to the first bracket 311, while the electronic device rotates from the folded state to the unfolded state or rotates from the unfolded state to the folded state.

The second arm 322 includes a second cam portion 322a, a second support rib 322b, a second insertion hole 322c, and a second through-hole 322d. The second insertion hole 322c may be constructed in one region of a lower end (e.g., the −y direction) of the second arm 322, and the second shaft 332 to be described below may be inserted to the second insertion hole 322c to couple the second arm 322 and the second shaft 332. As the second arm 322 and the second shaft 332 are coupled, the second arm 322 may rotate about a rotation axis of the second shaft 332. The second cam portion 322a may be constructed in a region adjacent to the second insertion hole 322c, and may be constructed to protrude in a direction of the detent plate 341 (e.g., the +z direction). Similarly to the first cam portion 321a, the second cam portion 322a may be constructed in a concavo-convex shape in which a plurality of peaks and valleys are repeated, and the second cam portion 322a may be disposed to be engaged with a detent portion 341b constructed in the detent plate 341 to provide a cam operation to the second arm 322. In addition, since the second cam portion 322a may be disposed to be engaged with the detent portion 341b constructed in the detent plate 341, the second arm 322 may be fixed at a specified rotation angle and/or in a specified rotation angle range. As a result, a movement of the electronic device may be fixed at the specified rotation angle and/or in the specified rotation angle range (e.g., the range from 30° to 150°).

The second support rib 322b may be constructed to protrude from one region of the second arm 322, and may move the support portion 350 in an upper direction (e.g., the +y direction) when the electronic device rotates from the folded state to the unfolded state. The second through-hole 322d may be constructed in a region in the opposite side of the second insertion hole 322c. The second fixing portion 324 passing through the second slide hole 312b may pass through the second through-hole 322d to couple the second bracket 312 and the second arm 322. A second washer ring 326 may be fastened to one end of the second fixing portion passing through the second through-hole 322d, so that the second fixing portion 324 is fixed to the second arm 322. Alternatively, the second washer ring 326 may be fastened to the other end of the second fixing portion 324, so that the second fixing portion 324 is fixed to the second bracket 312. In addition, a protrusion may be constructed in one region of the second bracket 312 (or the second arm 322), and a coupling groove corresponding to the protrusion may be constructed in one region of the second arm 322 (or the second bracket 312), so that the second bracket 312 and the second arm 322 are coupled with the protrusion through the coupling groove. The second arm 322 coupled with the second bracket 312 may rotate about a rotation axis different from that of the first bracket 312 while sliding with respect to the second bracket 312, while the electronic device rotates from the folded state to the unfolded state or rotates from the unfolded state to the folded state.

The rotation structure 330 includes the first shaft 331 coupled with a first gear 331a, the second shaft 332 coupled with a second gear 332a, the first idle gear 333, the second idle gear 334, a shaft bracket 335, and a gear cover 336.

One end of the first shaft 331 may be fastened to the shaft hole 313e of the fixing bracket 313, and the other end of the first shaft 331 may pass through a first shaft insertion hole 335a of the shaft bracket 335. The first arm 321 may be coupled to one region of the first shaft 331, and the first arm 321 may rotate about the first shaft 331 as the rotation axis.

The second shaft 332 may be disposed to a position adjacent to the first shaft 331. One end of the second shaft 332 may be fastened to the shaft hole 313e of the fixing bracket 313, and the other end of the second shaft 332 may pass through a second shaft insertion hole 335b of the shaft bracket 335. The second arm 322 may be coupled to one region of the second shaft 332, and the second arm 322 may rotate about the second shaft 332 as the rotation axis.

The first idle gear 333 and the second idle gear 334 may be disposed between the first gear 331a coupled to the first shaft 331 and the second gear 332a coupled to the second shaft 332. The first idle gear 333 and the second idle gear 334 may be fastened to the plurality of gear holes 313d of the fixing bracket 313, and the first idle gear 333 and the second idle gear 334 may rotate by being engaged with each other so that the first arm 321 and the second arm 322 rotate by the same rotation angle. The first idle gear 333 may rotate by being engaged with the first gear 331a and the second idle gear 334, and the second idle gear 334 may rotate by being engaged with the first idle gear 333 and the second gear 332a.

As the first gear 331, second gear 332a, first idle gear 333, and second idle gear 334 rotate by the same rotation angle by being engaged with one another, the first shaft 331 and the second shaft 332 may rotate by the same rotation angle in opposite directions. When the first shaft 331 rotates by 300 counterclockwise (e.g., a direction from the +x axis to the +y axis), the second shaft 332 may rotate by 300 clockwise. As the first shaft 331 and the second shaft 332 rotate by the same rotation angle, the first arm 321 and second arm 322 coupled to the first shaft 331 and second shaft 332 may rotate by the same rotation angle.

The shaft bracket 335 may include the first shaft insertion hole 335a to which the first shaft 331 is inserted and the second shaft hole 335b to which the second shaft 332 is inserted. The shaft bracket 335 may be disposed inside a hinge housing to support the first shaft 331 and second shaft 332 inserted to the shaft bracket 335 through the first shaft hole 335a and the second shaft hole 335b.

The gear cover 336 may be inserted to the first shaft 331 and the second shaft 332 to protect the first gear 331a, the second gear 332a, the first idle gear 333, and the second idle gear 334. The gear cover 336 may prevent the first gear 331a, the second gear 332a, the first idle gear 333, and the second idle gear 334 from being damaged by external force, and may prevent foreign material from entering the first gear 331a, the second gear 332a, the first idle gear 333, and the second idle gear 334.

The detent structure 340 includes the detent plate 341, a first spring 342, and a second spring 343.

A third shaft insertion hole 341c to which the first shaft 331 is inserted may be constructed in one region of the detent plate 341, and a fourth shaft insertion hole 341d to which the second shaft 332 is inserted may be constructed in another region of the detent plate 341. The detent plate 341 may be coupled to the first shaft 331 and the second shaft 332 through the third shaft insertion hole 341c and the fourth shaft insertion hole 341d. The detent plate 341 includes first detent portion 341a constructed to protrude in a direction of the first cam portion 321a of the first arm 321 and the second detent portion 341b constructed to protrude in a direction of the second cam portion 322a of the second arm 322. The first detent portion 341a and the second detent portion 341b may be constructed in a concavo-convex structure in which at least one peak and valley appear repeatedly. The first detent portion 341a may be disposed to be engaged with the first cam portion 321a, and thus, when the electronic device is in the folded state or the unfolded state, may provide a cam operation to the first arm 321 and fix a movement of the first arm 321 at a specified rotation angle. Similarly, the second detent portion 341b may be disposed to be engaged with the second cam portion 322a and thus, when the electronic device is in the folded state or the unfolded state, may provide a cam operation to the second arm 322 and fix a movement of the second arm at a specified rotation angle.

A pitch between a peak and another peak or between a valley and another valley of the first detent portion 341a may be greater than a pitch between a peak and another peak or between a valley and another valley of the first cam portion 321a, so that the first arm 321 is rotatable within a specified rotation range even in a state in which the first detent portion 341a and the first cam portion 321a are engaged. However, a shape of the first detent portion 341a is not limited to the aforementioned example. The pitch between the peaks or valleys of the first detent portion 341a may be constructed to be identical to the pitch between the peaks or valleys of the first cam portion 321a or the pitch between the peaks or valleys of the first cam portion 321a may be constructed to be greater than the pitch between the peaks or valleys of the first detent portion 341a.

Similarly, a pitch between a peak and another peak or between a valley and another valley of the second detent portion 341b may be greater than a pitch between a peak and another peak or between a valley and another valley of the second cam portion 322a, so that the second arm 322 is rotatable within a specified rotation range even in a state in which the second detent portion 341b and the second cam portion 322a are engaged. However, a shape of the second detent portion 341b is not limited to the aforementioned example. The pitch between the peaks or valleys of the second detent portion 341b may be constructed to be identical to the pitch between the peaks or valleys of the second cam portion 322a or the pitch between the peaks or valleys of the second cam portion 322a may be constructed to be greater than the pitch between the peaks or between the valleys of the second detent portion 341b.

The first spring 342 may be disposed to surround one region of the first shaft 331, and the second spring 343 may be disposed to surround one region of the second shaft 332. The first spring 342 and the second spring 343 may be disposed in a state of being compressed between the detent plate 341 and the shaft bracket 335, so that the detent plate 341 is closely in contact in a direction of the first arm 321 and the second arm 322. As the detent plate 341 is closely in contact in a direction of the first arm 321 and the second arm 322, it is possible to maintain a state in which the first detent portion 341a and the first cam portion 321a are engaged and a state in which the second detent portion 341b and the second cam portion 322a are engaged.

When the peak of the first detent portion 341a and the peak of the first cam portion 321a or the peak of the second detent portion 341b and the peak of the second cam portion 322a are in contact due to a rotation of the first arm 321 and the second arm 322, the detent plate 341 may move in one direction of the first shaft 331 and second shaft 332 (e.g., the +z direction), so that the first cam portion 321a and the first detent portion 341a and/or the second cam portion 322a and the second detent portion 341b are temporarily spaced apart. As the detent plate 341 moves in one direction, the first spring 342 and the second spring 343 may be compressed. When the first arm 321 and the second arm 322 further rotate by a specific angle, the detent plate 341 may move again in a direction of the first cam portion 321a and/or the second cam portion 322a due to elastic restoration force of the first spring 342 and second spring 343. As a result, the first cam portion 321a and the first detent portion 341a may be disposed in a state of being engaged again with the second cam portion 322a and the second detent portion 341b, thereby maintaining a state in which the first cam portion 321a and the first detent portion 341a are engaged and the second cam portion 322a and the second detent portion 341b are engaged.

A flat linear region may be constructed in at least one region (e.g., a summit region) of the peak of the first cam portion 321a, the peak of the second cam portion 322a, the peak of the first detent portion 341a, and/or the peak of the second detent portion 341b. Similarly, a flat linear region may also be constructed in at least one region of the valley of the first cam portion 321a, the valley of the second cam portion 322a, the valley of the first detent portion 341a, and/or the valley of the second detent portion 341b. The linear region constructed in one region of the peak and the linear region constructed in one region of the valley may be constructed to be substantially identical or similar. As the linear region is constructed in the peaks and valleys of the first cam portion 321, second cam portion 322a, first detent portion 341a, and second detent portion 341b, a movement of the first arm 321 and/or second arm 322 may be fixed at a specified rotation angle (e.g., 300 or 60°) and/or in a specified rotation angle range (e.g., a rotation angle range of 30° to 150°). As the movement of the first arm 321 and/or second arm 322 is fixed at the specified rotation angle, a movement of a first housing and second housing of the electronic device may be fixed at the specified rotation angle.

The support portion 350 may be disposed to an empty space between the first and second arms 321 and 322 and the first and second shafts 321 and 332. When the electronic device is in an unfolded state, the support portion 350 may support one region of a flexible display not supported by the first arm 321 and/or the second arm 322. The support portion 350 may move in an upper direction (e.g., the +y direction) by using the first arm rib 321b constructed in one region of the first arm 321 and the second support rib 322b constructed in one region of the second arm 322. While the electronic device rotates from the folded state to the unfolded state, the first support rib 321b and the second support rib 322b may be in contact with one region of the support portion 350, and the support portion 350 may move in an upper direction (e.g., in a direction from the −y axis to the +y axis) by the first support rib 321b and the second support rib 322b with the rotation of the first arm 321 and the second arm 322.

The stopper 360 may be located at a lower end of the support portion 350 (e.g., the −y direction). A fifth shaft insertion hole 360a may be constructed in one region of the stopper 360, and a sixth shaft insertion hole 360b may be constructed in one region in the opposite side of the fifth shaft insertion hole 360a. The first shaft 331 and the second shaft 332 may be inserted through the fifth shaft insertion hole 360a and the sixth shaft insertion hole 360b, and the first shaft 331, the second shaft 332, and the stopper 360 may be coupled through the aforementioned structure. A through-hole 360c may be constructed in one region of an upper end of the stopper 360 (e.g., the +y direction), and an elastic support portion 3505 of the support portion 350 may be inserted in a lower direction of the stopper 360 by passing through the through-hole 360c.

The screw 362 may be coupled with the elastic support portion 3505 inserted to the lower end of the stopper 360, and the elastic member 361 may be disposed between the screw 362 and the stopper 360. The elastic member 361 may be a spring, but is not limited thereto. The elastic member 361 may be in contact with one region of the stopper 360, and the elastic member 361 may be compressed while the support portion 350 moves in an upper direction while the electronic device rotates from the folded state to the unfolded state. While the electronic device rotates from the unfolded state to the folded state, the support portion 350 may move in a lower direction (e.g., the -y direction) due to elastic restoration force of the elastic member 361.

The hinge structure 300a or 300b further includes a first auxiliary member 363 and a second auxiliary member 364. The first auxiliary member 363 may be fastened to one end of the first shaft 331 adjacent to the shaft bracket 335, and the second auxiliary member 364 may be fastened to one end of the second shaft 332 adjacent to the shaft bracket 335. A third washer ring 331b may be fastened to one end of the first shaft 331, and thus the first shaft 331 may be fixed to the first auxiliary member 363. Similarly, a fourth washer ring 332b may be fastened to one end of the second shaft 332, and thus the second shaft 332 may be fixed to the second auxiliary member 364. A screw nut may be fastened to one end of the first shaft 331 so that the first shaft 331 is fixed to the first auxiliary member 363, or a screw nut may also be fastened to one end of the second shaft 332 so that the second shaft 332 is fixed to the second auxiliary member 364.

The first auxiliary member 363 includes a third support rib 363a, and the third support rib 363a may be constructed to protrude from one region of the first auxiliary member 363. The second auxiliary member 364 includes a fourth support rib 364a, and the fourth support rib 364a may be constructed to protrude from one region of the second auxiliary member 364. The first auxiliary member 363 may rotate by the same rotation angle as the first arm 321 through the first shaft 331, and the second auxiliary member 364 may rotate by the same rotation angle as the second arm 322 through the second shaft 332. When the electronic device rotates from the folded state to the unfolded state, the third support rib 363a and the fourth support rib 364a may allow the support portion 350 to move in an upper direction together with the first support rib 321b of the first arm 321 and the second support rib 322b of the second arm 322.

Figure 7A:
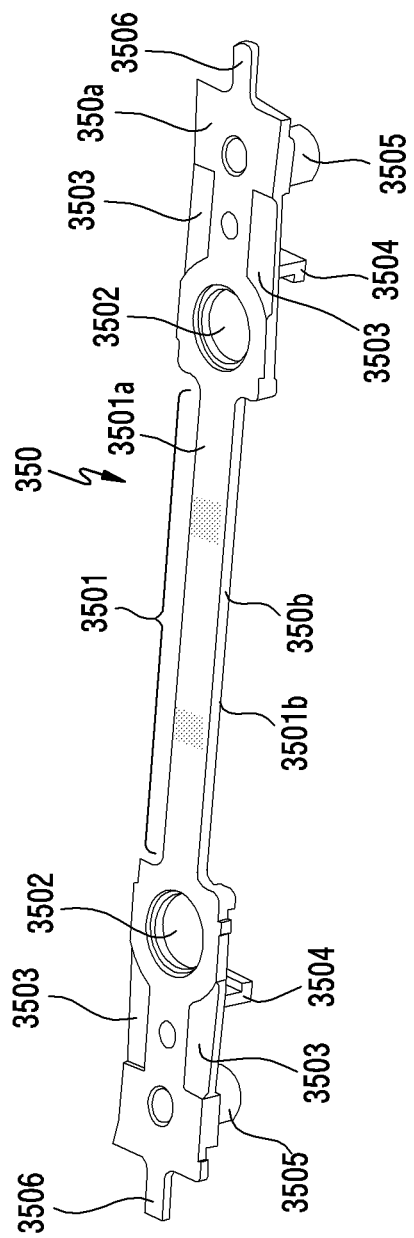
FIG. 7A illustrates a perspective view of a support portion according to an embodiment.
Figure 7B:
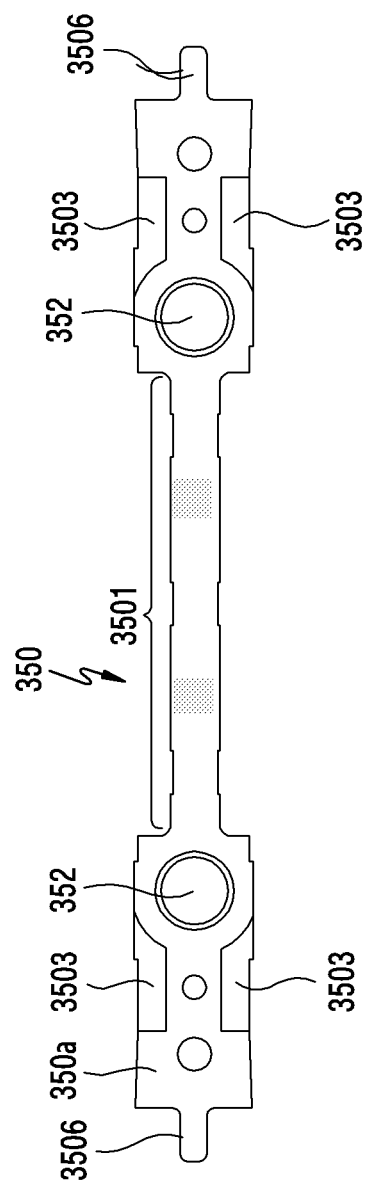
FIG. 7B illustrates a plan view of a support portion according to an embodiment.
Figure 7C:
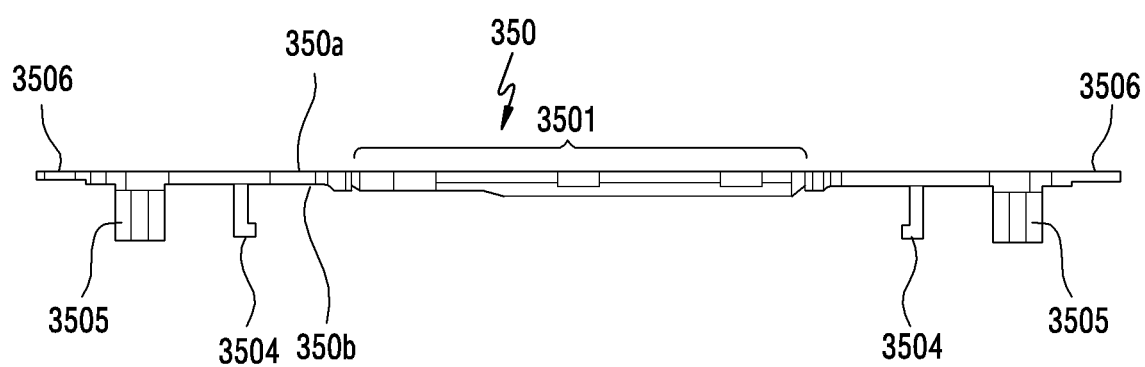
FIG. 7C illustrates a lateral view of a support portion according to an embodiment.

FIG. 7A is a perspective view illustrating a support portion according to an embodiment, FIG. 7B is a plan view illustrating a support portion according to an embodiment, and FIG. 7C is a lateral view illustrating a support portion according to an embodiment.

Referring to FIGS. 7A to 7C, a support portion 350 supports a flexible display when the flexible display is unfolded, and may have an approximately bar shape.

The support portion 350 supports a folding of the flexible display, and may be disposed to face the folding region. The support portion 350 may support the folding region to be flat in a 180-degree unfolded (open) state, and may move in a direction away from the folding region in a folding operation (a closing operation).

The support portion 350 may be a bar type having a length and may be disposed between both hinge structures 300a and 300b. The support portion 350 includes a first face 350a and a second face 350b facing away from the first face 350a.

The first face 350a may be a face facing the flexible display, and the second face 350b may be a face facing the hinge housing.

The support portion 350 is a connector which connects first and second hinge structures, and both ends of the support portion 350 may be respectively coupled to the first and second structures.

The support portion 350 includes a center portion 3501, a fastening portion 3502, a hook portion 3504, an elastic support portion 3505, and ends 3506. In the support portion 350, the fastening portions 3502 may be located respectively at both sides with respect to the center portion 3501, the hook portions 3504 may be located respectively at both sides of the fastening portion, the elastic support portions 3505 may be located respectively at both sides of the hook portion 3504, and the ends 3506 may be located respectively at opposite sides of the elastic support portion 3505.

The center portion 3501 may be located between first and second hinge structures, may be located between first and second hinge, or may be located between an FPCB and a folding region of the flexible display.

In the center portion 3501, the first face 3501a may face the folding region of the flexible display, and the second face 3501b may face the hinge housing. The center portion 3501 may be disposed to a space between the first and second hinge plates to support the flexible display to be flat in a state in which the electronic device is in a 180-degree unfolded state, as a support member that supports the flexible display.

The fastening portion 3502 may be a fastening hole to which a fastener is inserted. The hook portion 3504 may have a hook shape protruding from the second face 350b. The hook portion 3504 may be caught by some support structures of the hinge housing, so that the support portion 350 is constrained not to be separated from the hinge housing. The elastic support portion 3505 may have a cylindrical shape as a portion in which an elastic body is accommodated. The ends 3506 may have the narrowest widths in the support portion 350. The center portion 3501 of the support portion 350 may be constructed to have a smaller width than the fastening portion 3502, the hook portion 3504, or the elastic support portion 3505, and may be constructed to have a greater thickness.

The support portion 350 include a plurality of first support grooves 3503 on the first face 350a. The plurality of support groove 3503 may be grooves for mounting first and second protrusion portions of first and second hinge plates. The plurality of support grooves 3503 may be constructed bilaterally symmetrically at both sides with respect to the center portion 3501, and may be constructed symmetrically at upper and lower sides. The support portion 350 may be constructed of a metal material, e.g., a Stainless Use Steel (SUS) material or a metal powder material.

Figure 8A:
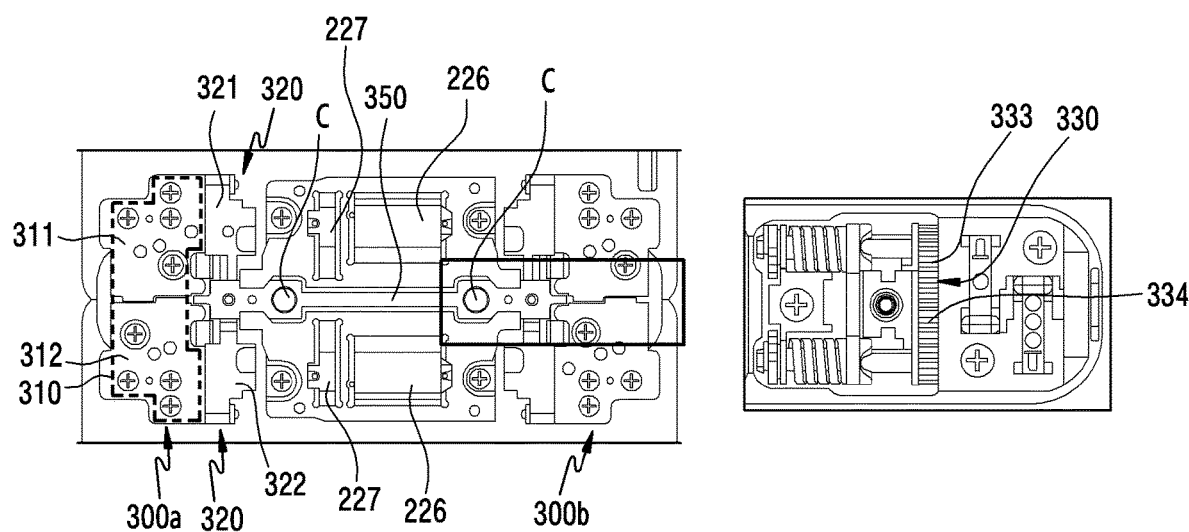
FIG. 8A illustrates a hinge assembly fastened to an unfolded electronic device according to an embodiment.
Figure 8B:
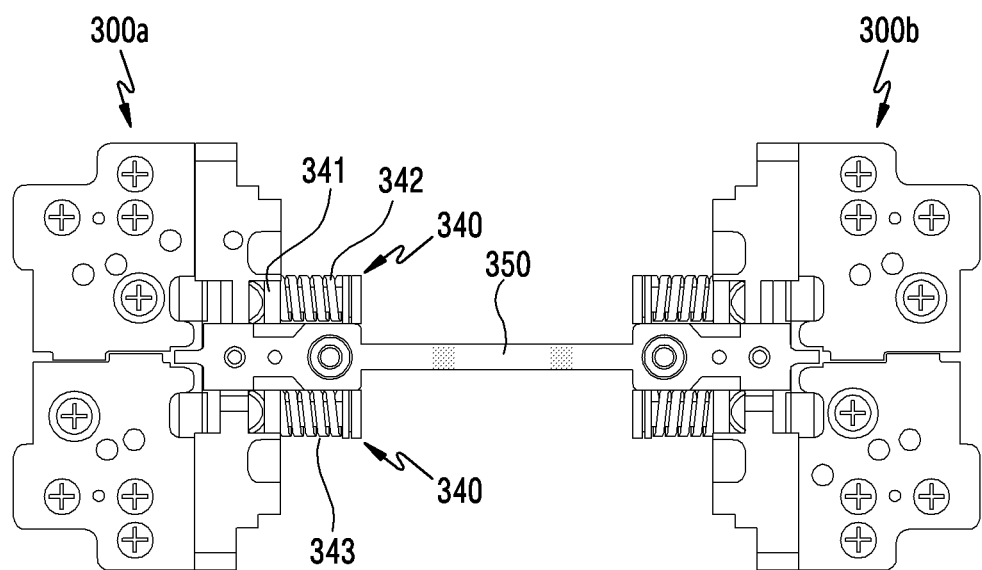
FIG. 8B illustrates a plan view of a hinge structure according to an embodiment.

FIG. 8A illustrates a hinge assembly fastened to an unfolded electronic device according to an embodiment. FIG. 8B is a plan view illustrating a hinge structure according to an embodiment.

Referring to FIGS. 8A and 8B, a hinge structure 300a or 300b includes a bracket structure 310, an arm structure 320, a rotation structure 330, a detent structure 340, and a support portion 350.

The bracket structure 310 includes a plurality of brackets 311 and 312 coupled with a first housing and a second housing, and a fixing bracket 313 that supports the plurality of brackets 311 and 312. The plurality of brackets 311 and 312 coupled with the first housing and the second housing may rotate together with the first housing and the second housing while the electronic device rotates from a folded state to an unfolded state or rotates from the unfolded state to the folded state.

The arm structure 320 may include an arm coupled to some constitutions (e.g., a shaft) of the rotation structure 330 and rotatable within a specified range (e.g., 0° to 90° or 10° to 80°). The arm may be coupled with one region of a bracket of the bracket structure 310 and thus may be slid with respect to the bracket in a rotation process of the electronic device.

The rotation structure 330 includes a plurality of shafts 331 and 332, a plurality of gears 331a and 332a coupled with the plurality of shafts 331 and 332, a plurality of idle gears 333 and 334 gear-coupled with the plurality of gears 331a and 332a, and a shaft bracket supporting the plurality of shafts. As the plurality of shafts 331 and 332, the plurality of gears 331a and 332a, and the plurality of idle gears 333 and 334 rotate in an engaged manner, the rotation structure 330 may allow the first housing and the second housing to rotate by the same rotation angle. Arms 321 and 322 of the arm structure 320 may be coupled to the shafts 331 and 332 of the rotation structure 330. Accordingly, the arm may rotate about a rotation axis (or a turning axis) different from the brackets 311 and 312 of the bracket structure 310 while the electronic device rotates from the folded state to the unfolded state or rotates from the unfolded state to the folded state.

The detent structure 340 includes a detent plate 341 having a detent portion constructed thereon, and a plurality of springs 342 and 343. The detent portion may be constructed to protrude from one region of the detent plate 341 facing the aforementioned arm. The detent portion may be constructed in a concavo-convex shape corresponding to a cam portion constructed in one region of the arms 321 and 322. The detent portion may be engaged with the cam portion of the arms 321 and 322 to fix a movement of the arm when the electronic device is in the folded state. The plurality of springs 342 and 343 may be disposed between the detent plate 341 and the shaft bracket of the rotation structure 330. The plurality of springs 342 and 343 may be disposed between the detent plate 341 and the shaft bracket in a compressed state, so that the detent plate 341 is in contact with one region of the arms 321 and 322.

The support portion 350 may be disposed to an empty space between the plurality of arms 321 and 322 and the plurality of shafts 331 and 332. The support portion 350 may move up and down between the flexible display and the hinge housing due to a rotation of the plurality of arms 321 and 322.

The support portion 350 may move in a direction of the flexible display due to the rotation of the plurality of arms while the electronic device rotates from the folded state to the unfolded state. As a result, the support portion 350 may be located to a rear face of the flexible display to support one region of the flexible display. The support portion 350 may be in contact with at least one region of the rear face of the flexible display to support the flexible display.

The support portion 350 may be spaced apart by a minute distance from the flexible display to support one region of the flexible display.

A support plate may be attached to at least one region of the flexible display by means of an adhesive member (e.g., an adhesive). The support portion 350 may support at least one region of the rear face of the support plate.

While the electronic device rotates from the unfolded state to the folded state, the support portion 350 may be spaced apart from the flexible display, and thus may not affect a driving trajectory of the flexible display.

The support portion 350 may be disposed between the first and second hinge structures 300a and 300b, and may provide a connection between the first and second hinge structures 300a and 300b. One end of the support portion 350 may be disposed to the first hinge structure 300a, the other end of the support portion 350 may be disposed to the second hinge structure 300b, and the center portion of the support portion 350 may be located between the first and second hinge structures 300a and 300b.

The support portion 350 may be disposed between the flexible display and at least one or more FPCBs 226 and 227. The ends of the support portion 350 may be disposed between the flexible display and each of the first and second hinge structures 300a and 300b, and the center portion may be disposed between the flexible display and at least one or more FPCBs 226 and 227. For example, the flexible display and the FPCB may be spatially separated from each other due to the center portion of the support portion 350.

The FPCBs 226 and 227 may include the main FPCB 226 and the sub FPCB 227. The main FPCB 226 and the sub FPCB 227 may be disposed between the center portion 3501 of the support portion and the hinge housing. The folding region of the flexible display, the center portion of the support portion, and the FPCBs 226 and 227 may be disposed in a mutually stacked structure. The FPCBs 226 and 227 may electrically couple at least one electronic component disposed to the first housing and at least one second electronic component disposed to the second housing. The first electronic component may be a main PCB, and the second electronic component may be a first battery.

In the opening/closing operation of the electronic device, the support portion 350 may move downwardly toward the FPCBs 226 and 227, and the downward movement of the support portion 350 may constrain the movement of the FPCBs 226 and 227. The support portion 250 may prevent the FPCBs 226 and 227 from being detached by being unevenly wrinkled.

In the opening/closing operation of the electronic device, the center portion of the support portion 350 facing the FPCBs 226 and 227 may have curved (e.g., round) edge portions at both sides of a second face, thereby preventing the FPCBs 226 and 227 from being stamped due to interference between the edge portion and the FPCB.

Figure 9:
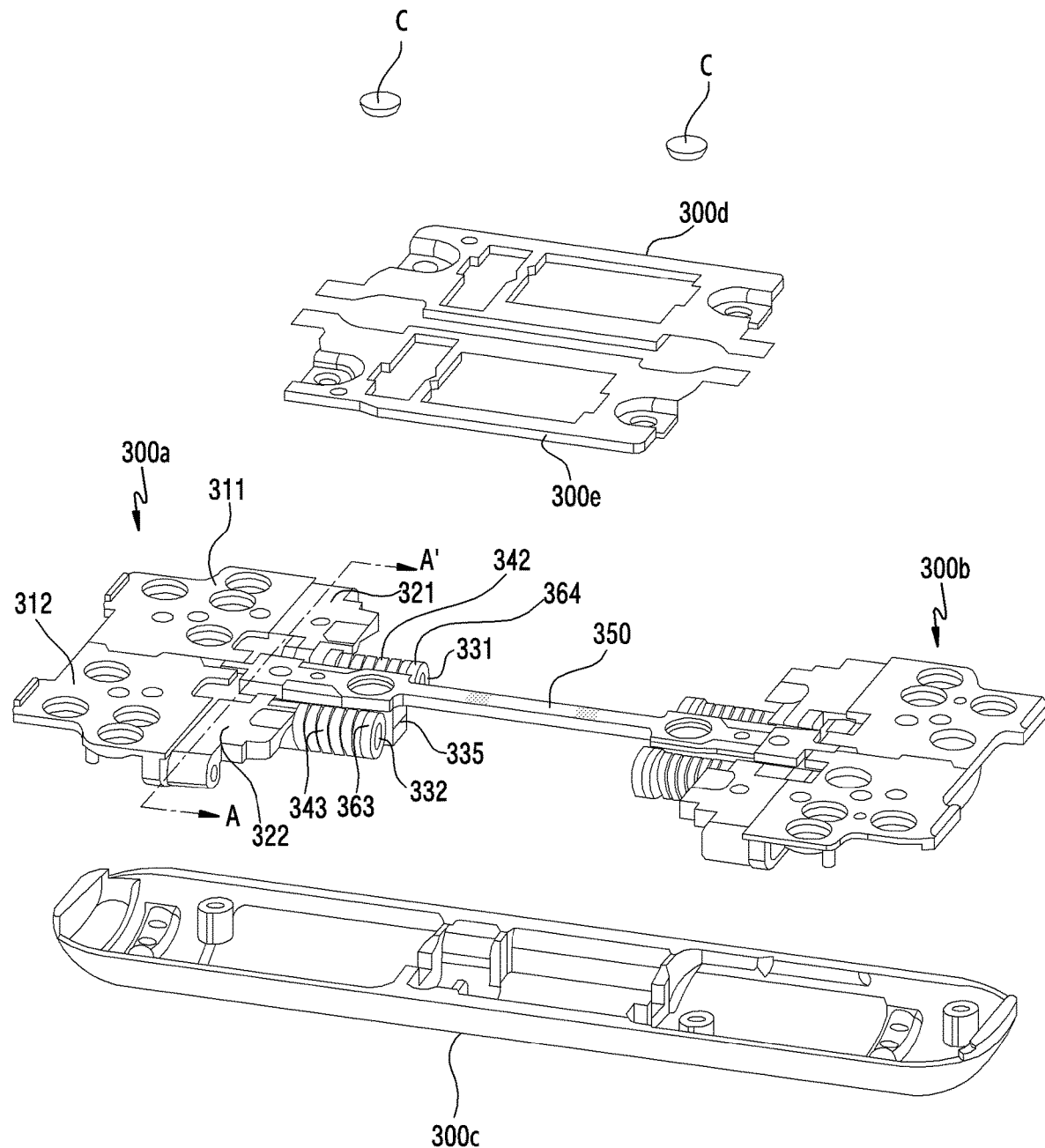
FIG. 9 illustrates a perspective view of a hinge structure and a hinge housing that are separated according to an embodiment.
Figure 10A:
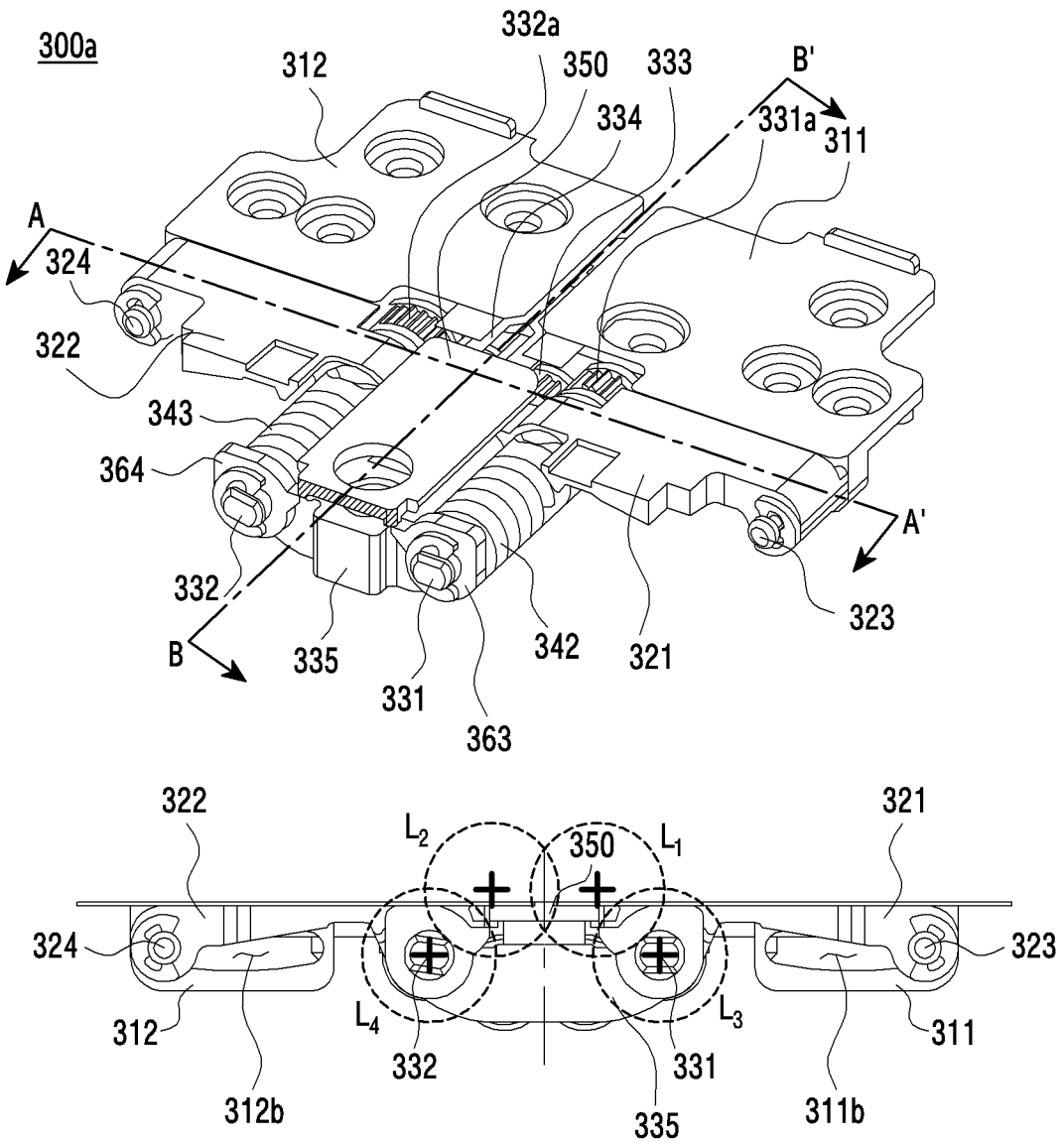
FIG. 10A illustrates a hinge structure when an electronic device is in an unfolded state according to an embodiment.
Figure 10B:
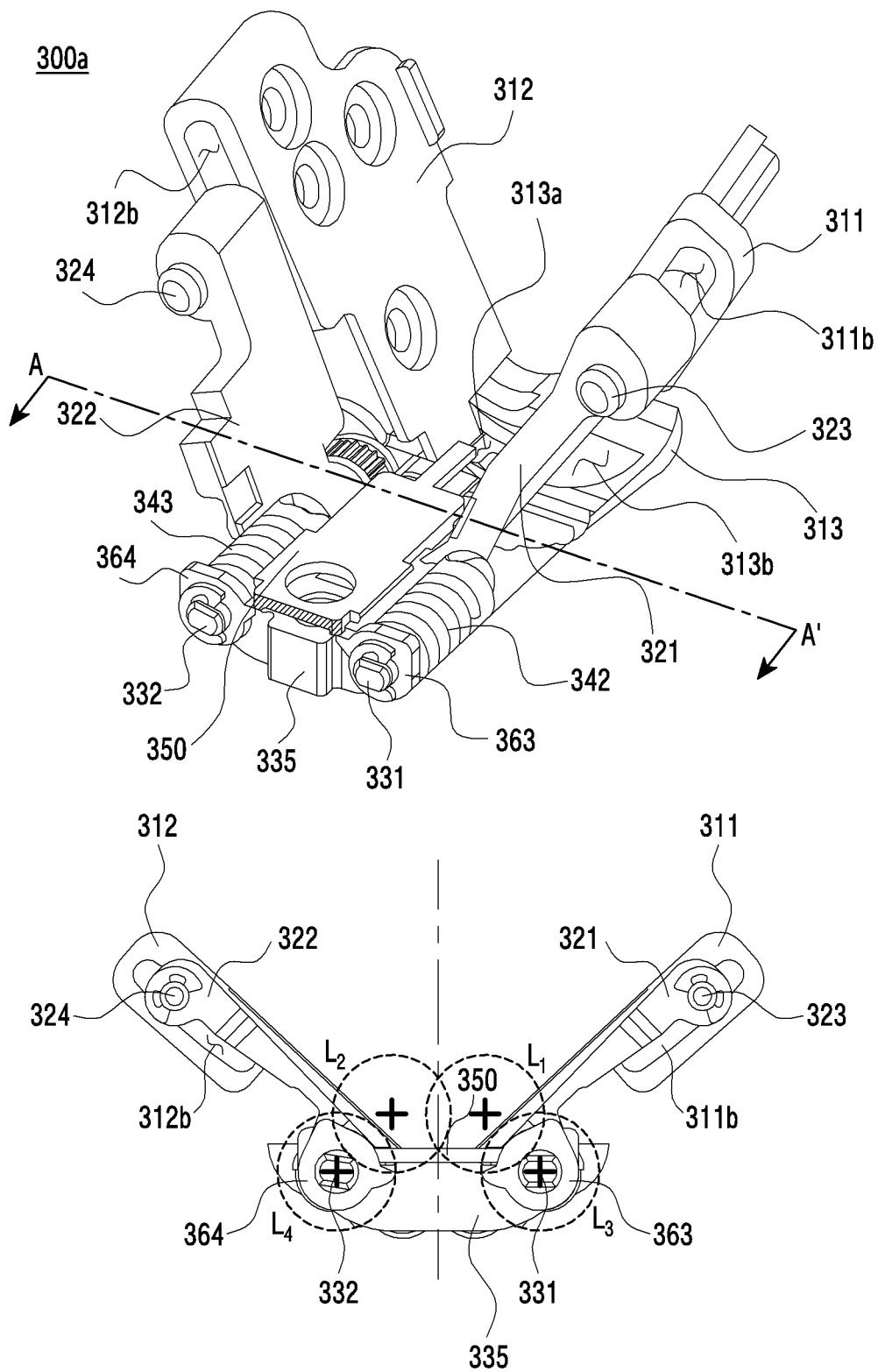
FIG. 10B illustrates a hinge structure when an electronic device rotates from an unfolded state to a folded state according to an embodiment.
Figure 10C:
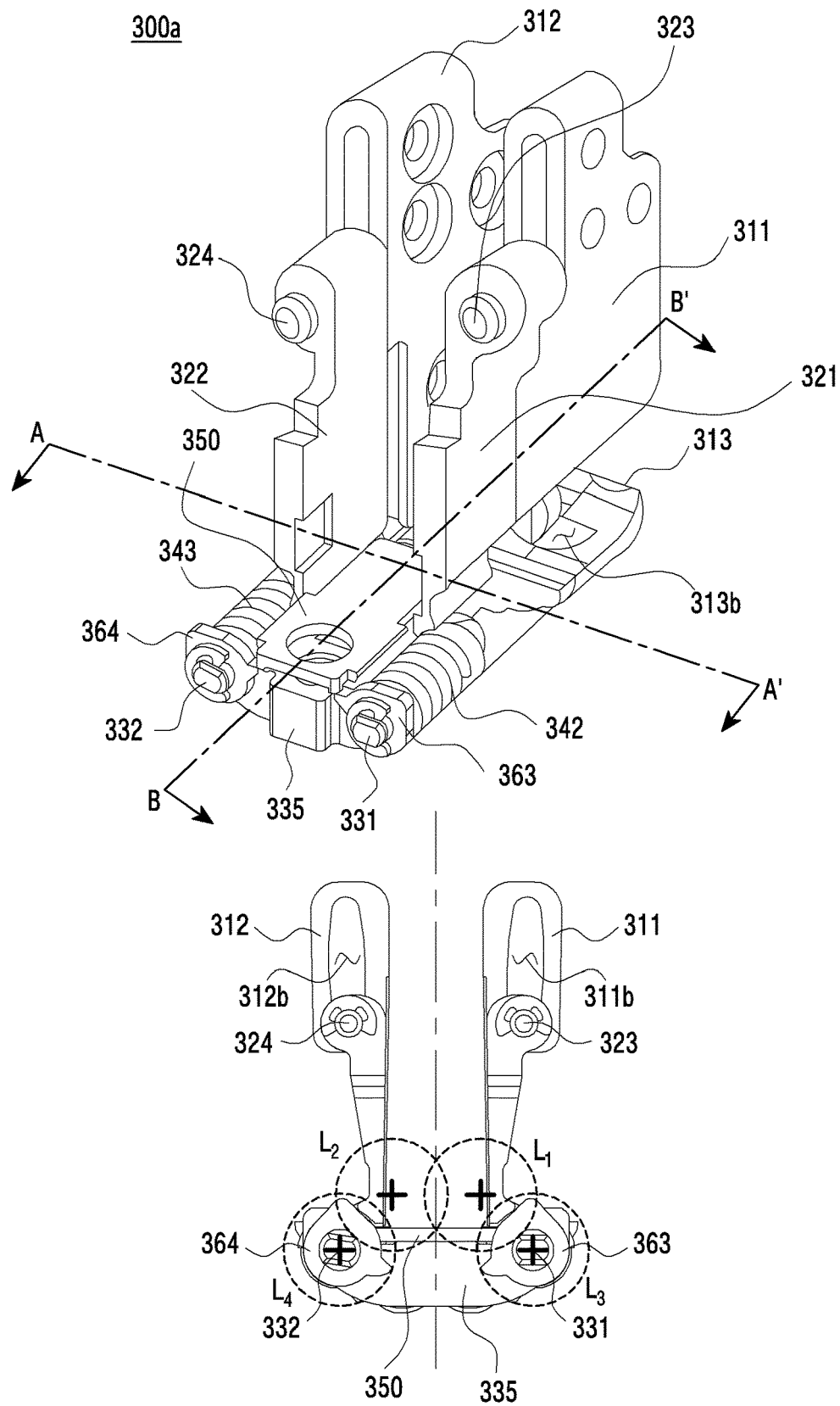
FIG. 10C illustrates a hinge structure when an electronic device is in a folded state according to an embodiment.
Figure 10D:
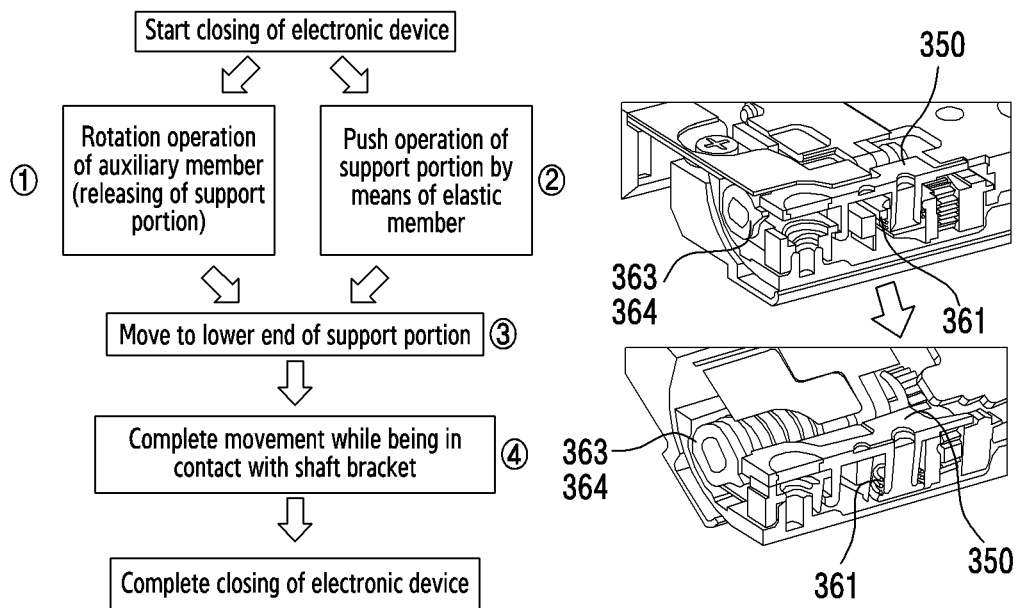
FIG. 10D illustrates operations of a support portion when an electronic device rotates from an open state to a closed state according to an embodiment.

FIG. 9 illustrates a state in which a hinge structure and a hinge housing are separated according to an embodiment. FIG. 10A illustrates a cross-sectional view, cut along the line A-A' of FIG. 9, of a hinge structure when an electronic device is in an unfolded state according to an embodiment. FIG. 10B illustrates a hinge structure when an electronic device rotates from an unfolded state to a folded state according to an embodiment. FIG. 10C illustrates a cross-sectional view, cut along the line A-A of FIG. 9', of a hinge structure when an electronic device is in a folded state according to an embodiment.

Referring to FIGS. 9 to 10C, an electronic device includes the hinge structure 300a. The hinge structure 300a includes the first bracket 311, the second bracket 312, a fixing bracket 313, the first arm 321, the second arm 322, a first fixing portion 323, a second fixing portion 324, a support portion 350, a first shaft 331 in which a first gear 331a and a first spring 342 are coupled, a second shaft 332 in which a second gear 332a and a second spring 343 are coupled, a first idle gear 333, a second idle gear 334, a shaft bracket 335, a first auxiliary member 363, and a second auxiliary member 364. At least one of components of the aforementioned hinge structure 300a may be identical or similar to at least one of components of the hinge structure 300a or 300b of FIG. 4B, the hinge structure 300a or 300b of FIG. 6, and/or the hinge structure 300a or 300b of FIG. 7B, and redundant descriptions will be omitted hereinafter.

The first bracket 311 and the second bracket 312 may be mounted to a first groove 313a and second groove 313b constructed in the fixing bracket 313 so as to be supported by the fixing bracket 313. The first bracket 311 may include a first rail portion 311a constructed in a shape corresponding to the first groove 313a, and the second bracket 312 may include a second rail portion 312a constructed in a shape corresponding to the second groove 313b. The first bracket 311 may rotate by sliding inside the first groove 313a through the first rail portion 311a, and the second bracket 312 may rotate by sliding inside the second groove 313b through the second rail portion 312a.

The first bracket 311 may be coupled to at least one region of a first housing to rotate in association with the first housing. The second bracket 312 may be coupled to at least one region of a second housing to rotate in association with the second housing. Through the aforementioned structure, the first bracket 311 may rotate within a specified range about a virtual first rotation axis L1, and the second bracket 312 may rotate within a specified range about a virtual second rotation axis L2 adjacent to the first rotation axis L1. The first bracket 311 may rotate within an angle range from 0° to an angle (e.g., 90°) at which the electronic device is in the folded state with respect to the +x axis, and the second bracket 312 may rotate within an angle range from 180° to an angle at which the electronic device is in the folded state with respect to the +x axis. When the electronic device is in the unfolded state, the first bracket 311 and the second bracket 312 may be disposed to be horizontal to each other, and when the electronic device is in the folded state, the first bracket 311 and the second bracket 312 may be disposed to face each other.

The first arm 321 may be coupled to one region of the first shaft 331 to rotate together with the first shaft 331. The second arm 322 may be coupled to one region of the second shaft 332 adjacent to the first shaft 331 to rotate together with the second shaft 332. The first arm 321 may rotate about a rotation axis L3 (hereinafter, a "third rotation axis") of the first shaft 331 due to the aforementioned coupling structure. In addition, the second arm 322 may rotate about a rotation axis L4 (hereinafter, a "fourth rotation axis") of the second shaft 331. When the electronic device is in the unfolded state, the first arm 321 and the second arm 322 may be disposed to be horizontal to each other, and when the electronic device is in the folded state, the first arm 321 and the second arm 322 may be disposed to face each other.

The first arm 321 and the second arm 322 may rotate by the same angle through the first gear 331a of the first shaft 331, the second gear 332a of the second shaft 332, the first idle gear 333, and the second idle gear 334.

When the first shaft 331 rotates by a specific angle, the first gear 331a may also rotate by the same angle. The rotation of the first gear 331a may be transferred to the first idle gear 333 engaged with the first gear 331a, and the rotation transferred to the first idle gear 333 may be transferred to the second gear 332a through the second idle gear 334 engaged with the first idle gear 333. The second shaft 332 may also rotate by a specific angle due to the rotation transferred to the second gear 332a. Through the aforementioned process, the first arm 321 coupled with the first shaft 331 and the second arm 322 coupled with the second arm 332 may rotate by the same angle.

The first rotation axis L1 and the second rotation axis L2 may be constructed between the third rotation axis L3 and the fourth rotation axis L4. In addition, as the first rotation axis L1 and the second rotation axis L2 are constructed in an upper end region of the third rotation axis L3 and fourth rotation axis L4, the first rotation axis L1 and the second rotation axis L2 may be constructed on a flexible display. That is, the first bracket 311, the second bracket 312, the first arm 321, and the second arm 322 may rotate within a specified angle range about rotation axes different from one another.

According to an embodiment, the first bracket 311 may be coupled with one region of the first arm 321 through the first fixing portion 323, and the second bracket 312 may be coupled with one region of the second arm 322 through the second fixing portion 324.

A first slide hole 311b may be constructed in one region adjacent to the first arm 321 of the first bracket 311, and the first fixing portion 323 may pass through the first slide hole 311b to couple the first bracket 311 and the first arm 321. A second slide hole 312b may be constructed in one region adjacent to the second arm 322 of the second bracket 312, and the second fixing portion 324 may pass through the second slide hole 312b to couple the second bracket 312 and the second arm 322.

As the first bracket 311 rotates together with the first housing, the first fixing portion 323 may be slid inside the first slide hole 311b. Due to the sliding of the first fixing portion 323, the first arm 321 coupled with the first bracket 311 through the first fixing portion 323 may also be slid together. Similarly, due to the rotation of the second housing, the second fixing portion 324 may be slid inside the second slide hole 312b. Due to the sliding of the second fixing portion 324, the second arm 322 coupled with the second bracket 312 through the second fixing portion 324 may also be slid together.

When the electronic device in which the first bracket 311, the second bracket 312, the first arm 321, and the second arm 322 are disposed on the same plane is in the unfolded state, the first fixing portion 323 may be disposed outside the first slide hole 311b, and the second fixing portion 324 may be disposed outside the second slide hole 312b.

As illustrated in FIG. 10B, while the electronic device rotates from the unfolded state to the folded state, the first housing and the second housing may rotate by a first angle (e.g., 30° with respect to the +x axis or the −x axis) by a user's manipulation or external force. As the first housing and the second housing rotate, the first bracket 311 and the second bracket 312 coupled to the first housing and the second housing may also rotate by the first angle.

While the first bracket 311 rotates counterclockwise, the first fixing portion 323 may be slid by a specific distance in an inward direction from the outside of the first slide hole 311b. The first arm 321 may rotate counterclockwise by a second angle greater than the first angle due to the sliding of the first fixing portion 323. The second arm 322 may rotate by the second angle clockwise due to the sliding of the second fixing portion 324.

When the electronic device is in the folded state, the first and second brackets 311 and 312 and the first and second arms 321 and 322 may be disposed to face each other in one face. The first bracket 311, the second bracket 312, the first arm 321, and the second arm 322 may be disposed to be substantially vertical to the +x axis or to have an angle (e.g., 800 to 100°) at which the electronic device is in the folded state. When the electronic device is in the folded state, the first fixing portion 323 may be disposed inside the first slide hole 311b, and the second fixing portion 324 may also be disposed inside the second slide hole 312b.

That is, the first fixing portion 323 may be slid in an inward direction from the outside of the first slide hole 311b while the electronic device rotates from the unfolded state to the folded state, and may be slid in an outward direction from the inside of the first slide hole 311b while the electronic device rotates from the folded state to the unfolded state. The second fixing portion 324 may be slid in the same manner as the first fixing portion 323.

In an example, while the first bracket 311 and the second bracket 312 rotate about the virtual first rotation axis L1 and second rotation axis L2 by a user's manipulation or external force, the first fixing portion 323 and the second fixing portion 324 may be slid respectively inside the first slide hole 311b and the second slide hole 312b. Due to the sliding of the first fixing portion 323 and second fixing portion 324, the first arm 321 and the second arm 322 may rotate about the third rotation axis L3 and the fourth rotation axis L4. As a result, the first arm 321 may rotate about a rotation axis (e.g., L3) different from the first bracket 311 due to the rotation of the first bracket 311. The second arm 322 may rotate about a rotation axis (e.g., L4) different from the second bracket 312 due to the rotation of the second bracket 312.

When the electronic device is in a 180-degree unfolded state, the support portion 350 may be in contact with an auxiliary member.

When the electronic device rotates from the 180-degree unfolded state to a folded state, the auxiliary members 363 and 364 may perform a rotation operation, and the state in which the support portion 350 is in contact with the auxiliary members 363 and 364 may be released (operation ①).

According to restoration force of the elastic member 361, the support portion 350 may move to a lower end through a push operation (operations ② and ③). The support portion 350 may move until it is in contact with a shaft bracket, and then the movement may be completed when in contact with the auxiliary members 363 and 364 (operation ④), i.e., when a closing operation of the electronic device is completed.

Figure 11:
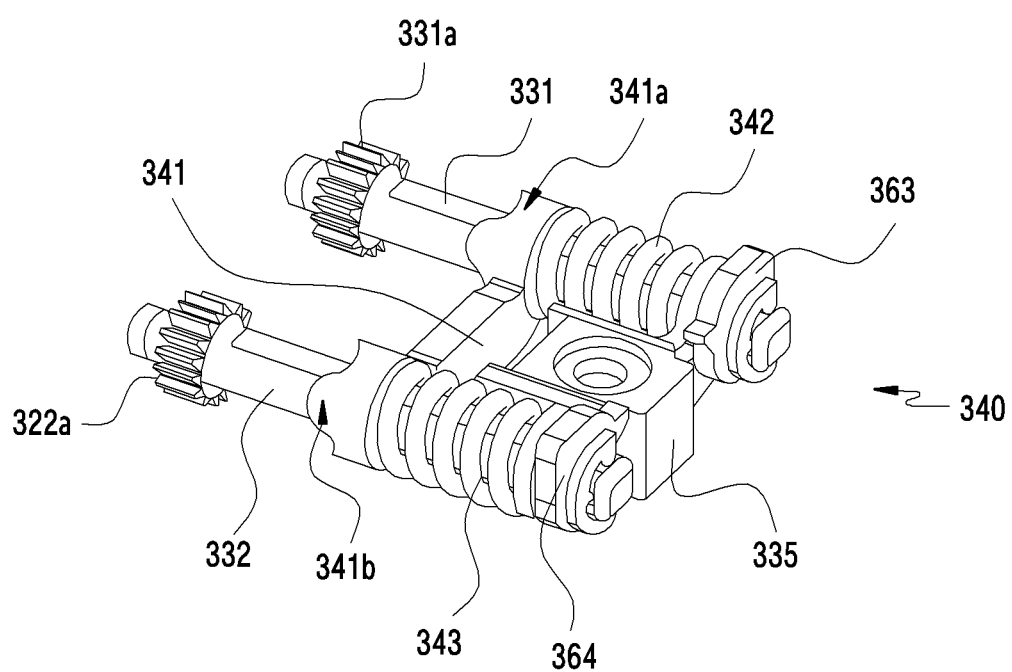
FIG. 11 illustrates a fixing portion and a detent structure of a hinge structure according to an embodiment.

FIG. 11 illustrates a fixing portion and a detent structure of a hinge structure according to an embodiment.

Referring to FIG. 11, the hinge structure of an electronic device includes the first bracket, the second bracket, a fixing bracket, the first arm, the second arm, the first fixing portion, the second fixing portion, a first shaft 331 to which a first gear 331a is coupled, a second shaft 332 to which a second gear 332a is coupled, a first idle gear, a second idle gear, the detent structure 340, a support portion, a first auxiliary member 363, and a second auxiliary member 364. At least one of components of the hinge structure of FIG. 11 may be identical or similar to at least one of components of the hinge structures of FIG. 8, and redundant descriptions will be omitted hereinafter.

The first bracket 311 and the first arm 321 may be coupled through the first fixing portion 323 which passes through one region of the first bracket 311 and first arm 321. The second bracket 312 and the second arm 322 may be coupled through the second fixing portion 324 which passes through one region of the second bracket 312 and second arm 322. The first fixing portion 323 and the second fixing portion 324 may be constructed in a pin shape which extends in a longitudinal direction.

The hinge structure further includes a first elastic body and a second elastic body. In an embodiment, the first elastic body and the second elastic body may be a spring or a disk spring, but are not limited thereto.

The first elastic body may be disposed to an outer circumferential surface of the first fixing portion, and may be disposed in a compressed state between the first arm 321 and a first washer ring. Some regions of the first elastic body 323a may pass through some regions of the first arm 321, and may be disposed between the first arm 321 and the first washer ring 325. As the first elastic body 323a is disposed in a compressed state between the first arm 321 and the first washer ring 325, frictional force may be generated between the first arm 321 and the first bracket 311. A torque may be generated in a direction opposite to a rotation direction of the first arm 321 due to the frictional force generated between the first arm 321 and the first bracket 311, and a movement of the first arm 321 may be fixed due to the generated torque. That is, the hinge structure may fix the movement of the first arm 321 in a free stop manner while the electronic device rotates from the folded state to the unfolded state or rotates from the unfolded state to the folded state without a separate additional component by using the first elastic body 323a.

The second elastic body 324a may be disposed to an outer circumferential surface of the second fixing portion 324, and may be disposed in a compressed state between the second arm 322 and a second washer ring. Some regions of the second elastic body 324a may pass through some regions of the second arm 322, and may be disposed between the second arm 322 and the second washer ring 326. As the second elastic body 324a is disposed in a compressed state between the second arm 322 and the second washer ring 326, frictional force may be generated between the second arm 322 and the second bracket 312. A torque may be generated in a direction opposite to a rotation direction of the second arm 322 due to the frictional force generated between the second arm 322 and the second bracket 312, and the movement of the second arm 322 may be fixed due to the generated torque. That is, the hinge structure 300a according to an embodiment may fix a movement of the second arm 322 while the electronic device rotates from the folded state to the unfolded state or rotates from the unfolded state to the folded state without a separate additional component by using the second elastic body 324a.

The detent structure 340 of the hinge structure 3 includes the detent plate 341, a first spring 342, and a second spring 343.

A shaft insertion hole may be constructed in at least one region of the detent plate 341, so that the first shaft 331 and the second shaft 332 are coupled to the detent plate 341. A diameter of the shaft insertion hole may be constructed to be greater than a diameter of the second shaft 332, so that the first shaft 331 and the second shaft 332 can freely rotate in a state of being coupled with the detent plate 341. The detent plate 341 includes a first detent portion 341a constructed to protrude along a longitudinal direction of the first shaft 331 and a second detent portion 341b constructed to protrude along a longitudinal direction of the second shaft 332. The first detent portion 341a may be disposed to be engaged with a first cam portion 321a of the first arm 321, and the second detent portion 341b may be disposed to be engaged with a second cam portion 322a of the second arm 322, so that the first arm 321 and the second arm 322 can provide a cam operation to the first arm 321 and the second arm 322.

The first spring 342 may be coupled with the first shaft 331 so as to be located between the detent plate 341 and a shaft bracket 335 supporting the first shaft 331. The second spring 343 may be coupled with the second shaft 332 adjacent to the first shaft 331, so as to be located between the detent plate 341 and the shaft bracket 335 supporting the second shaft 332.

The first spring 342 and the second spring 343 may be disposed in a compressed state to the shaft bracket 335 and the detent plate 341, and pressure may be applied to the shaft bracket 335 in a direction opposite to the detent plate 341 due to elastic restoration force of the first spring 342 and second spring 343. Due to the elastic restoration force of the first spring 342 and second spring 343, the first detent portion 341a and second detent portion 341b of the detent plate 341 may maintain a state of being engaged with the first cam portion 321a of the first arm 321 and the second cam portion 322a of the second arm 322. With the rotation of the first arm 321 and second arm 322, the detent plate 341 may be temporarily spaced apart in a direction of the shaft bracket 335. The first spring 342 and the second spring 343 may be compressed due to the detent plate 341 being spaced apart. Due to elastic restoration force of the compressed first spring 342 and second spring 343, the detent plate 341 may move again in a direction of the first arm 321 and the second arm 322.

Even if the detent plate 341 is temporarily spaced apart from the first arm 321 and the second arm 322, the detent plate 341 may be in contact again with the first arm 321 and the second arm 322 by means of the first spring 342 and the second spring 343. The detent structure 340 may maintain an engagement state between the first detent portion 341a and the first cam portion 321a and between the second detent portion 341b and the second cam portion 322a through the aforementioned structure.

Figure 12A:
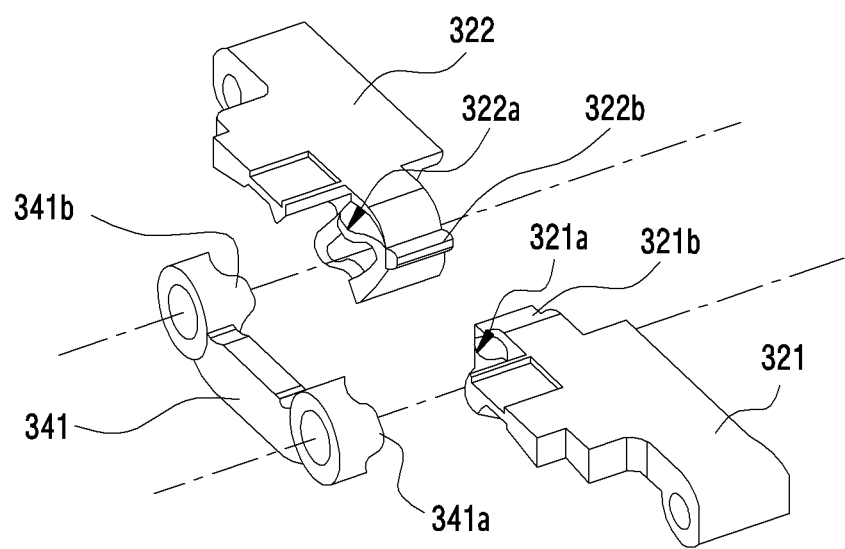
FIGS. 12A and 12B illustrate a coupling relationship between an arm structure and a detent structure of a hinge structure according to an embodiment.
Figure 12B:
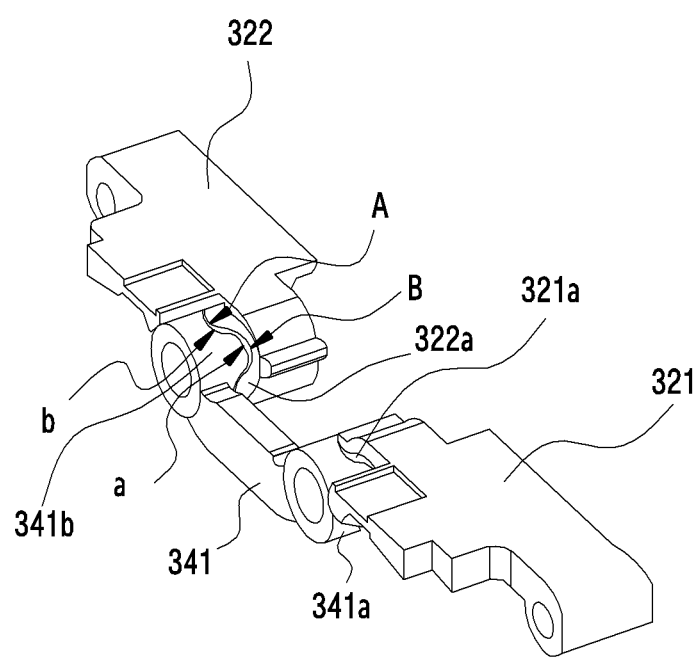

FIGS. 12A and 12B illustrate a coupling relationship between an arm structure and a detent structure of a hinge structure according to an embodiment. Specifically, FIG. 12A illustrates a detached state, and FIG. 12B illustrates an assembled state.

Referring to FIGS. 12A and 12B, a hinge structure of an electronic device includes the first arm 321, the second arm 322, and the detent plate 341. The first arm 321 includes a first cam portion 321a and a first support rib 321b, and the second arm 322 includes a second cam portion 322a and a second support rib 322b. The first support rib 321b of the first arm 321 and the second support rib 322b of the second arm 322 may allow a support portion to move in an upper direction.

The first cam portion 321a of the first arm 321 and the second cam portion 322a of the second arm 322 may be constructed in a concavo-convex structure in which a peak A and a valley B appear repeatedly. The first arm 321 and the second arm 322 may be coupled with the detent plate 341, and thus may be disposed such that the first cam portion 321a is engaged with a first detent portion 341a, and the second cam portion 322a is engaged with a second detent portion 341b.

The detent plate 341 includes the first detent portion 341a constructed to protrude in a direction of the first cam portion 321a of the first arm 321 and the second detent portion 341b constructed to protrude in a direction of the second cam portion 322a of the second arm 322. The first detent portion 341a and the second detent portion 341b may be constructed in a concavo-convex structure in which a peak 'a' and a valley 'b' appear repeatedly. The peak and valley of the first detent portion 341a may be constructed in a shape corresponding to the peak and valley of the first cam portion 321a, and the peak and valley of the second detent portion 341b may be constructed in a shape corresponding to the peak and valley of the second cam portion 322a. The peak 'a' of the first detent portion 341a and the valley B of the first cam portion 321a may be disposed to correspond to each other, and the valley 'b' of the first detent portion 341a and the peak A of the first cam portion 321a may be disposed to correspond to each other, so that the first detent portion 341a and the first cam portion 321a are engaged with each other. Similarly, the peak of the second detent portion 341b and the valley of the second cam portion 322a may be disposed to correspond to each other, and the valley of the second detent portion 341b and the peak of the second cam portion 322a may be disposed to correspond to each other, so that the second detent portion 341b and the second cam portion 322a are engaged with each other.

As the detent plate 341 is disposed such that the first cam portion 321a and the first detent portion 341a are engaged and the second cam portion 322a and the second detent portion 341b are engaged, the detent plate 341 may provide a cam operation to the first arm 321 and the second arm 322. A pitch between a peak (or valley) and peak (or valley) of the first detent portion 341a may be constructed to be longer than a pitch between a peak (or valley) and peak (or valley) of the first cam portion 321a, so that the first cam portion 321a rotates within a specified angle range even if it is in a state of being engaged with the first detent portion 341a. The pitch between the peak (or valley) or peak (or valley) of the first detent portion 341a may be constructed to be equal to the pitch between the peak (or valley) and peak (or valley) of the first cam portion 321a or may be constructed to be shorter than the pitch between the peak (or valley) and peak (or valley) of the first cam portion 321a. While the electronic device rotates from a folded state to an unfolded state or rotates from the unfolded state to the folded state, the peak of the first cam portion 321a of the first arm 321 may be engaged with the peak of the first detent portion 341a so that the first arm 321 and the detent plate 341 are temporarily spaced apart. While the peak of the first cam portion 321a is beyond the peak of the first detent portion 341a, the first detent portion 341a may provide a cam operation to the first arm 321. The second detent portion 341b may also provide a cam operation to the second arm 322 in the same or similar manner as the first detent portion 341a.

The first detent portion 341a and the second detent portion 341b may provide the cam operation to the first arm 321 and the second arm 322 and also fix a movement of the first arm 321 and second arm 322.

A flat linear region may be constructed in at least one region (e.g., a summit region) of the peak of the first cam portion 321a, the peak of the second cam portion 322a, the peak of the first detent portion 341a, and/or the peak of the second detent portion 341b. A flat linear region may also be constructed in at least one region of the valley of the first cam portion 321a, the valley of the second cam portion 322a, the valley of the first detent portion 341a, and/or the valley of the second detent portion 341b. The linear region constructed in one region of the peak and the linear region constructed in one region of the valley may be constructed to be substantially identical or similar. As the linear region is constructed in the peaks and valleys of the first cam portion 321, second cam portion 322a, first detent portion 341a, and second detent portion 341b, the movement of the first arm 321 and/or second arm 322 may be fixed at a specified rotation angle (e.g., 300 or 60°). As the movement of the first arm 321 and/or second arm 322 is fixed at the specified rotation angle, a movement of a first housing and second housing of the electronic device may be fixed at the specified rotation angle.

Figure 13:
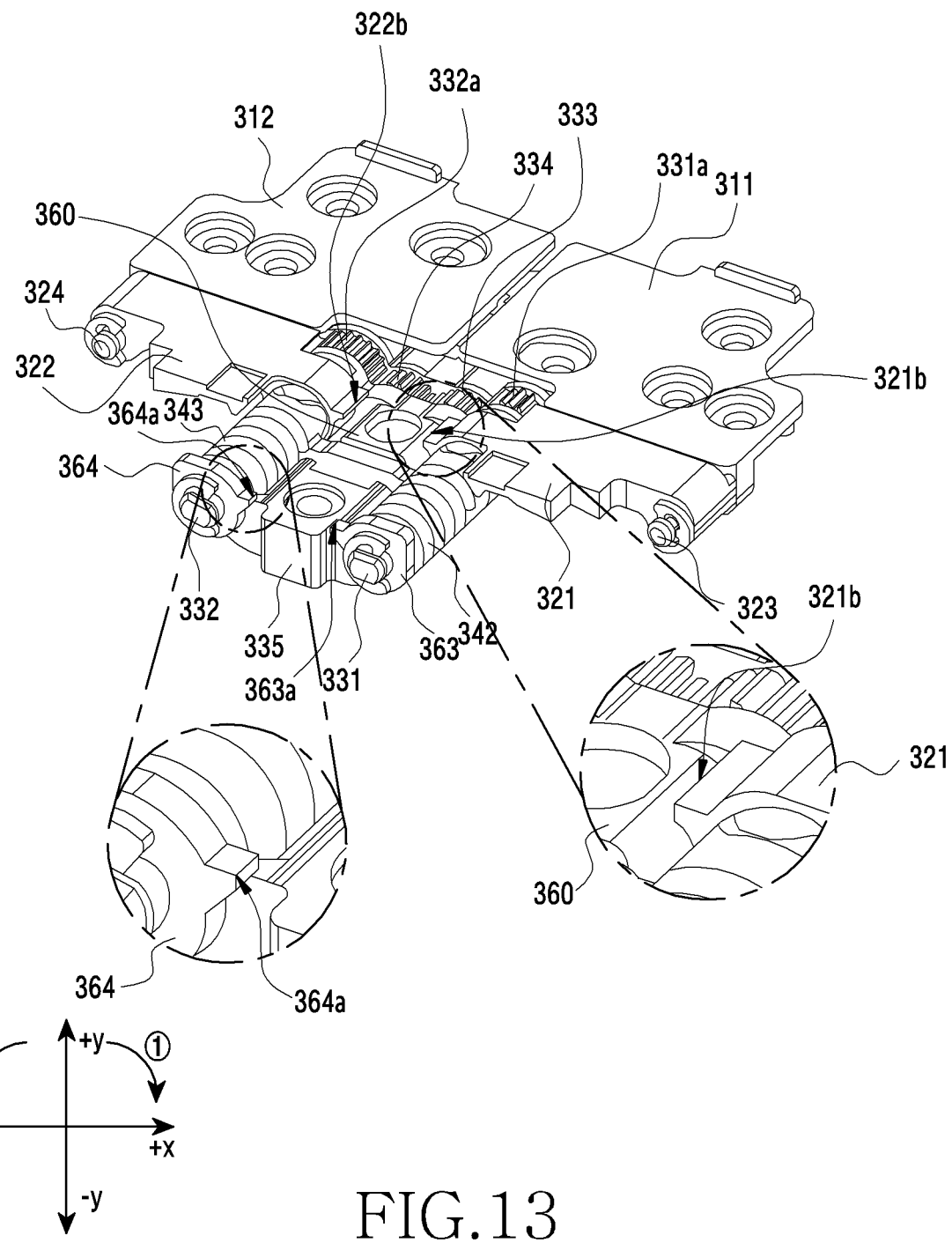
FIG. 13 illustrates an enlarged view of a hinge structure according to an embodiment.

FIG. 13 illustrates a hinge structure according to an embodiment.

Referring to FIG. 13, the hinge structure 300a of an electronic device includes a first bracket 311, a second bracket 312, a first arm 321, a second arm 322, a first fixing portion 323, a second fixing portion 324, a first shaft 331 to which a first gear 331a is coupled, a second shaft 332 to which a second gear 332a is coupled, a first idle gear 333, a second idle gear 334, a shaft bracket 335, a first spring 342, a second spring 343, a stopper 360, a first auxiliary member 363, and a second auxiliary member 364. At least one of components of the hinge structure 300a of FIG. 13 may be identical or similar to at least one of components of the hinge structure 300a or 300b of FIG. 6, and redundant descriptions will be omitted hereinafter.

The first arm 321 includes a first support rib 321b, and the second arm 322 includes a second support rib 322b. The first support rib 321b may be constructed to protrude from one region of the first arm 321. In addition, the second support rib 322b may be constructed to protrude from one region of the second arm 322. When the electronic device is in an unfolded state, the first support rib 321b may be constructed to protrude in a direction of the stopper 360 located between the first arm 321 and the second arm 322 from the first arm 321. Similarly, the second support rib 322b may be constructed to protrude in a direction of the stopper 360 from the second arm 322.

The first support rib 321b may be constructed integrally with the first arm 321, and may rotate along with a rotation of the first arm 321. The second support rib 322b may be constructed integrally with the second arm 322, and may rotate along with a rotation of the second arm 322. As the first support rib 321b and the second support rib 322b rotate together with the first arm 321 and the second arm 322, a support portion disposed on the stopper 360 may move in an upper direction (e.g., the +y direction). While the electronic device rotates from the folded state to the unfolded state, at least one region of the first support rib 321b and second support rib 322b may be in contact with one region of the support portion (e.g., a rear face of the support portion).

As the first arm 321 rotates clockwise (e.g., the direction ①), the first support rib 312b may move the support portion 350 in an upper direction. As the second arm 322 rotates counterclockwise (e.g., the direction ②), the second support rib 322b may move the support portion 350 in an upper direction.

The first auxiliary member 363 may be coupled to one end of the first shaft 331 adjacent to the first arm 321, and the second auxiliary member 364 may be coupled to one end of the second shaft 332 of the second arm 322. The first auxiliary member 363 may be coupled to the first shaft 331 to rotate together with the first shaft 331. The second auxiliary member 364 may be coupled to the second shaft 332 to rotate together with the second shaft 332.

The first auxiliary member 363 includes a third support rib 363a constructed to protrude from one region of the first auxiliary member 363. The second auxiliary member 364 includes a fourth support rib 364a constructed to protrude from one region of the second auxiliary member 364. The third support rib 363a may be disposed at a position parallel to the first support rib 321b of the first arm 321, and the fourth support rib 364a may be disposed at a position parallel to the second support rib 322b of the second arm 322. The third support rib 363a may be spaced apart from the first support rib 321b to rotate by the same rotation angle as the first support rib 321b with the rotation of the first shaft 331. The fourth support rib 364a may be spaced apart from the second support rib 322b to rotate by the same rotation angle as the second support rib 322b with the rotation of the second shaft 332.

The third support rib 363a and the fourth support rib 364a may move the support portion 350 in an upper direction while the electronic device rotates from the folded state to the unfolded state, similarly to the first support rib 321b and the second support rib 322b. The third support rib 363a and the fourth support rib 364a may be in contact with one region of the support portion 350 while the electronic device rotates from the folded state to the unfolded state. As the first shaft 331 rotates clockwise (e.g., the direction ①), the third support rib 363a may move the support portion 350 in an upper direction. As the second shaft 332 rotates counterclockwise (e.g., the direction ②), the fourth support rib 364a may move the support portion 350 in an upper direction.

Accordingly, the hinge structure 300a may move the support portion 350 in an upper direction while the electronic device rotates from the folded state to the unfolded state through the first support rib 321b, the second support rib 322b, the third support rib 363a, and the fourth support rib 364a. Consequently, the support portion 350 can be in contact with a rear face of a flexible display, thereby preventing the flexible display from being sagged and/or damaged when the electronic device is in the unfolded state.

Figure 14A:
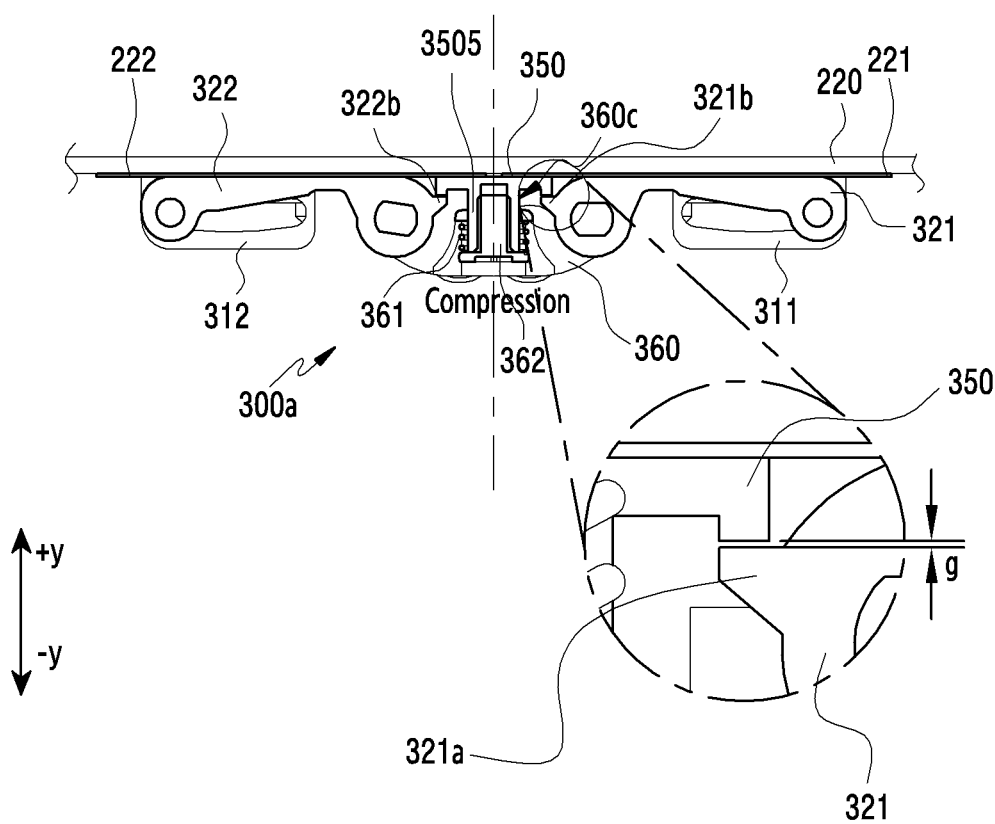
FIG. 14A illustrates a compressed state of an elastic member and first and second arms of a hinge structure when an electronic device is an unfolded state according to an embodiment.
Figure 14B:
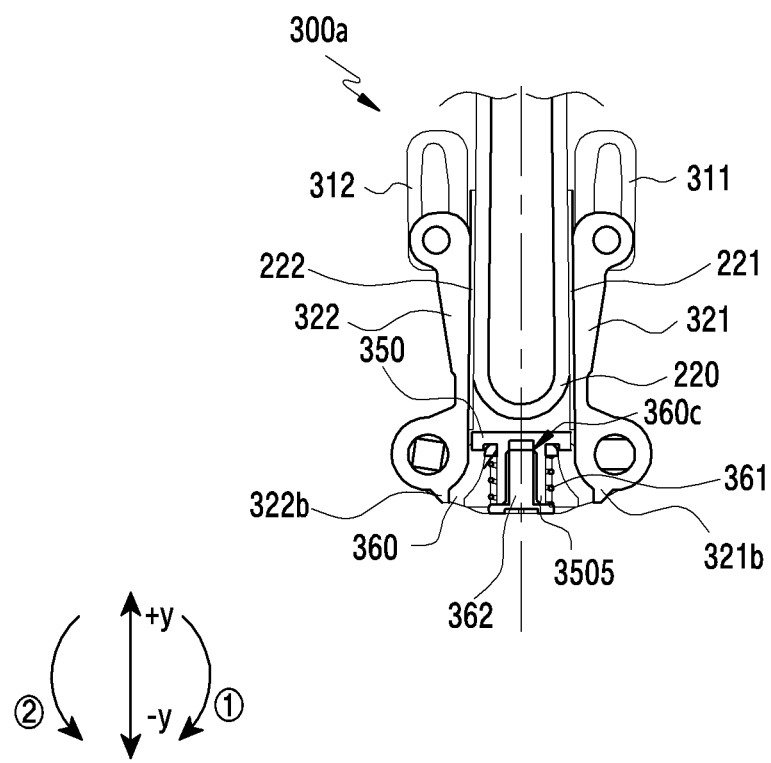
FIG. 14B illustrates an elongated state of an elastic member and first and second arms of a hinge structure when an electronic device is in a folded state according to an embodiment.

FIG. 14A illustrates a compressed state of an elastic member and first and second arms of a hinge structure when an electronic device is an unfolded state according to an embodiment. FIG. 14B illustrates an elongated state of an elastic member and first and second arms of a hinge structure when an electronic device is in a folded state according to an embodiment.

Referring to FIGS. 14A and 14B, an electronic device includes a flexible display 220, a first support plate 221 supporting the flexible display 220, a second support plate 222, and the hinge structure 300a.

The hinge structure 300a includes a first bracket 311, a second bracket 312, a first arm 321, a second arm 322, a support portion 350, a stopper 360, an elastic member 361, and a screw 362.

The support portion 350 may move in a direction of a rear face of the flexible display 220 by using a first support rib 321b of the first arm 321 and a second support rib 322b of the second arm 322, when the electronic device rotates from the folded state to the unfolded state. Through the aforementioned process, the support portion 350 may support one region of the flexible display 220 that is not supported by the first arm 321 and the second arm 322, when the electronic device is in the unfolded state.

When the electronic device is in the unfolded state, a gap 'g' may be constructed between the support portion 350 and the first support rib 321b of the first arm 321 and the second support rib 322b of the second arm 322. When the electronic device is in the unfolded state, as the gap is constructed between the support portion 350 and the first support rib 321b and the second support rib 322b, the support portion 350 can be prevented from moving in a direction of the flexible display 220 by at least a specified distance. When the electronic device is in the unfolded state, the gap between the support portion 350 and the first support rib 32b and the second support rib 322b may be constructed to be greater than a gap between a protrusion region E1 of a shaft bracket 355 or a protrusion region E2 of the stopper 360 and a fixing rib constructed in one region of the support portion 350. As a result, the support portion 350 can be prevented from moving in a duplicate manner in an upper direction by the first support rib 321b and the second support rib 322b. That is, when the electronic device is in the unfolded state, the hinge structure 300a can prevent the flexible display 220 from being damaged by the support portion 350 through the gap constructed between the support portion 350 and the first support rib 321b and the second support rib 322b.

The stopper 360 may be located at a lower end (e.g., the −y direction) of the support portion 350, and a through-hole 360c may be constructed in one region of the stopper 360. An elastic support portion 3505 of the support portion 350 may be located at a lower end of the stopper 360 by passing through the through-hole 360c, and the screw 362 may be coupled to the elastic support portion 3505 of the support portion 350 passing through the through-hole 360c. An outer circumferential surface of one face of the screw 362 facing the elastic support portion 3505 may be constructed to be greater than an outer circumferential surface of the elastic support portion 3505, so that the elastic member 361 is disposed between the stopper 360 and the screw 362. The elastic member 361 may be a spring for example, but is not limited thereto.

One end of the elastic member 361 may be in contact with one region of the stopper 360 (e.g., a neighboring region of the through-hole 360c), and the other end may be in contact with the screw 362 coupled to the protrusion region of the support portion 350. The elastic member 361 may be compressed when the support portion 350 moves in an upper direction (e.g., the +y direction), or may be restored to its original state due to elastic restoration force.

As the electronic device rotates from the folded state to the unfolded state, the support portion 350 moves in a direction of the flexible display 220. The screw 362 coupled to the elastic support portion 3505 may also move in an upper direction (e.g., the +y direction) due to the movement of the support portion 350, and the elastic member 361 may be compressed due to the upward movement of the screw 362.

As the electronic device rotates from the unfolded state to the folded state, the first arm 321 may rotate counterclockwise (e.g., the direction ②), and the second arm 322 may rotate clockwise (e.g., the direction ①), so that the first support rib 321b and the second support rib 322b are spaced apart from the support portion 350. As the first support rib 321b and second support rib 322b are spaced apart from the support portion 350, pressure may be applied to the screw 362 in a lower direction (e.g., the −y direction) due to elastic restoration force of the compressed elastic member 361. Due to the pressure applied to the screw 362, the screw 362 and the support portion 350 coupled with the screw 362 may move in a lower direction (e.g., the −y direction). That is, while the electronic device rotates from the unfolded state to the folded state, the support portion 350 may be spaced apart from the flexible display 220 due to the elastic restoration force of the elastic member 361 located between the stopper 360 and the screw 362.

Through the aforementioned driving process, the support portion 350 may not interrupt a rotation trajectory (or a "driving trajectory") of the flexible display 220 or the first support plate 221 and the second support plate 222 while the electronic device rotates from the unfolded state to the folded state. However, when the electronic device is in the unfolded state, the support portion 350 may support one region of the flexible display 220 that is not supported by the first arm 321 and the second arm 322, thereby preventing the flexible display 220 from being damaged or sagged.

Figure 15A:
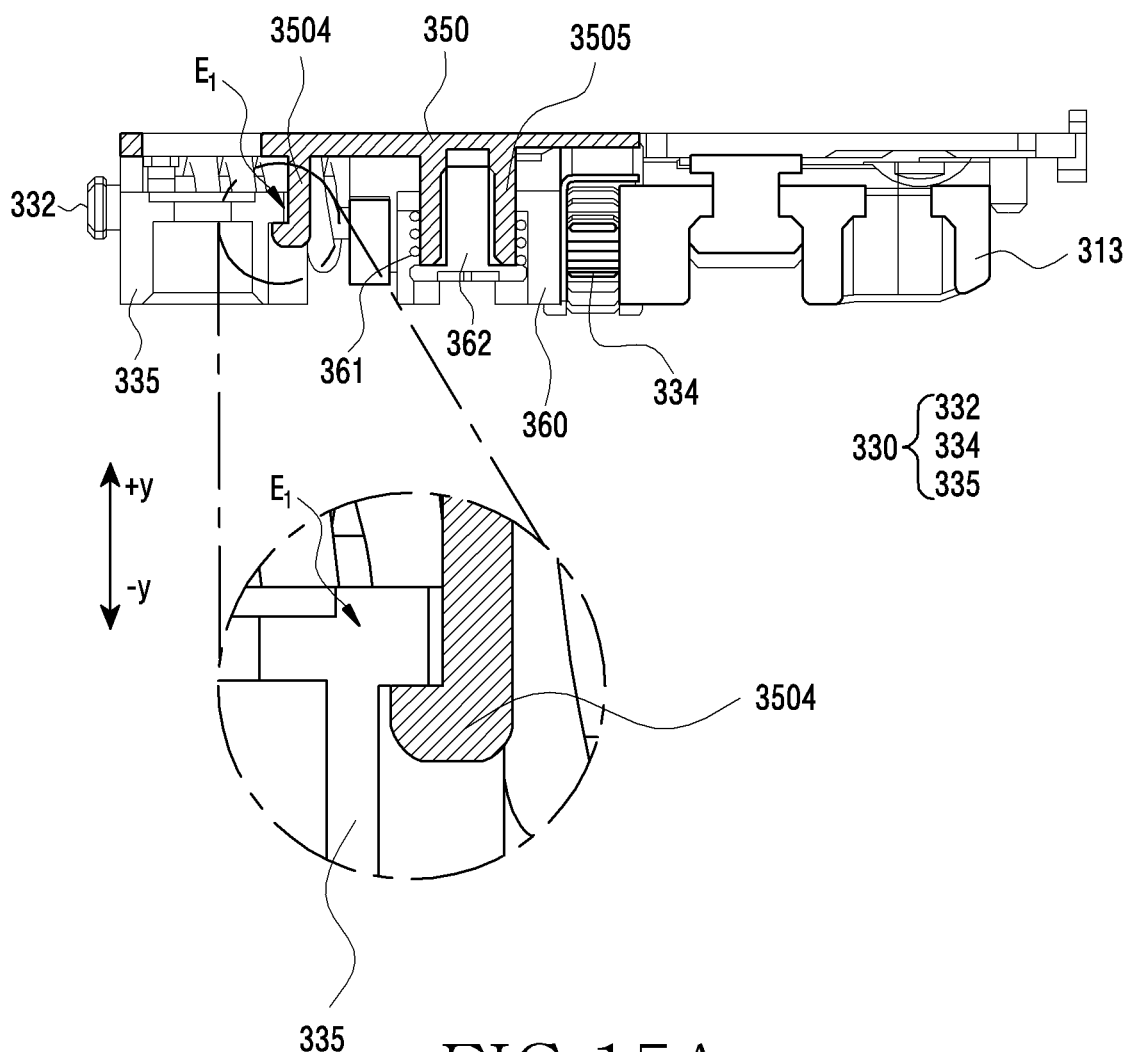
FIG. 15A illustrates a cross-section of a hinge structure when an electronic device is in a 180-degree unfolded state according to an embodiment.
Figure 15B:
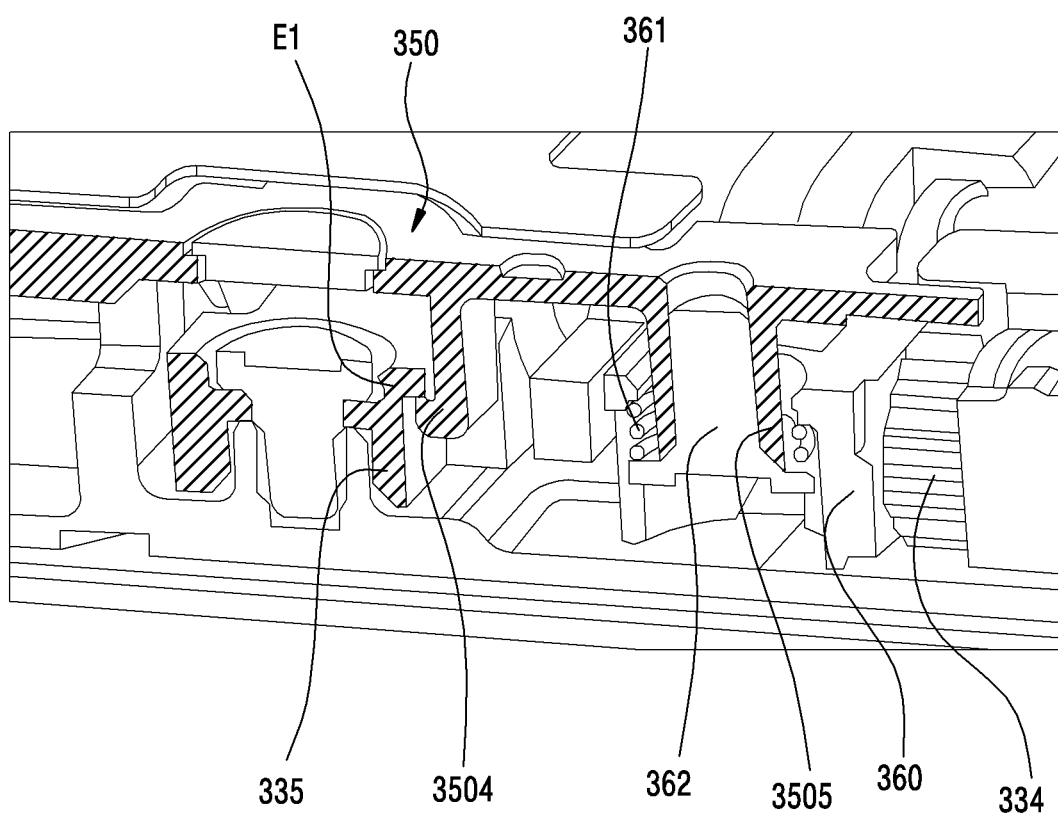
FIG. 15B illustrates a perspective view of a cross-section of a hinge assembly when an electronic device is an unfolded state according to an embodiment.
Figure 15C:
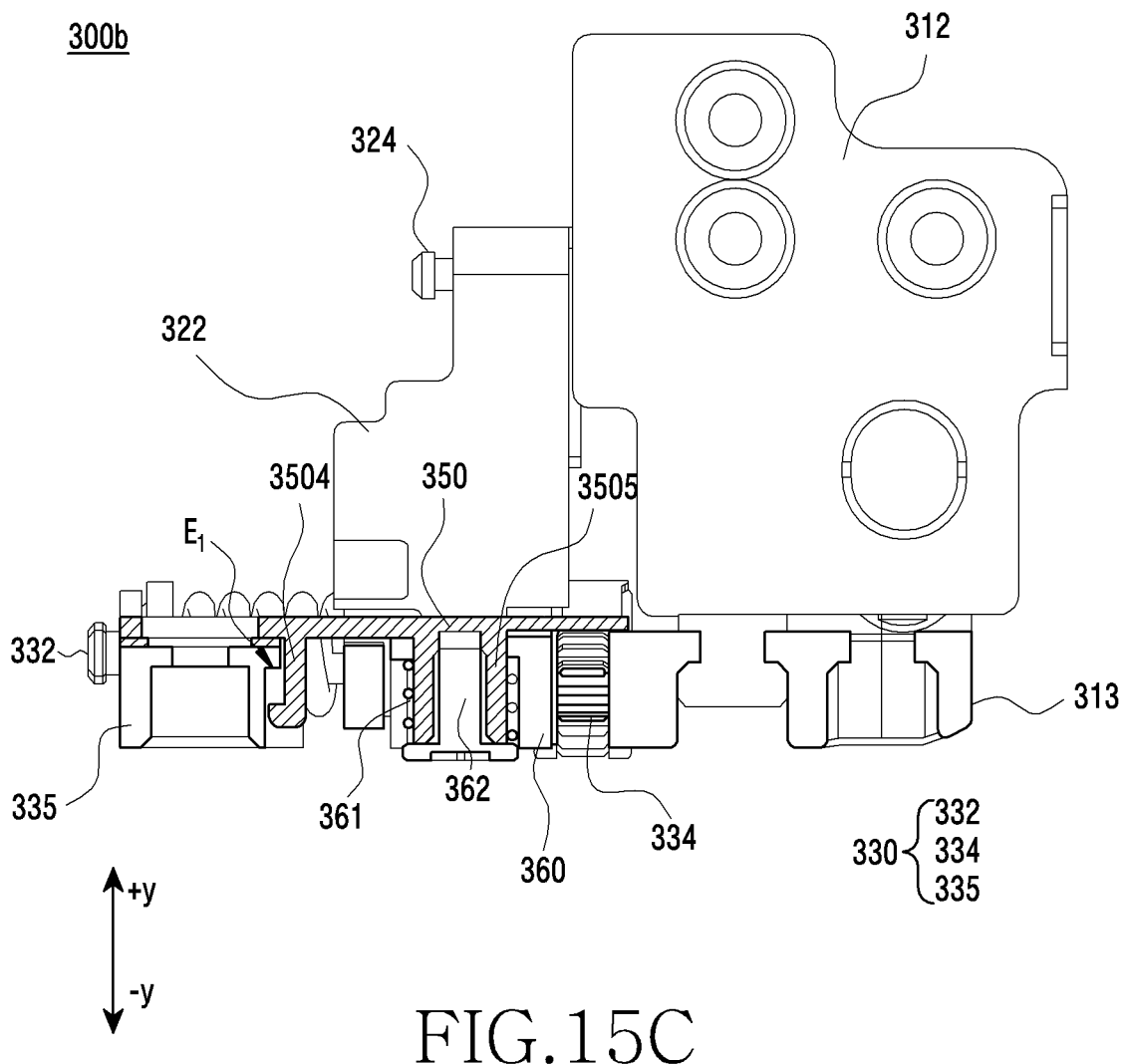
FIG. 15C illustrates a cross-section of a hinge structure when an electronic device is in a folded state according to an embodiment.
Figure 15D:
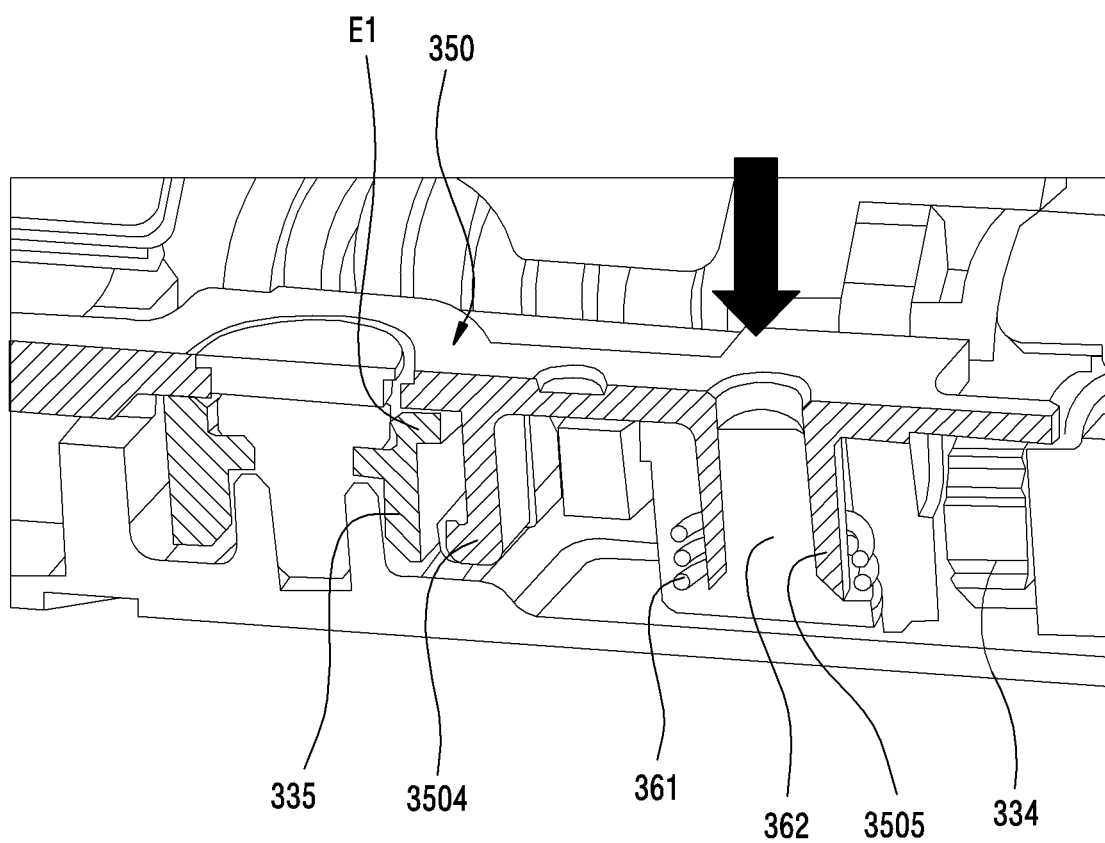
FIG. 15D illustrates a cross-section of a hinge structure while an electronic device is folded according to an embodiment.

FIG. 15A illustrates a cross-sectional view, cut along the line B-B' of FIG. 10A, of a hinge structure when an electronic device is in a 180-degree unfolded state according to an embodiment. FIG. 15B illustrates a cross-section of a hinge assembly when an electronic device is an unfolded state according to an embodiment. FIG. 15C illustrates a cross-sectional view, cut along the line B-B' of FIG. 10C, of a hinge structure when an electronic device is in a folded state according to an embodiment. FIG. 15D illustrates a cross-section of a hinge structure while an electronic device is folded according to an embodiment.

Referring to FIGS. 15A to 15D, a hinge structure 300b of an electronic device includes a second bracket 312, a fixing bracket 313, a second arm 322, a second fixing portion 324 coupling the second bracket 312 and the second arm 322, a rotation structure 330 including a second shaft 332, a second idle gear 334, and a shaft bracket 335, a support portion 350, a stopper 360, an elastic member 361, and a screw 362. At least one of components of the hinge structure 300b of FIG. 15A may be identical or similar to at least one of components of the hinge structure 300a or 300b of FIG. 6, and redundant descriptions will be omitted hereinafter.

The support portion 350 may be located on the stopper 360, and may include an elastic support portion 3505 and a fixing rib 3504. The elastic support portion 3505 may be constructed to protrude in a lower direction (e.g., the −y direction) of the support portion 350, and may be coupled with the screw 362 as described above to compress the elastic member 361 while the electronic device rotates from the folded state to the unfolded state. The fixing rib 3504 may be constructed to protrude in a lower direction of the elastic support portion 3505 similarly to the elastic support portion 3505, and in a lateral view, may be constructed in a hook shape curved in a direction of the shaft bracket 335.

The fixing rib 3504 may be fixed to one region of the shaft bracket 335 to prevent the support portion 350 from moving by at least a specified distance in an upper direction (e.g., the +y direction) or in a direction of a flexible display while the electronic device rotates from the folded state to the unfolded state.

The shaft bracket 335 includes a fixing region E1. The fixing region E1 may be constructed to protrude in a direction of the stopper 360 from one region of the shaft bracket 335. As the electronic device rotates from the folded state, as illustrated in FIG. 15C, to the unfolded state, as illustrated in FIG. 15A, the support portion 350 may move in an upper direction, and the fixing rib 3504 of the support portion 350 may be in contact with the fixing region E1 of the shaft bracket 335 due to the upward movement of the support portion 350.

When the electronic device is in the unfolded state, the hook-shaped fixing rib 3504 may be in contact with a lower region of the fixing region E1 so that the fixing rib 3504 of the support portion 350 is caught at the fixing region E1 of the shaft bracket 335. When the support portion 350 moves in an upper direction by at least a specified distance, pressure may be applied in the upper direction to the flexible display disposed to an upper end of the support portion 350, and some regions of the flexible display may be damaged due to the pressure applied by the support portion 350. When the electronic device is in the unfolded state, the fixing rib 3504 of the support portion 350 may be disposed to be in contact with the fixing region E1 of the shaft bracket 335 without a gap, so that the support portion 350 can be prevented from moving in the upper direction by at least a specified distance.

When the electronic device rotates from the unfolded state to the folded state, the support portion 350 may move in a lower direction (e.g., the −y direction) due to elastic restoration force of the elastic member 361 as described above.

Accordingly, the fixing rib 3504 may be spaced apart from the fixing region E1 of the shaft bracket 335. As the fixing rib 3504 is spaced apart from the fixing region E1 of the shaft bracket 335, the support portion 350 may move in a lower direction without being affected by the fixing region E1. That is, the hinge structure 300b may control the movement of the support portion 350 so that the support portion 350 moves in an upper direction within a specified range through the fixing rib 3504 of the support portion 350 and the fixing region E1 of the shaft bracket 335.

Figure 16:
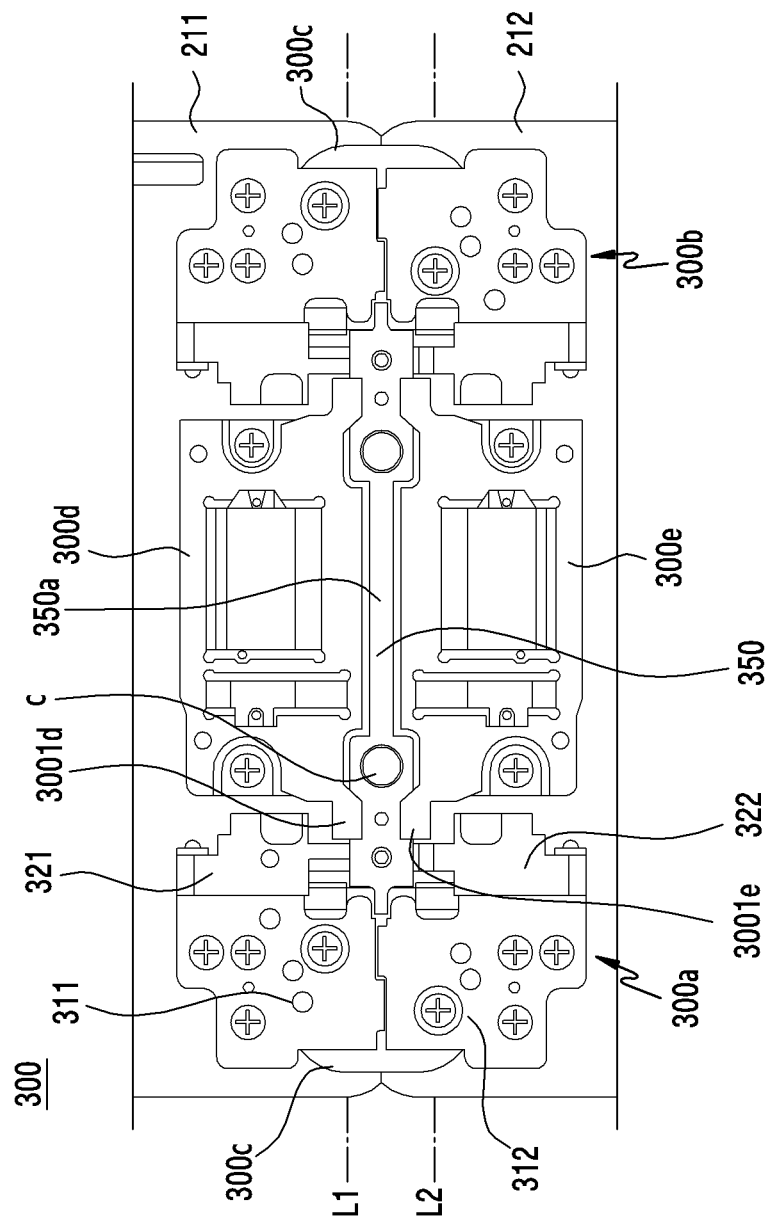
FIG. 16 illustrates a hinge assembly fastened to an unfolded electronic device according to an embodiment.

FIG. 16 illustrates a hinge assembly fastened to an unfolded electronic device according to an embodiment.

Referring to FIG. 16, an electronic device includes the hinge assembly 300. The hinge assembly 300 include hinge structures 300a and 300b.

The hinge housing 300c includes a recess to which the hinge structures 300a and 300b can be disposed. The hinge structures 300a and 300b may be disposed inside the recess of the hinge assembly 300, and the hinge structures 300a and 300b may be supported by the hinge housing 300c.

The hinge assembly 300 includes the first hinge structure 300a disposed to one region of the hinge housing 300c and the second hinge structure 300b disposed to another region of the hinge housing 300c. The first hinge structure 300a may be disposed to the left region of the hinge housing 300c, and thus may be coupled (or "connected") to one region of a first housing and second housing. The second hinge structure 300b may be disposed to the right region of the hinge housing 300c, and thus may be coupled (or "connected") to the first housing and the second housing. The first hinge structure 300a and the second hinge structure 300b may rotate within a specified angle range about a virtual first rotation axis (e.g., L1) constructed in the hinge housing 300c and a virtual second rotation axis L2 parallel to the virtual first rotation axis L1. One region of the first hinge structure 300a and one region of the second hinge structure 300b may rotate about the first rotation axis L1, and another region of the first hinge structure 300a and another region of the second hinge structure 300b may rotate about the virtual second rotation axis L2. That is, the first hinge structure 300a and the second hinge structure 300b may be folded about the virtual first rotation axis L1 and second rotation axis L2, and details thereof will be described below. However, the hinge assembly 300 is not limited to the aforementioned embodiment, and the hinge assembly 300 may include three or more hinge structures.

The hinge assembly 300 further includes first and second hinge plates 300d and 300e disposed between the first hinge structure 300a and the second hinge structure 300b. The first and second hinge plates 300d and 300e may be fastened respectively to first and second housing 211 and 212, and may support at least some regions of a flexible display. The first and second hinge plates 300d and 300e may be constructed of a metal or non-metal material having a specified rigidity to support the flexible display.

The first and second hinge structures 300a and 300b may be disposed at both sides, e.g., left and right sides, with respect to the support portion 350. The first and second hinge plates 300e and 300d may be disposed at upper and lower sides with the support portion 350. The first and second arms 321 and 322 and the first and second brackets 311 and 312 may be disposed respectively at upper and lower sides with respect to both ends of the support portion 350.

When the electronic device is unfolded by 180 degrees, movement members, e.g., a cam or a hinge spring, of the first and second hinge structures 300a and 300b, may be covered respectively by first and second protrusion portions 3001d and 3001e of the first and second hinge plates.

The support portion 350 is assembled with a cap 'c', so that the first face 350a of the support portion and an upper face of the cap 'c' are in a co-planar state. In this state, the first face 350a of the support portion may support a folding region of the flexible display to be flat.

Figure 17A:
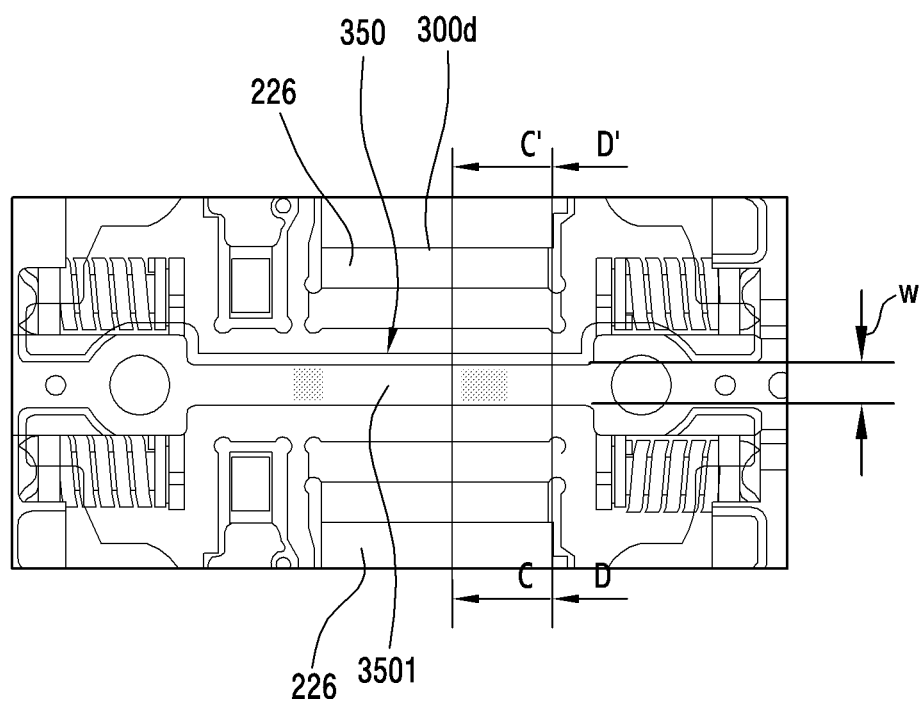
FIG. 17A illustrates a support portion in a mounting state according to an embodiment.
Figure 17B:
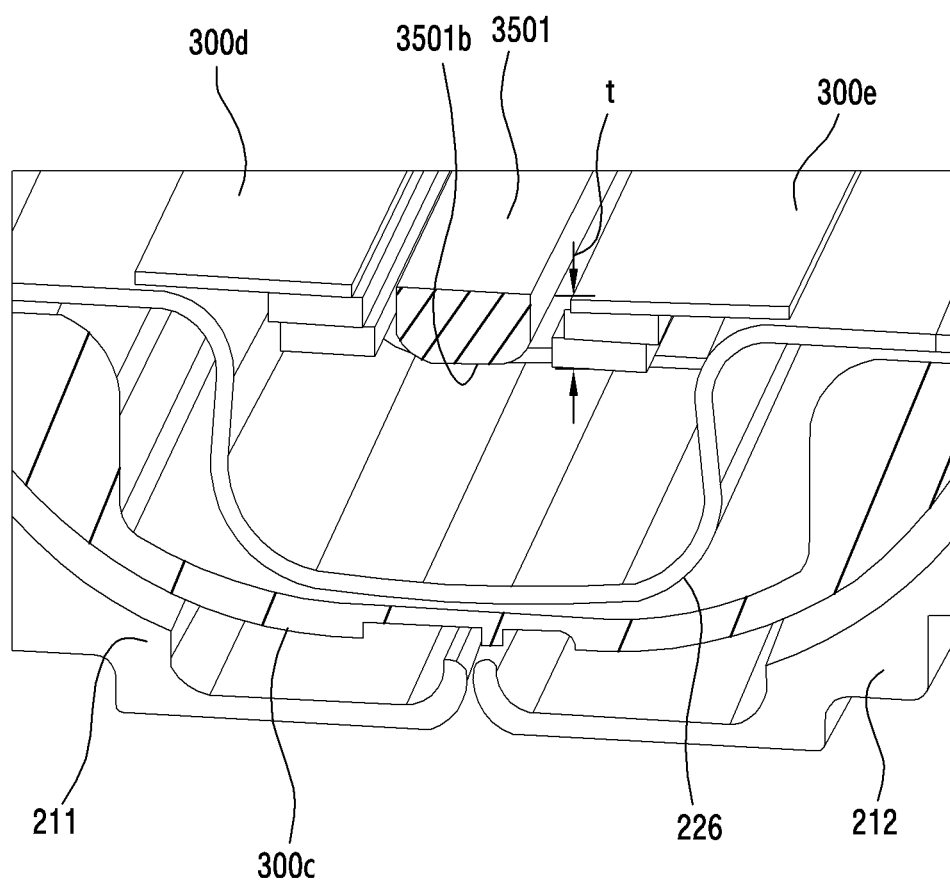
FIG. 17B illustrates a perspective view of the support portion of FIG. 17A, cut along the line C-C'.
Figure 17C:
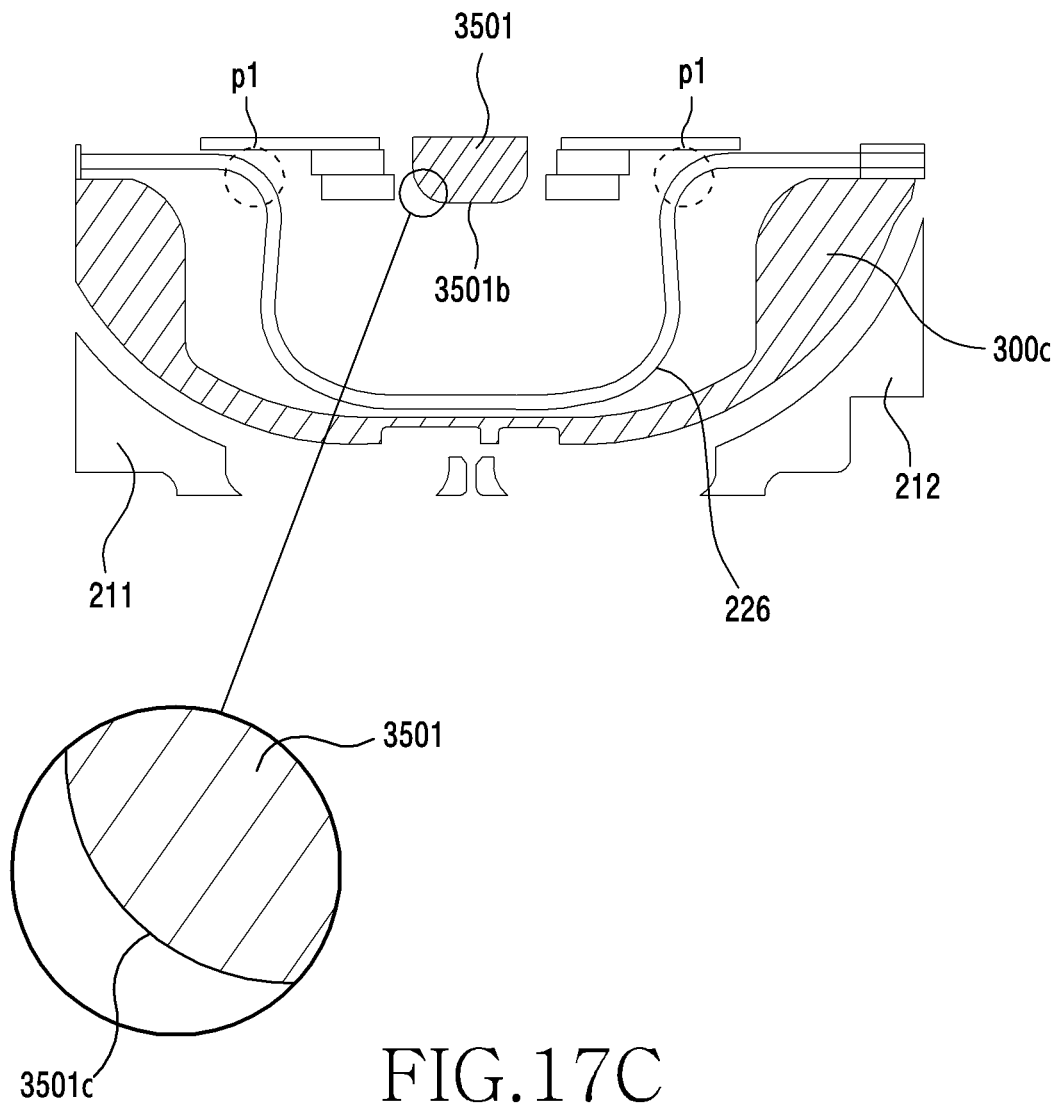
FIG. 17C illustrates a cross-sectional view of the support portion of FIG. 17A, cut along the line C-C'.

FIG. 17A illustrates a mounting state of a support portion according to an embodiment. FIG. 17B illustrates a perspective view of the support portion of FIG. 17A, cut along the line C-C'. FIG. 17C illustrates a cross-sectional view of the support portion of FIG. 17A, cut along the line C-C'.

Referring to FIGS. 17A to FIG. 17C, a center portion 3501 of a support portion 350 may be a portion in which operational interference may occur due to a movement of an FPCB 226 for electrically coupling first and second electronic components disposed respectively to first and second housings. In an opening/closing operation of the electronic device, one portion of the FPCB 226 may be folded or unfolded in a space between a hinge housing 300c and the center portion 3501. The FPCB 226 may move in the space in the folding and unfolding operation, and the FPCB 226 may be interfered with neighboring adjacent portions, e.g., an edge portion of first and second hinge plates 300d and 300e, according to the movement.

When a width 'w' of the center portion 3501 is increased to safely support a flexible display, there is a risk in that one portion p1 of the FPCB is stamped (e.g., disconnected). To prevent this, the width 'w' of the center portion 3501 may be limited, and the width 'w' may be determined by considering a movement trajectory of the FPCB 226 to be folded, in an operation of folding or unfolding the electronic device. For example, the width 'w' of the center portion 3501 may be approximately 2 mm.

An element that can limit the width 'w' of the center portion is a distance between first and second rotation axes located at both sides, and the width 'w' may be less than a distance between the first and second rotation axes.

The center portion 3501 may have a limited thickness 't'. The thickness 't' of the center portion 3501 may be determined by considering a movement trajectory of the FPCB which is folded or bent in an operation of folding or unfolding the electronic device. For example, the thickness 't' of the center portion 3501 may be approximately 1 mm.

Edge portions 3501c (e.g., corner portions) of the center portion 3501 may be curved. When folding or unfolding the electronic device, operational interference occurs between both edge portions 3501c and the FPCB 226, and thus the FPCB may be stamped or disconnected. To prevent this, the edge portions 3501c at a lower side of the center portion 3501 may be curved. For example, each of the edge portions 3501c may have a curvature.

Figure 18:
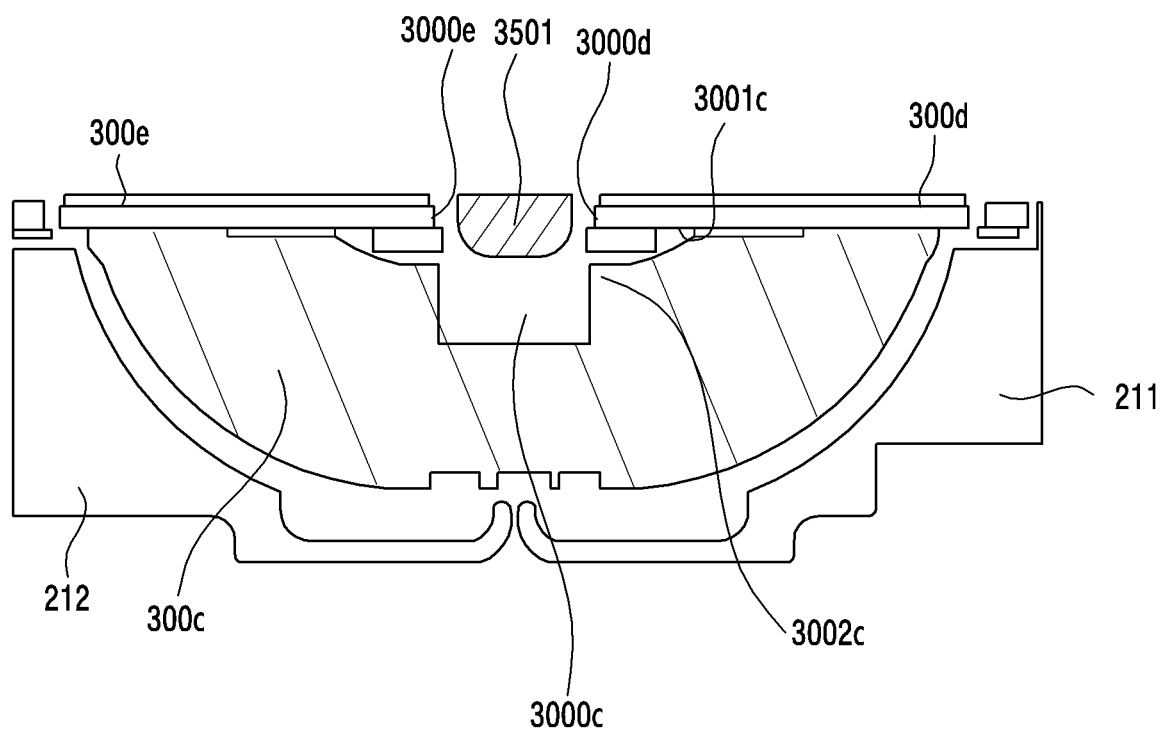
FIG. 18 illustrates a cross-sectional view of the support portion of FIG. 17A, cut along the line D-D'.

FIG. 18 illustrates a cross-sectional view of the support portion of FIG. 17A, cut along the line D-D'.

Referring to FIG. 18, a center portion 3501 and a hinge housing 300c facing the first and second hinge plates 300d and 300e may be constructed by considering a movement trajectory of the center portion 3501 and edge portions 3000d and 3000e of the first and second hinge plates 300d and 300e adjacent to the center portion 3501. The hinge housing 300c includes a first opening 3000c considering a movement trajectory of the center portion 3501 and a second opening 3001c considering a movement trajectory of the edge portions 3000d and 3000e of the hinge plate.

When the electronic device moves from a folded state to an unfolded state or moves from the unfolded state to the folded state, the center portion 3501 may move limitedly in a direction closer to or away from the hinge housing 300c, and the edge portions 3000d and 3000e of the first and second hinge plates may perform a rotation movement. The first and second openings 3000c and 3001c of the hinge housing may be constructed by considering a movement space of the center portion 3501 and a space of a rotation movement of an edge portion of an FPCB plate. For example, the first opening 3000c has a recess shape, and extends along a direction in which the hinge housing 300c extends. The second opening 3001c has a recess shape, and is constructed to have a smaller depth than a recessed depth of the first opening 3000c. A stepped portion 3002c may be constructed between the first and second openings 3000c and 3001c. The first opening 3000c may have the second opening 3001c at both sides, and the second opening 3001c may be constructed in a symmetric manner.

From a perspective of the presence or absence of the center portion 3501, since a distance between the edge portions 3000d and 3000e of the first and second hinge plates is increased due to the center portion 3501, a trajectory drawn by the edge portions 3000d and 3000e may be decreased depending on the operation of opening/closing the electronic device. Therefore, a depth of the opening 3001c constructed at the hinge housing 300c is decreased, and a support structure of the support portion 350 capable of supporting the flexible display is extendable to the maximum extent possible. Accordingly, a support section is also movable inwardly, thereby securing rigidity of the hinge housing 300c and extending the support section.

Figure 19A:
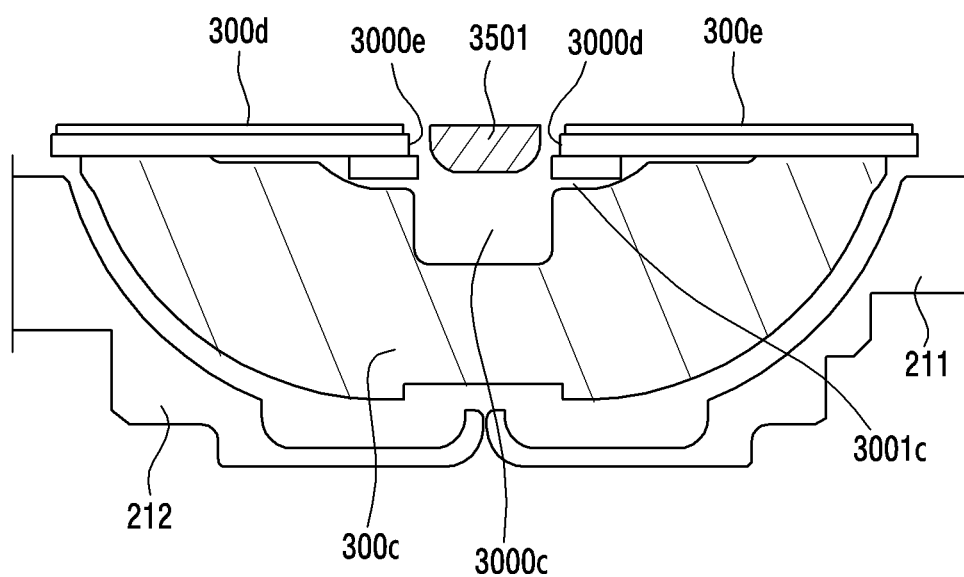
FIGS. 19A to 19C illustrate a process of opening/closing an electronic device according to an embodiment.
Figure 19B:
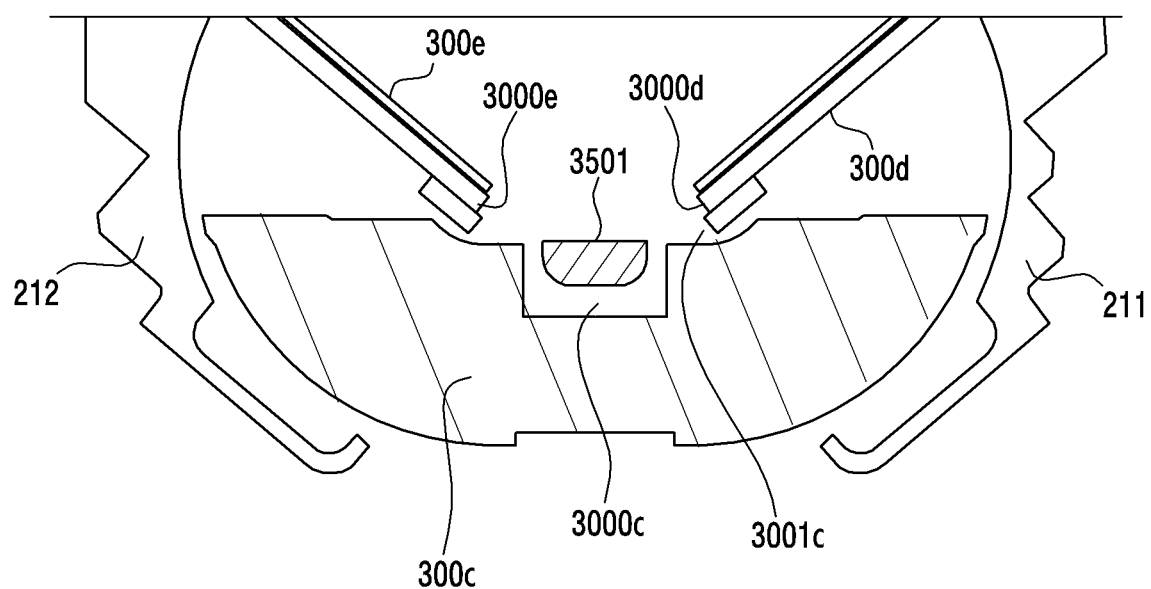
Figure 19C:
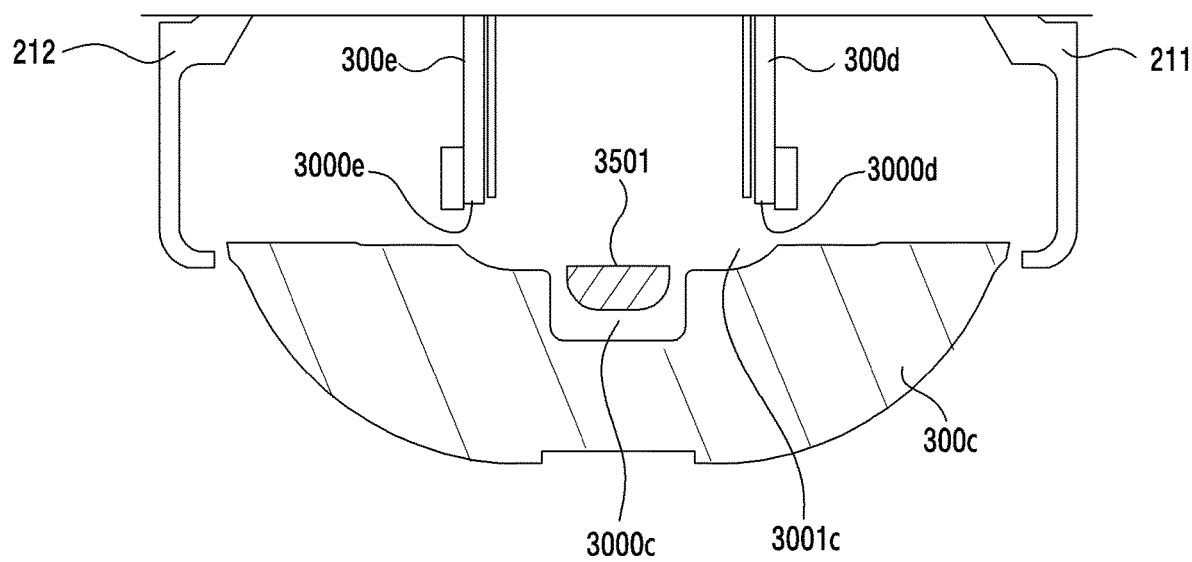

FIGS. 19A to 19C illustrate a process of opening/closing an electronic device according to an embodiment. Specifically, FIG. 19A illustrates a 180-degree unfolded state, FIG. 19B illustrates an approximately 90-degree open state, and FIG. 19C illustrates a folded state.

Referring to FIG. 19A, when the electronic device is in an unfolded state, a center portion 3501 may be located outside a first opening 3000c, and edge portions 3000d and 3000e of first and second hinge plates 300d and 300e may be located inside the second opening 3001c. The first and second hinge plates 300d and 300e may be supported by the hinge housing 300c. When the electronic device is unfolded by 180 degrees, each of the first and second plates 300d and 300e is in a parallel state, and the hinge housing 300c may be a support structure of the first and second hinge plates 300d and 300e in the parallel state.

Referring to FIG. 19B, when the electronic device is in an approximately 90-degree unfolded state, the center portion 3501 may be located in the first opening 3000c, and the edge portions 3000d and 3000e of the first and second hinge plates may be slightly detached from the second opening 3001c. The edge portions 3000d and 3000e of the respective first and second hinge plates may perform a rotation operation along the second opening 3001c.

Referring to FIG. 19C, when the electronic device is in a folded state, the center portion 3501 may be located in the first opening 3000c, and the edge portions 3000d and 3000e of the first and second hinge plates may be completely detached from the second opening 3001c. The first and second hinge plates 300d and 300e may be free from interference of the hinge housing 300c.

Figure 20A:
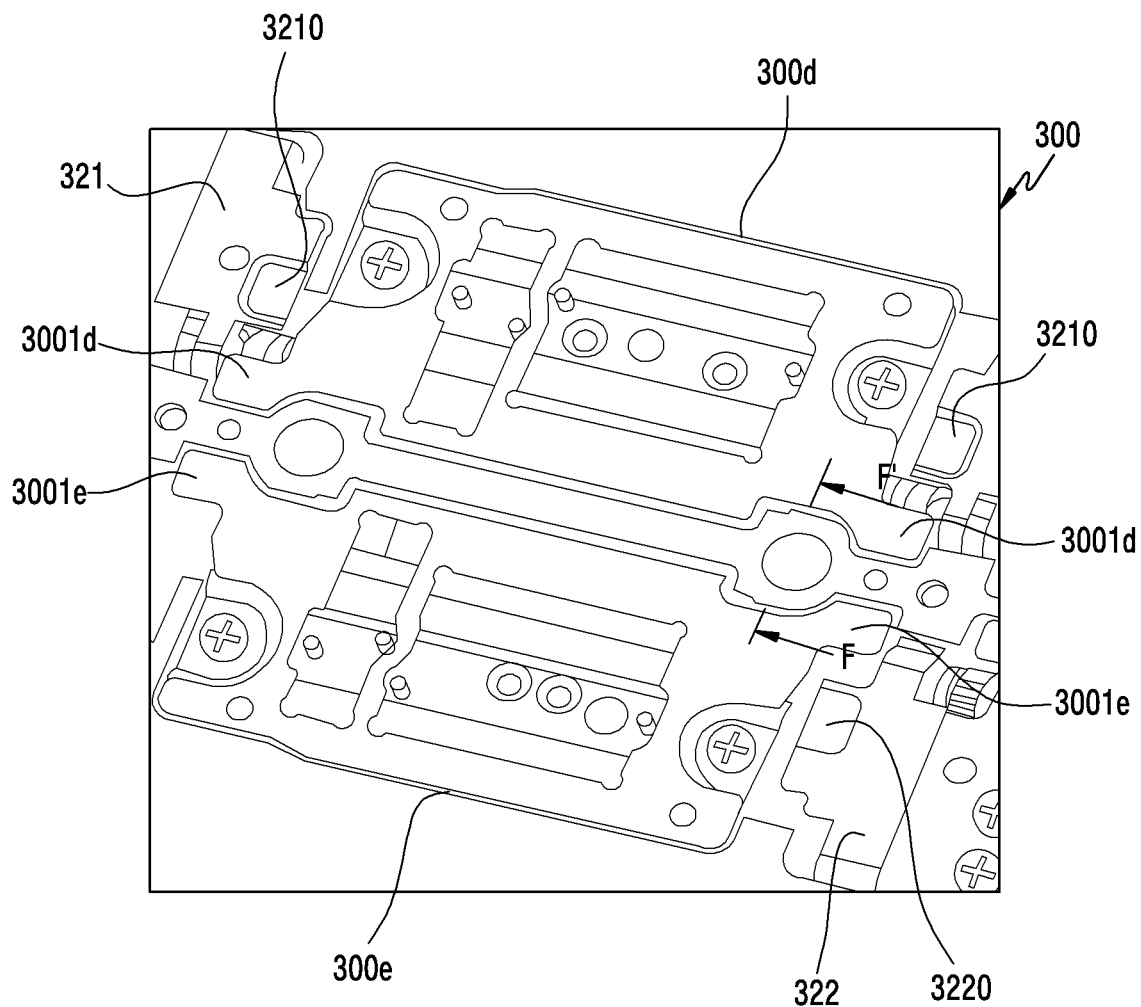
FIG. 20A illustrates a mounting state of first and second hinge plates in a 180-degree unfolded electronic device according to an embodiment.
Figure 20B:
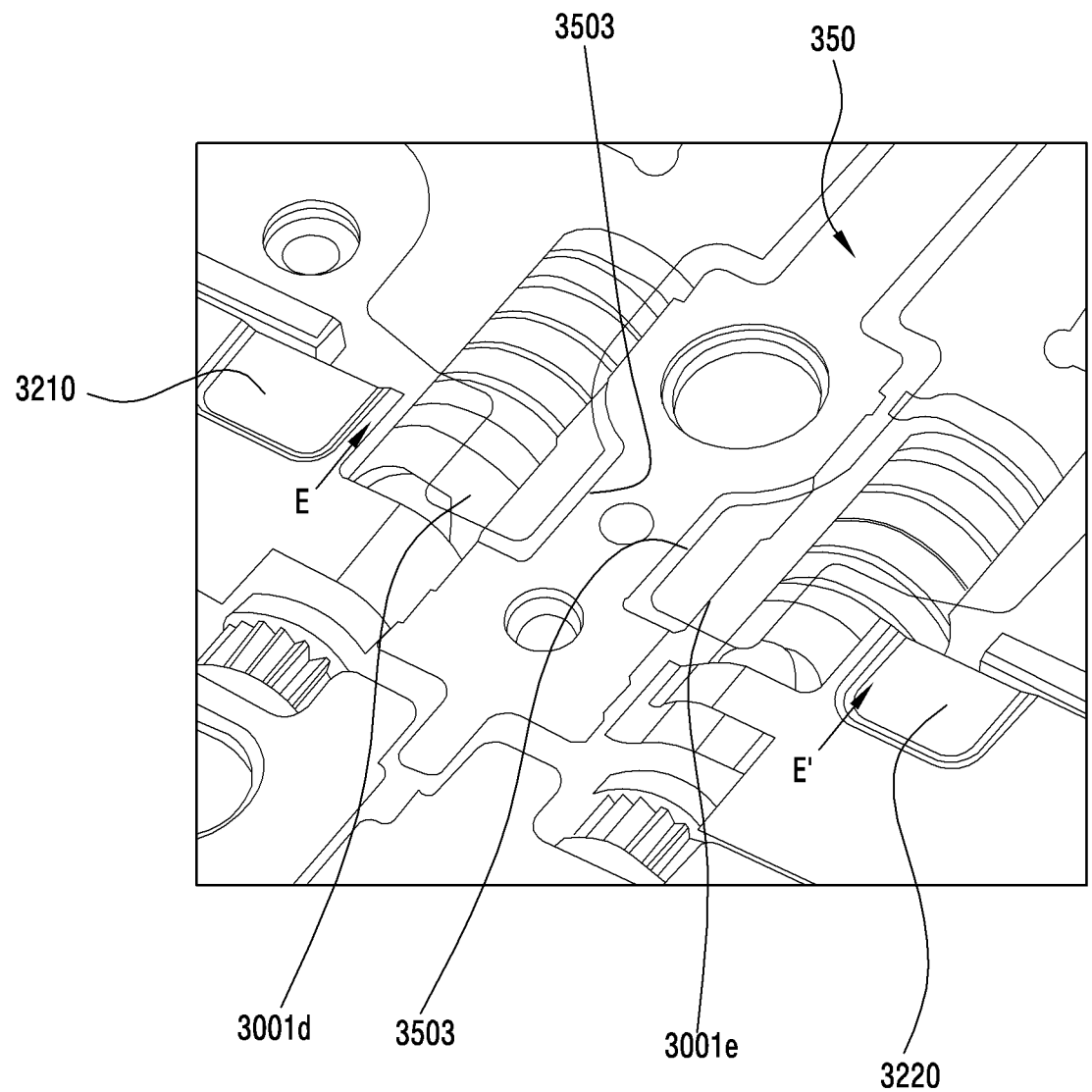
FIG. 20B illustrates an enlarged view of a protrusion portion mounted to a support groove of FIG. 20A.
Figure 20C:
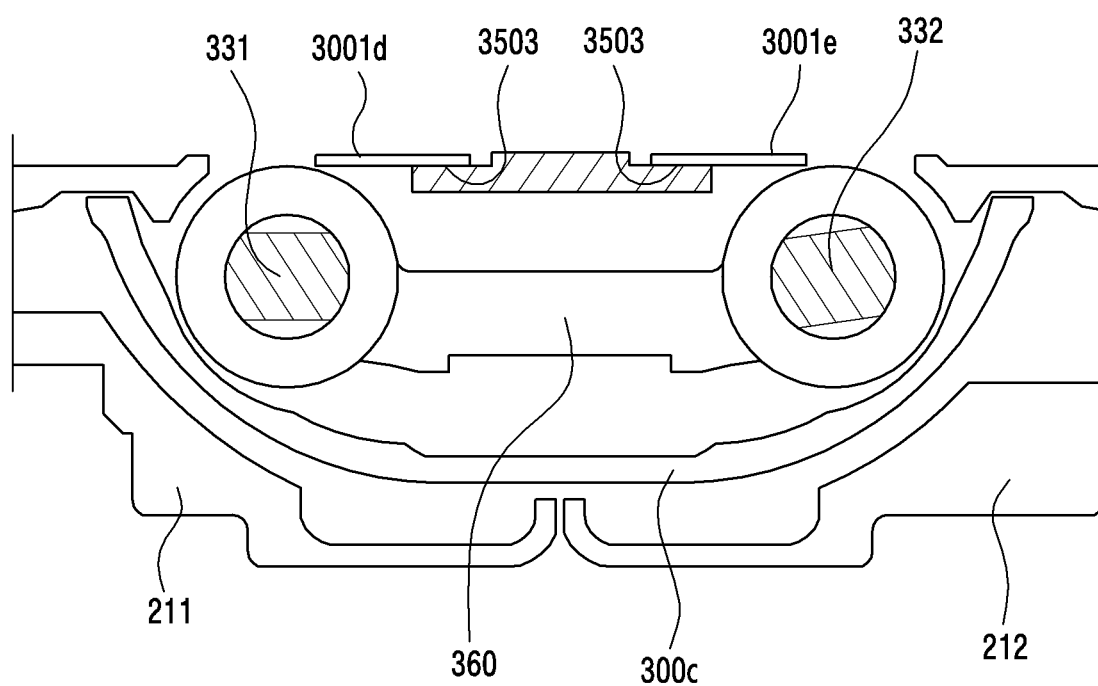
FIG. 20C illustrates a cross-sectional view cut along the line E-E' of FIG. 20B.

FIG. 20A illustrates a mounting state of first and second hinge plates in a 180-degree unfolded electronic device according to an embodiment. FIG. 20B illustrates an enlarged view of a protrusion portion mounted to a support groove of FIG. 20A. FIG. 20C illustrates a cross-sectional view illustrating a state of FIG. 20B, cut along the line E-E'.

Figure 20D:
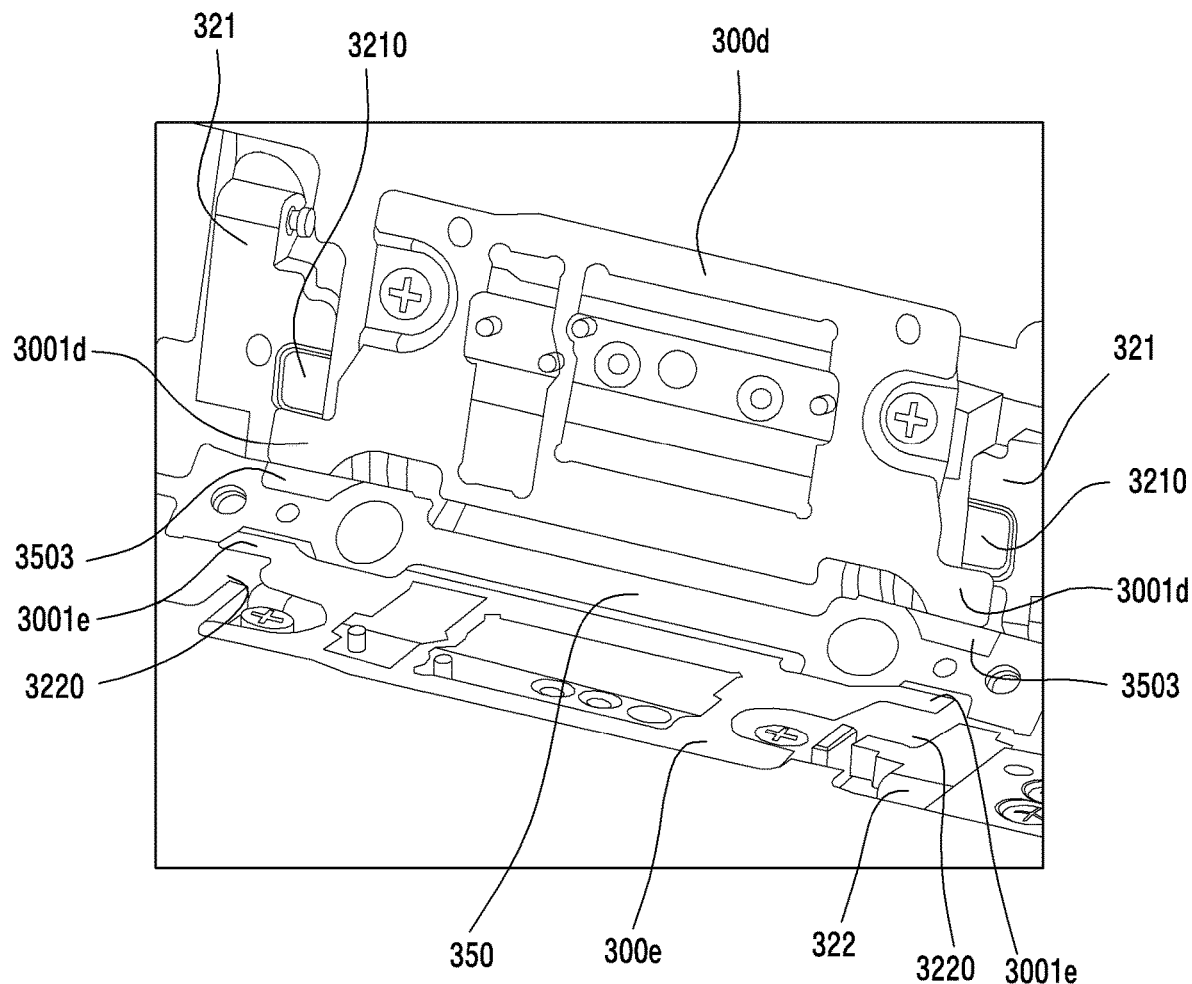
FIG. 20D illustrates a first hinge plate in a folded electronic device according to an embodiment.
Figure 20E:
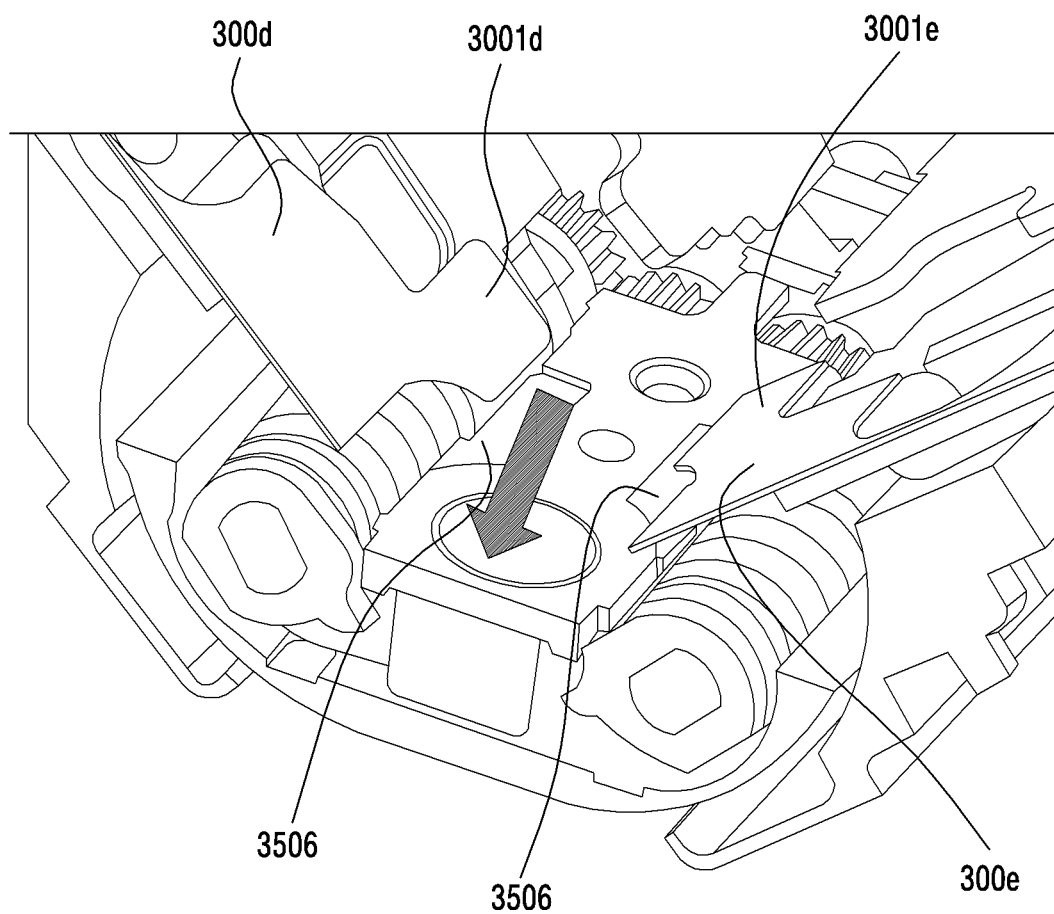
FIG. 20E illustrates a second hinge plate in a folded electronic device according to an embodiment.

FIGS. 20D and 20E illustrate perspective views of states of first and second hinge plates, in a folded electronic device according to an embodiment.

Referring to FIGS. 20A to 20E, a hinge assembly 300 includes first and second hinge plates 300d and 300e. The first and second hinge plates 300d and 300e may be a member for covering some components, e.g., a hinge spring and a hinge cam, of the hinge structure to prevent interference of a cam operation and for supporting the flexible display in a closed state or an open state.

The first and second hinge plates 300d and 300e may be fastened respectively to first and second housings by a fastener, and the first and second hinge plates 300d and 300e may support some regions of a flexible display. The first and second plates 300d and 300e may be constructed of a metal or non-metal material having a specified rigidity to support the flexible display.

The first and second hinge plates 300d and 300e respectively include first and second protrusion portions 3001d and 3001e.

The first and second protrusion portions 3001d and 3001e may be supported by one portion of a support portion 350 when the flexible display is unfolded by 180 degrees, and may be mounted to one portion of first and second arms 321 and 322 when the flexible display is folded.

The first and second protrusion portions 3001d and 3001e may be constructed in pair symmetrically with respect to the first hinge plate 300d, and may be constructed in pair symmetrically with respect to the second hinge plate 300e. Each of the first and second protrusions 3001d and 3001e may protrude toward the support portion 350.

When the electronic device is a 180-degree open state, the support portion 350 may have at least one support groove 3503 constructed to mount the first and second protrusion portions 3001d and 3001e, and when the electronic device is in a closed state, the first and second arms 321 and 322 may have at least one or more mounting grooves 3210 and 3220 to respectively mount the first and second protrusion portions 3001d and 3001e. The mounting grooves 3210 and 3220 may be constructed to prevent unnecessary interference in a folded state of the electronic device. The mounting grooves 3210 and 3220 may be escape grooves of the first and second protrusion portions 3001d and 3001e.

The first and second protrusion portions 3001d and 3001e may be supported by the support portion 350 by being mounted to the support groove 3503 of the support portion 350 in a 180-degree unfolded state, and may be mounted by the mounting grooves 3210 and 3220 constructed at first and second arms in a folded state. The first and second protrusion portions 3001d and 3001e may overlap the support portion 350 having the support groove 3503 in the 180-degree unfolded state, and may overlap respectively with the first and second arms 321 and 322 having the mounting grooves 3210 and 3220 in the folded state. The support groove 3503 may serve as a support of the first and second protrusion portions 3001d and 3001e. In the 180-degree unfolded state of the electronic device, the first and second hinge plates 300d and 300e may be stably supported, and thus the flexible display may also be stably supported.

Because a support structure of the first and second protrusion portions 3001d and 3001e and the support groove 3503 is located above a hinge spring and a hinge cam, operational interference with the flexible display may be prevented by being covered due to the support structure when the hinge spring is compressed or elongated, which occurs in the opening/closing operation of the electronic device.

Figure 20F:
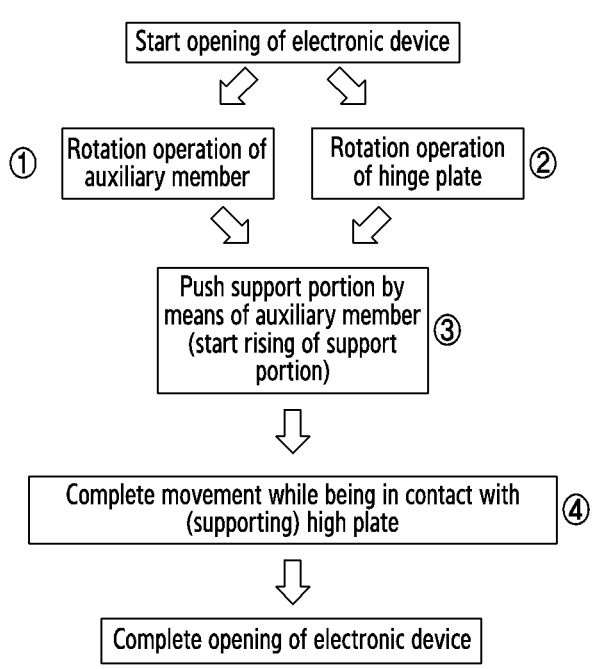
FIG. 20F illustrates operations of a hinge plate when an electronic device rotates from a closed state to an open state according to an embodiment.
Figure 20F:
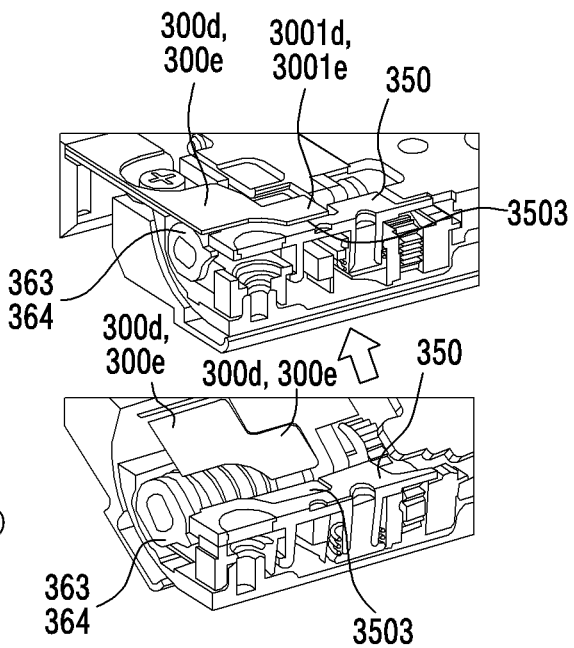

FIG. 20F illustrates operations of a hinge plate when an electronic device rotates from a closed state to an open state according to an embodiment.

Referring to FIG. 20F, when the electronic device is in an approximately 90-degree unfolded state, the support portion 350 may be separated from the auxiliary member.

When the electronic device rotates from a 90-degree unfolded state to a 180-degree unfolded state, the auxiliary members 363 and 364 may perform a rotation operation, and the first and second hinge plates 300d and 300e may perform a rotation operation (operations ① and ②).

The support portion 350 may move to an upper end by a push operation of the auxiliary members 363 and 364 (operation ③).

After the first and second hinge plates 300d and 300e are in contact with the support portion 350, the movement may be complete (operation ④). The first and second protrusion portions 3001d and 3001e may be mounted to the support groove 3503.

Figure 21A:
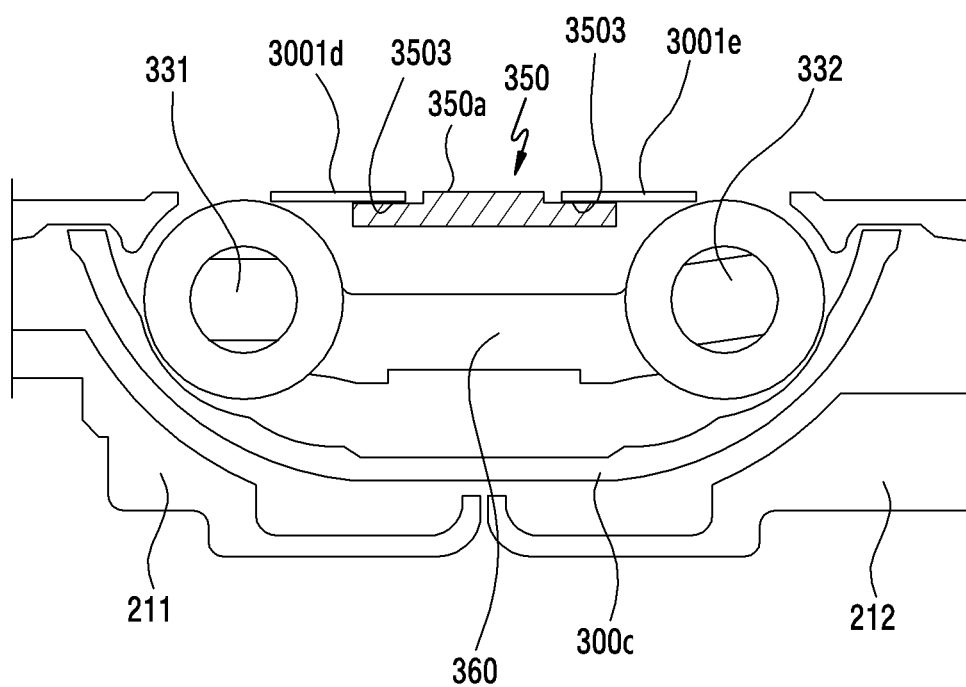
FIGS. 21A to 21C illustrate a process of opening/closing an electronic device according to an embodiment.
Figure 21B:
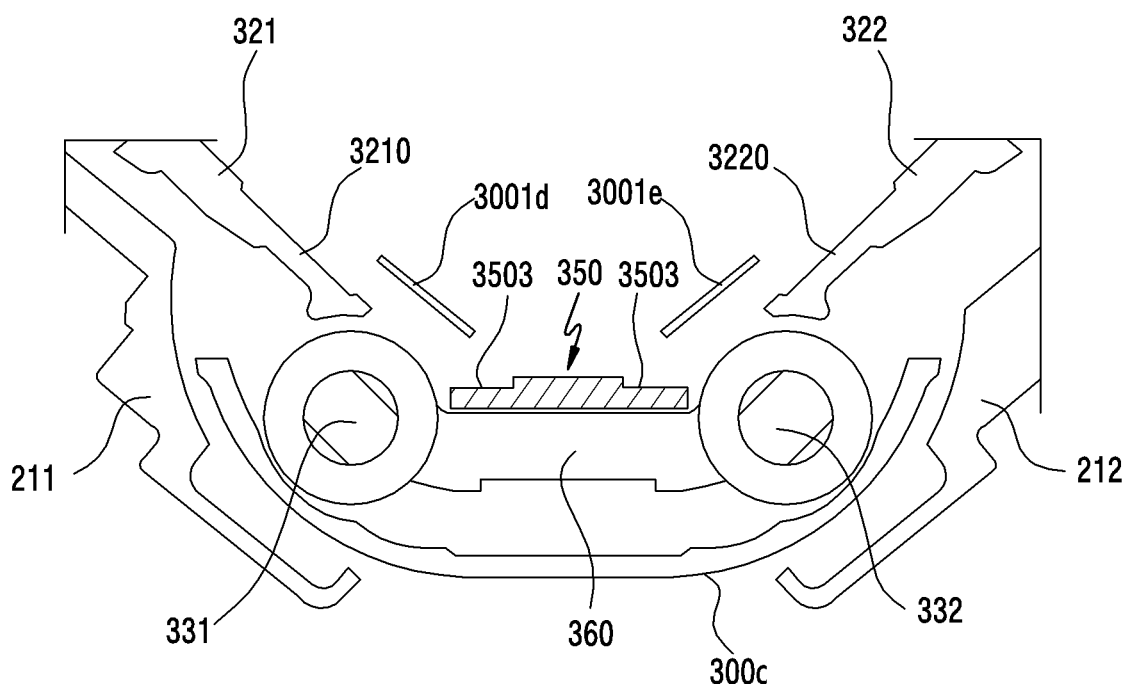
Figure 21C:
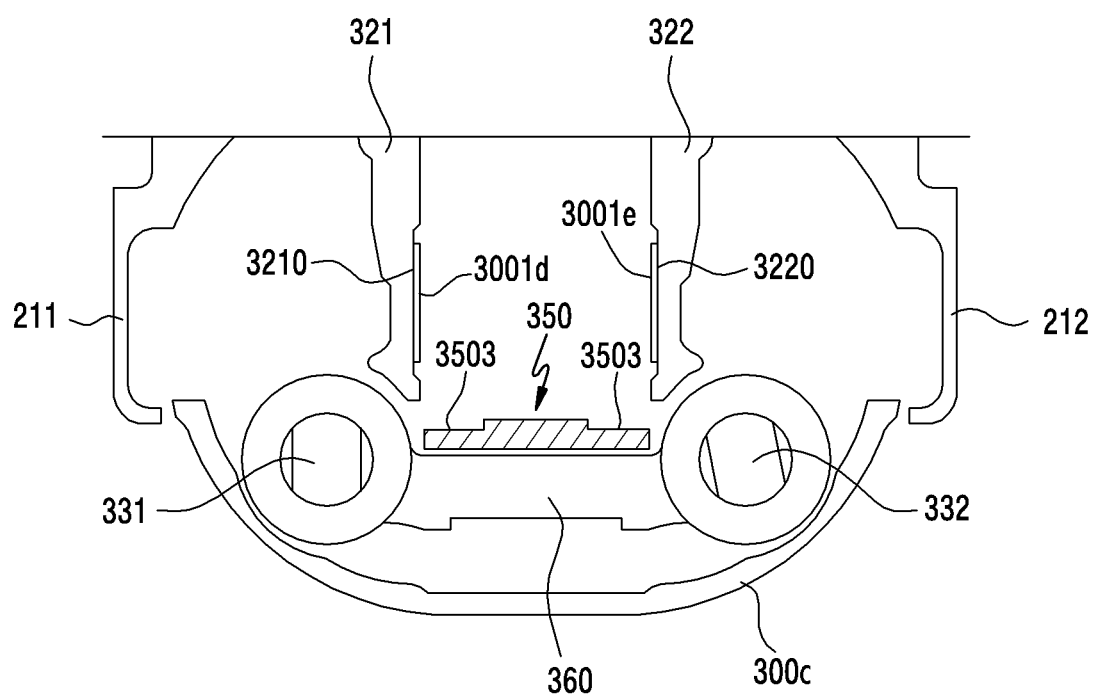

FIGS. 21A to 21C illustrate a support state between first and second protrusion portions and a support portion in a process of opening/closing an electronic device according to an embodiment. Specifically, FIG. 21A illustrates a 180-degree unfolded state, FIG. 21B illustrates a 90-degree folded state, and FIG. 20C illustrates a folded state.

Referring to FIG. 21A, when an electronic device is in a 180-degree open state, first and second protrusion portions 3001d and 3001e may be mounted to a support groove 3503, and may maintain a mounting state. For example, the first and second protrusion portions 3001d and 3001e and the support groove 3503 may be constructed in substantially corresponding shapes. In the 180-degree open state, when the first and second protrusion portions 3001d and 3001e are mounted to the support groove 3503, an outer surface of each of the first and second protrusion portions 3001d and 3001e may be in a co-planar state with respect to a first face of a support portion 350.

Referring to FIG. 21B, when the electronic device is in an approximately 45-degree open state, the first and second protrusion portions 3001d and 3001e may be disposed to be inclined with respect to the support portion 350 by being detached from the support groove 3503, and may move downwardly by means of an elastic body of the support groove 3503. The first and second protrusion portions 3001d and 3001e may be separated respectively from mounting grooves 3210 and 3220 of the first and second arms.

Referring to FIG. 21C, when the electronic device is in a closed state, the first and second protrusion portions 3001d and 3001e may be disposed in a vertical direction with respect to the support groove 3503, and may be mounted to the mounting grooves 3210 and 3220. The first and second protrusion portions 3001d and 3001e may maintain being supported by the mounting grooves 3210 and 3220.

Figure 22A:
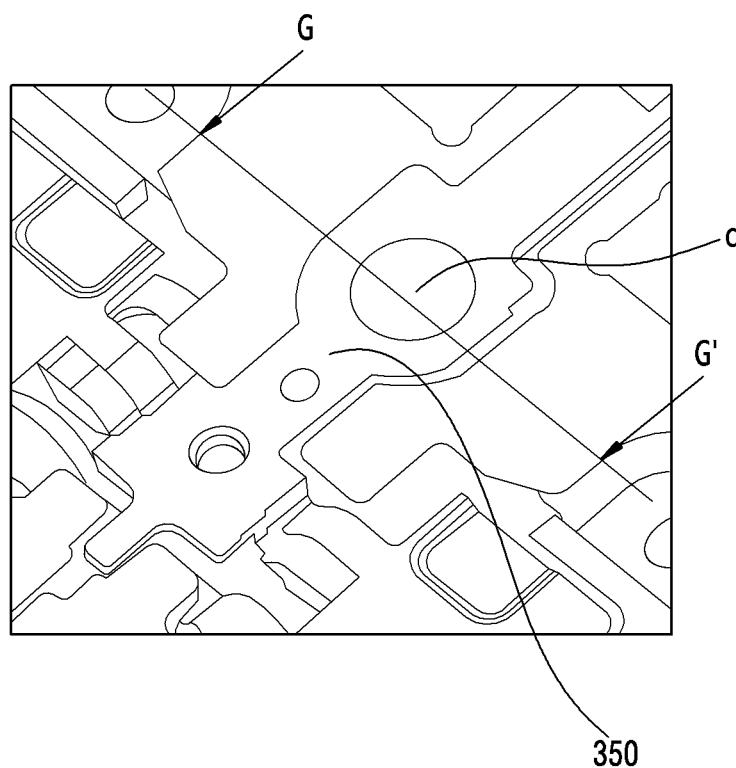
FIG. 22A illustrates a cap fastened to a fastening portion of a support portion according to an embodiment.
Figure 22B:
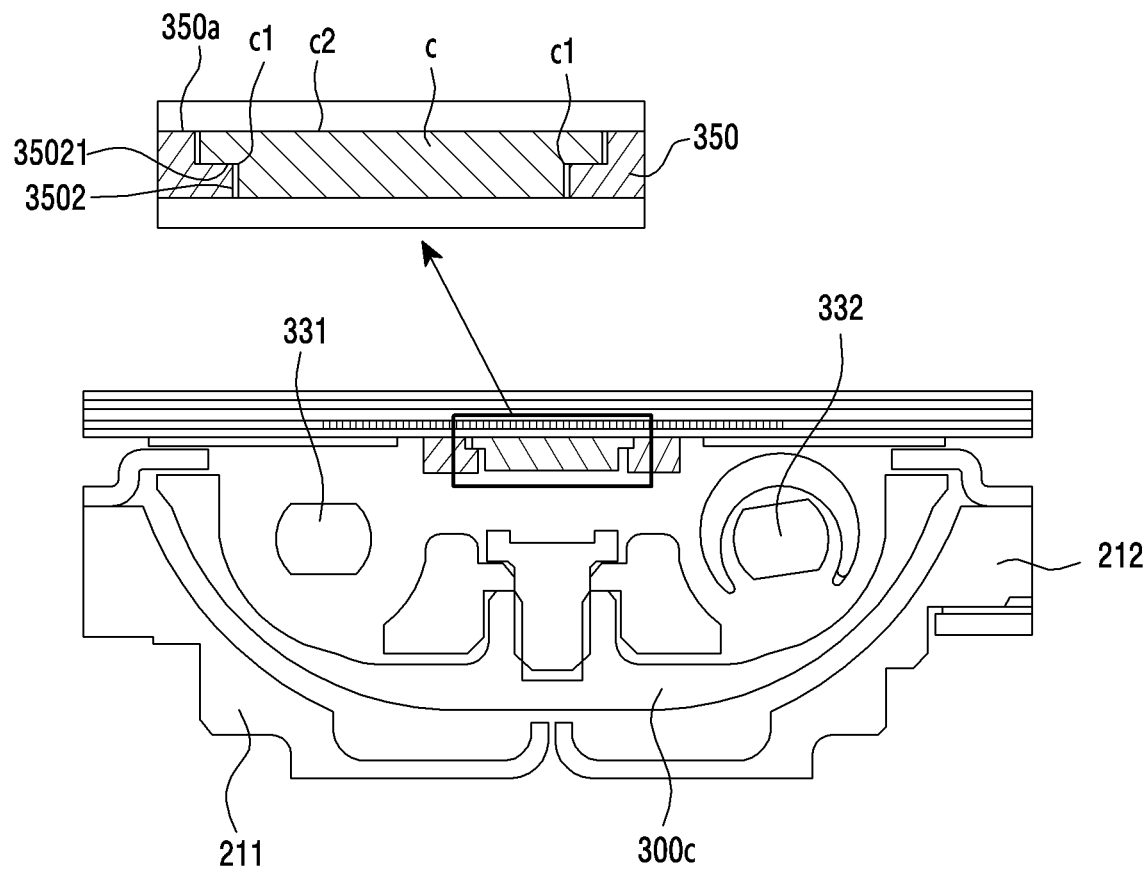
FIG. 22B illustrates a cross-sectional view of a cap fastened to a fastening portion of a support portion, cut along the line G-G' of FIG. 22A.
Figure 22C:
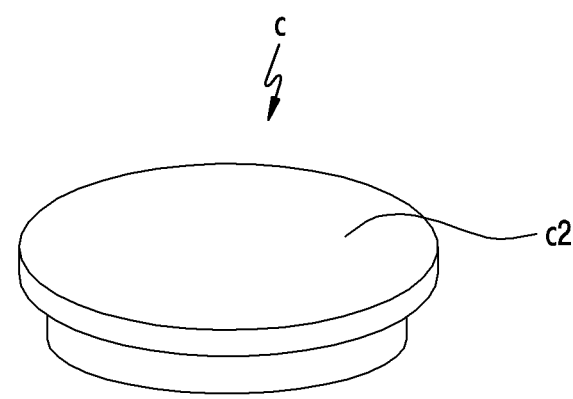
FIG. 22C illustrates a cap according to an embodiment.

FIG. 22A illustrates a cap fastened to a fastening portion of a support portion according to an embodiment. FIG. 22B illustrates a cross-sectional view cut along the line G-G' of FIG. 22A. FIG. 22C illustrates a perspective view of a cap according to an embodiment.

Referring to FIGS. 22A to 22C, a cap 'c' may be coupled to a fastening portion 3502 of a support portion 350. For example, as a fastening hole, the fastening portion 3502 may include a first stepped portion 35021. The cap 'c' has a cap shape corresponding to the fastening portion 3502 and includes a second stepped portion c1. When coupled to the fastening portion 3502, a first face 350a of the support portion 350 and an upper face c2 of the cap 'c' may be in a co-planar state. While folding or unfolding the electronic device, since the first face 350a of the support portion 350 and the upper face c2 of the cap are in the co-planar state, the folding region of a flexible display may be supported when in a 180-degree unfolded state. For example, the cap 'c' may be a support structure of the flexible display.

Figure 23A:
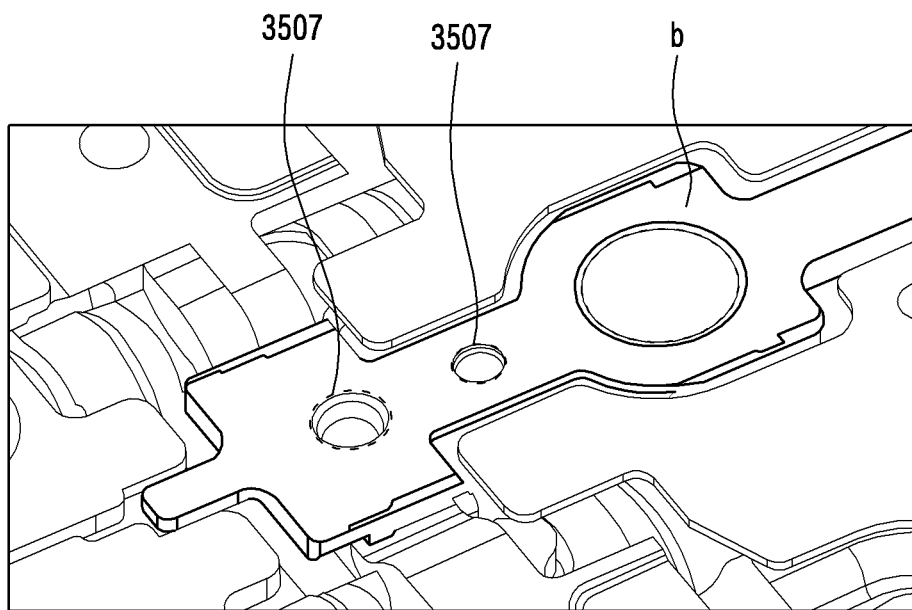
FIG. 23A illustrates tape attached to a first face of a support portion according to an embodiment.
Figure 23B:
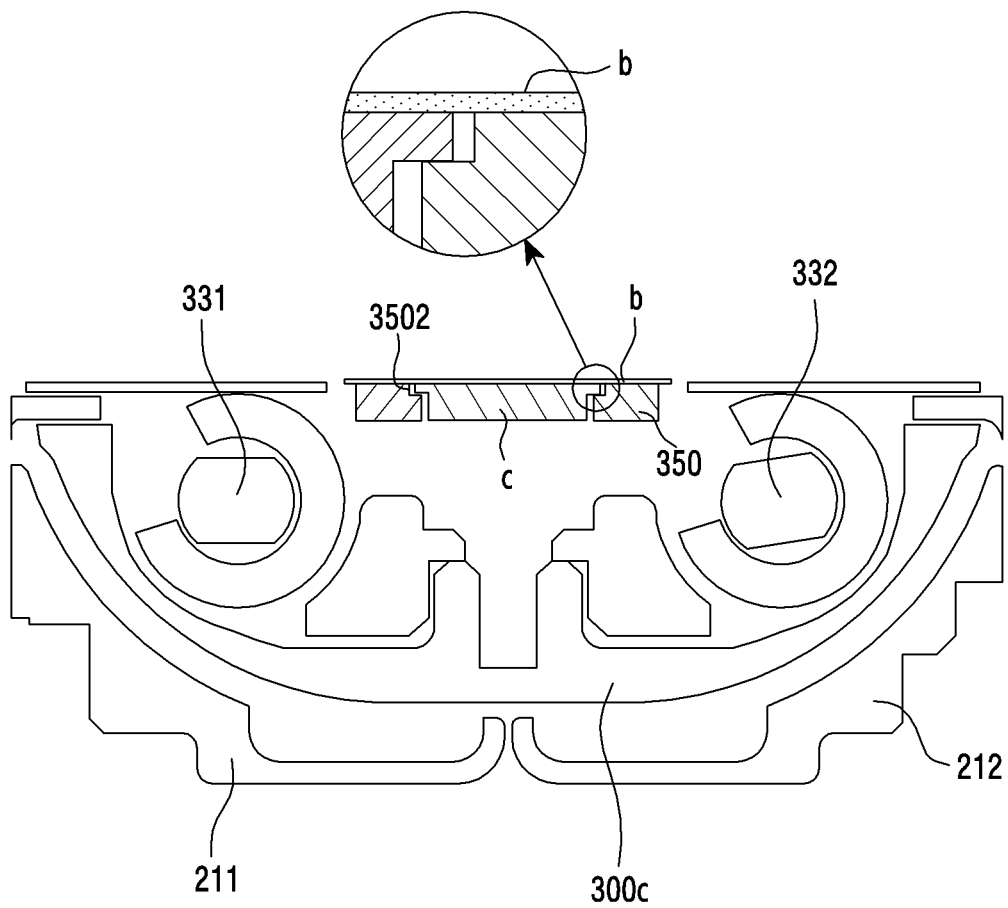
FIG. 23B illustrates a cross-sectional view, cut along the line F-F' of FIG. 20A, of tape attached to a first face of a support portion according to an embodiment.

FIG. 23A illustrates tape attached to a first face of a support portion according to an embodiment. FIG. 23B illustrates a cross-sectional view cut along the line F-F' of FIG. 20A of tape attached to a first face of a support portion according to an embodiment.

Referring to FIGS. 23A and 23B, an adhesive layer 'b', e.g., tape, may be additionally attached to a first face 350a of a support portion 350. The adhesive layer 'b' may be manufactured in the same shape as the first surface 350a and may be attached to the entirety of the first face 350a. At least one opening 3507 constructed on the first face 350a of the support portion 350 may be covered by the adhesive layer 'b', and the adhesive layer 'b' covering the at least one opening 3507 may provide a co-planar state, thereby supporting the flexible display. The adhesive layer attached to the first face 350a may be part of a support structure. The adhesive layer 'b' may cover a minute gap which may be produced when a fastening portion 3502 of the support portion 350 is fastened with the cap 'c'.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:
1. An electronic device, comprising:
a first housing including at least one first electronic component;
a second housing including at least one second electronic component;
a hinge housing disposed between the first housing and the second housing;
a hinge assembly assembled to the hinge housing to rotatably couple the first housing and the second housing;
a flexible printed circuit board (FPCB) electrically coupling the first electronic component and the second electronic component via the hinge housing;
a flexible display disposed from one region of the first housing to at least one region of the second housing across the hinge assembly;
a support portion located between the flexible printed circuit board and the flexible display, the support portion being disposed between the hinge housing and the flexible display and extending in parallel to the first folding axis and the second folding axis; and
a first hinge plate and a second hinge plate respectively fastened to the first housing and the second housing and disposed adjacent to the support portion,
wherein the support portion comprises:
a center portion disposed between the first hinge plate and the second hinge plate when the housing is in a 180-degree unfolded state, the center portion supporting a third portion of the flexible display between the first portion and the second portion; and
a first support portion and a second support portion formed at opposite sides with respect to the center portion,
wherein the first support portion is configured to support a part of the first hinge plate when the housing is in the

180-degree unfolded state and to be separated from the part of the first hinge plate when the housing is in a folded state, wherein the second support portion is configured to support a part of the second hinge plate when the housing is in the 180-degree unfolded state and to be separated from the part of the second hinge plate when the housing is in the folded state, wherein, as the electronic device rotates from the folded state to the 180-degree unfolded state, the support portion moves into the flexible display to support at least one region of the flexible display, and wherein, as the electronic device rotates from the 180-degree unfolded state to the folded state, the support portion moves into the flexible printed circuit board to be spaced apart from the flexible display.

2. The electronic device of claim 1,
wherein the support portion has a bar shape and comprises:
a first face facing the flexible display;
a second face opposite to the first face and facing the flexible printed circuit board;
the center portion disposed between a folding region of the flexible display and the flexible printed circuit board;
a hook portion constructed at the opposite sides of the center portion and constructed on the second face of the support portion; and
an elastic support portion constructed at opposite sides of the hook portion and on the second face of the support portion.

3. The electronic device of claim 2, wherein the center portion comprises:
a first face facing the flexible display; and
a second face facing the hinge housing,
wherein the second face of the center portion has the curved edge portions at the opposite sides of the center portion.

4. The electronic device of claim 2,
wherein the support portion further comprises a fastening hole for being penetrated by a fastener.

5. The electronic device of claim 4, further comprising:
a cap is assembled in the fastening hole to dispose the first face of the support portion and an upper surface of the cap in a co-planar state.

6. The electronic device of claim 1, further comprising:
wherein the first hinge plates further comprise first protrusion portions to support the flexible display in the 180-degree unfolded state or in the folded state, and
wherein the second hinge plates further comprise second protrusion portions to support the flexible display in the 180-degree unfolded state or in the folded state.

7. The electronic device of claim 6,
wherein, in the 180-degree unfolded state, the first and second protrusion portions are supported by the support portion.

8. The electronic device of claim 7,
wherein the support portion further comprises a plurality of support grooves constructed to seat the first and second protrusion portions.

9. The electronic device of claim 8,
wherein the plurality of support grooves comprises:
a first support groove constructed to seat the first protrusion portion; and
a second support groove constructed to seat the second protrusion portion.

10. The electronic device of claim 6, further comprising:
a first arm coupled to the first housing; and
a second arm coupled to the second housing,
wherein the first arm and the second arm respectively comprise at least one mounting groove to seat the first protrusion portion and the second protrusion portion.

11. The electronic device of claim 6, wherein the hinge housing comprises:
a first opening constructed in consideration of a movement trajectory of the center portion; and
a second opening constructed in consideration of a movement trajectory of an edge portion of the first and second hinge plates adjacent to the support portion,
wherein the second opening is located at two sides of the first opening, respectively.

12. The electronic device of claim 11,
wherein the first opening and the second opening are grooves constructed at an inner surface of the hinge housing, and
wherein a depth of the second opening is lower than a depth of the first opening.

13. The electronic device of claim 5, further comprising:
an adhesive layer disposed on the first face of the support portion assembled with the cap.

14. The electronic device of claim 10,
wherein the first arm further includes a first support rib supporting at least one region of the support portion, when the electronic device is in the folded state,
wherein the second arm further includes a second support rib supporting at least one region of the support portion, when the electronic device is in the folded state, and
wherein, as the electronic device rotates from the folded state to the 180-degree unfolded state, the first support rib and the second support rib move the support portion toward the flexible display.

15. The electronic device of claim 2, further comprising:
a stopper having a through-hole through which the elastic support portion of the support portion penetrates;
a screw coupled to the elastic support portion; and
an elastic member located between the stopper and the screw and in contact with at least one region of the stopper,
wherein, as the electronic device rotates from the 180-degree unfolded state to the folded state, the support portion is separated from the flexible display due to restoration force of the elastic member.

16. The electronic device of claim 1,
wherein edge portions of the center portion, located adjacent to the FPCB, are configured to prevent the FPCB from being damaged.

17. The electronic device of claim 1,
wherein the center portion, located adjacent to the FPCB, has curved edge portions at the opposite sides.

* * * * *